United States Patent [19]

Bosen et al.

[11] Patent Number: 4,907,268
[45] Date of Patent: Mar. 6, 1990

[54] METHODS AND APPARATUS FOR CONTROLLING ACCESS TO INFORMATION PROCESSED A MULTI-USER-ACCESSIBLE DIGITAL COMPUTER

[75] Inventors: Robert J. Bosen, Pittsburg; James J. Tucker, Berkeley, both of Calif.

[73] Assignee: Enigma Logic, Inc., Concord, Calif.

[21] Appl. No.: 325,130

[22] Filed: Mar. 15, 1989

Related U.S. Application Data

[63] Continuation of Ser. No. 926,677, Nov. 3, 1986, abandoned.

[51] Int. Cl.[4] .................. H04L 9/00; H04K 1/00
[52] U.S. Cl. ........................... 380/4; 380/25; 364/200
[58] Field of Search .................. 380/4, 23, 25; 364/200 MS File, 900 MS File

[56] References Cited

U.S. PATENT DOCUMENTS

| | | | |
|---|---|---|---|
| 4,218,738 | 8/1980 | Matyas et al. | 380/45 |
| 4,262,329 | 4/1981 | Bright et al. | 364/200 |
| 4,386,233 | 5/1983 | Smid et al. | 380/45 |
| 4,399,323 | 8/1983 | Henry | 380/45 |
| 4,447,890 | 5/1984 | Duwel et al. | 364/900 |
| 4,484,306 | 11/1984 | Kulczyckyj et al. | 364/900 |
| 4,590,470 | 5/1986 | Koenig | 340/825.31 |
| 4,596,898 | 6/1986 | Pemmaraju | 380/45 |
| 4,599,489 | 7/1986 | Cargile | 380/25 |
| 4,649,233 | 3/1987 | Bass et al. | 380/25 |
| 4,757,534 | 7/1988 | Matyas et al. | 380/25 |
| 4,800,590 | 1/1989 | Vaughan | 380/25 |

*Primary Examiner*—Gareth D. Shaw
*Assistant Examiner*—Debra A. Chun
*Attorney, Agent, or Firm*—Flehr, Hohbach, Test, Albritton & Herbert

[57] ABSTRACT

Method and apparatus are disclosed for controlling access to information borne by information records installed in information recorders, which information recorders constitute a part of at least one digital computer system. The digital computer system is an unmodified general purpose digital computer, and each authorized accessant is supplied with an access control kit including a password issuing device and a record adapted to be installed in one of the recorders of that digital computer system.

13 Claims, 10 Drawing Sheets

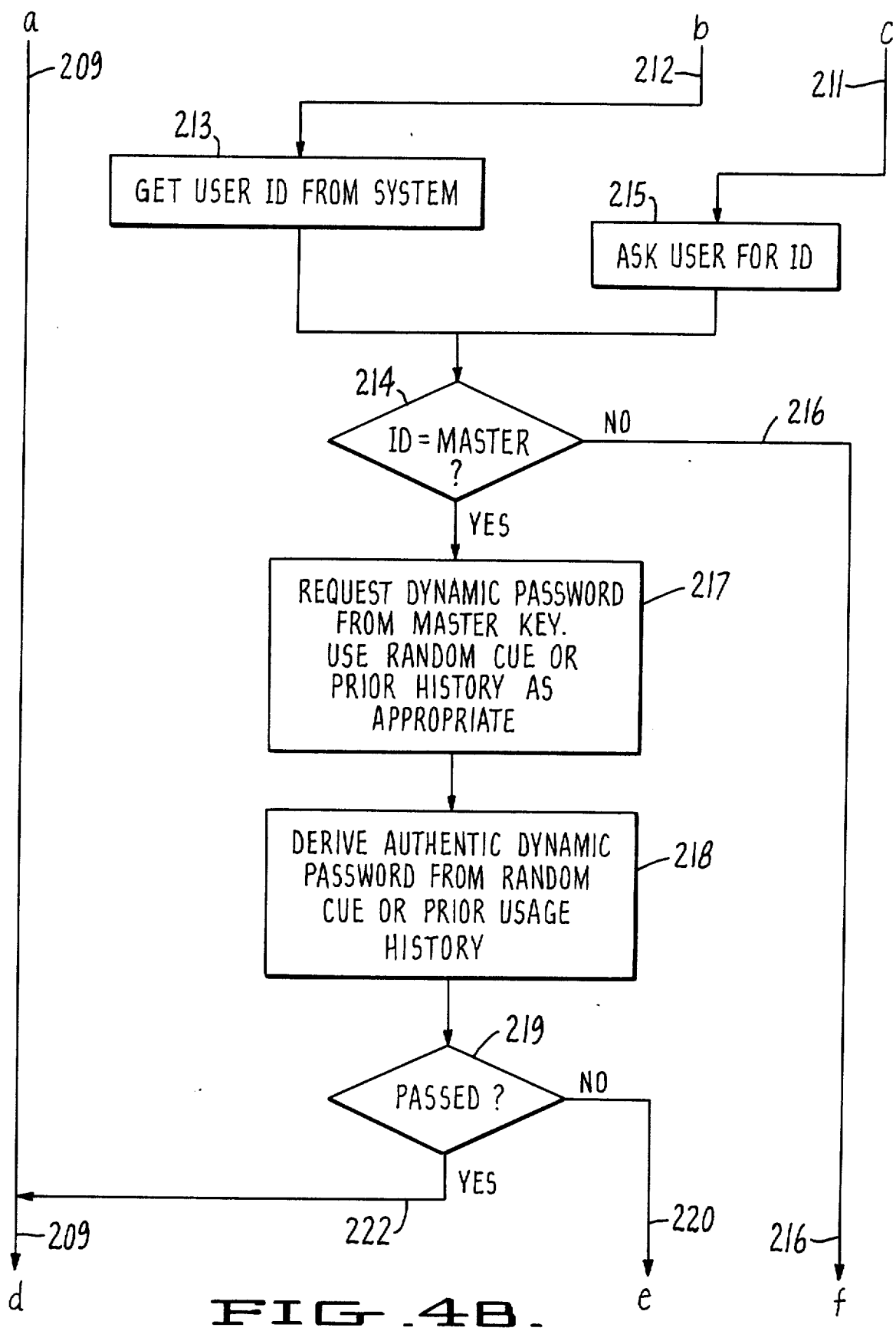
FIG_4B.

METHODS AND APPARATUS FOR CONTROLLING ACCESS TO INFORMATION PROCESSED A MULTI-USER-ACCESSIBLE DIGITAL COMPUTER

This is a continuation of application Ser. No. 926,677, filed Nov. 3, 1968, now abandoned.

BACKGROUND OF THE INVENTION

Field of the Invention

The present invention relates to methods and apparatus for controlling access to information processed by digital computers, and more particularly to methods and apparatus for controlling access to information processed by multi-user-accessible or non-isolated digital computers.

Description of the Prior Art (The term "prior art" as used herein or in any statement made by or on behalf of applicants in connection herewith means only that any document or thing referred to as prior art bears, directly or inferentially, a date which is earlier than the effective filing date hereof.)

Methods and apparatus for controlling access to information processed by digital computers are well known in the prior art.

Prior art methods and apparatus for controlling access to information processed by digital computers can in general be classified in one of two categories or classes, viz., (1) accessant identification password systems (sometimes called "password systems" herein), and (2) cryptographic systems (sometimes called "cryptosystems" herein).

Password systems generally require the submission of a predetermined password or the like to the access-controlled digital computer in order to gain access to sequestered or protected information, which is information processed or to be processed by that digital computer. For example, many password systems require an individual seeking access to submit a purported password to an electronic device, which device compares the submitted purported password with an internally stored or generated authentic password and, if the two passwords match according to predetermined criteria, initiates an electronic operation to permit access to manually or automatically designated portions of sequestered or protected information, such as stored computer programs or data.

In the most elementary of such password systems a single authentic password is preset in the access-controlled computer system and all authorized accessants (users) are supplied with the authentic password. In other ones of such prior art password systems the authentic password may be altered from time to time, or different authentic passwords may be supplied to different authorized accessants or groups of authorized accessants, who then submit to the access-controlled computer system not only their assigned authentic passwords but also code words identifying themselves or the access groups to which they belong.

A problem with such elementary password systems, even when the authentic password is changed from time to time, or different authentic passwords are assigned to different groups of authorized accessants, is that the authentic passwords must be memorized by the authorized accessants. Once such an authorized password is known, particularly if by a large group of authorized accessants, it may be inadvertently imparted to unauthorized persons, and an individual accessant cannot be held accountable.

Another problem with such elementary password systems is that each authorized accessant may require access to multiple systems, and may thus be required to memorize many passwords. Thus, authorized accessants are tempted to make written records of their passwords in the event of memory lapse or confusion, which practice can lead to compromise of the system.

Another problem with such static password systems is that the authentic passwords tend to be repeated over and over in normal operation of the system. That is, these passwords must frequently be communicated over unsecured telephone lines, microwave links, or satellite links. Further, it sometimes occurs than an authorized accessant finds it necessary to type his authentic password on a teleprinter or CRT terminal thus openly displaying the authentic password and giving rise to the possibility that it will be discovered by an interloper.

A system for controlling access to data stored in time-shared computer systems was described in a paper by Lance J. Hoffman which appeared in Volume 1, No. 2, of the publication entitled "Computer Surveys" in June of 1969. In accordance with the teachings of this paper, each user of the time-shared computer system was assigned a very simple mathematical formula or algorithm by which to identify himself to the computer. Whenever a particular user logged onto the time-shared computer system, the computer issued a test number to that particular user by displaying it on his terminal. The particular user then mentally applied his identifying formula or algorithm to the test number and submitted the result to the computer via his terminal. Access to data stored in the time-shared computer was granted to the particular user by the computer only if the correct result was submitted. This access control system does not appear to have come into widespread use, due to the relatively limited capacity of computers of that day.

A considerable improvement in systems for controlling access to data and programs stored in computer systems is disclosed in U.S. patent application Ser. No. 370,902 which was filed by Robert J. Bosen on Apr. 22, 1982 and abandoned in favor of U.S. patent application Ser. No. 07/148,114. Access control systems of the kind shown and described in that patent application are made and sold by Enigma Logic, Inc. of Concord, Calif. U.S. under the trademark "SafeWord". These password-type access control systems will be called "asynchronous SafeWord systems" herein.

A still further improvement in password-type access control systems for controlling access to information processed or to be processed by digital computers is disclosed in U.S. patent application Ser. No. 796,884, which was filed by Robert J. Bosen, et al. on Nov. 12, 1985. Access control systems of the kind shown and described in this patent application are also made and sold by Engima Logic, Inc., under the trademark "Safe-Word". These password-type access control systems will be called "synchronous SafeWord systems" herein. (The term "SafeWord systems" will be used to designate the improvements in password-type access control systems which are shown, described and claimed in both of the U.S. patent applications referred to immediately hereinabove.)

In all SafeWord systems authorized accessants are provided with password issuing devices which issue passwords, seriatim, when access to information sequestered in an associated digital computer is sought. In accordance with the fundamental principles of the Safe-Word system, no two successively issued passwords are identical, and without the proper password issuing device those desiring access to the corresponding sequestered information cannot determine the correct password by which to gain access thereto. Thus, by the employment of SafeWord systems it is rendered much more difficult for an interloper to gain access to such sequestered information, as compared with the degree of protection provided by the static password systems described hereinabove.

As will be seen from the discussion immediately hereinabove, SafeWord systems comprise both hardware and software elements which cooperate in verifying the identities of authorized accessants requesting access to sequestered information stored in associated digital computers. For the sake of clarity, we refer to this concept as an "Accountable Domain". Each SafeWord system establishes an "Accountable Domain" within which computer users can operate. In accordance with the SafeWord system, an Accountable Domain is a group of computer resources which cannot be accessed by any user until:

(a) His or her identity is confirmed using tangible identifiers which are difficult or impossible to duplicate without special equipment, and (b) His or her supervisor has access to the special equipment necessary to duplicate, modify, or disallow the identifiers if necessary, and (c) An encrypted log of the accesses is recorded so that supervisors may access it at any time.

As will now be understood by those having ordinary skill in the art, informed by the preceding portion of the present specification, the SafeWord systems of the prior art are very powerful and sophisticated systems, which provide a high degree of protection for information sequestered in digital computers which are isolated from all but a few carefully selected users, e.g., digital computers which are part of data communication systems or are located in access-controlled locations, such as the computers of electronic funds transfer systems.

As noted above, the prior art also includes cryptographic systems for controlling access to information sequestered in digital computers, which are sometimes called "cryptosystems" herein.

These prior art crystosystems generally require knowledge of a prespecified cipher key value at both the source and destination of any information interchange. For example, if an authorized user at location "A" wishes to receive encrypted information from a computer at location "B" he will need to know the value of a cipher key which can decrypt the information after receipt (but prior to its use). Sometimes this cipher value is known only to electronic decryption equipment or programs, and sometimes the authorized users are required to memorize the prespecified cipher key value and to supply it to the decryption equipment or program as a primitive confirmation of personal identity. Some cryptographic methods of this type allow different cipher keys to be used in different situations, or to protect different groups of data or programs.

A fundamental difficulty with such prior art cryptosystems is that it is difficult to maintain the prespecified cipher key values in secret, particularly if a large number of authorized accessants must memorize them in order to decrypt data.

A further fundamental difficulty with such prior art cryptosystems for controlling access to information sequestered in digital computers is that it is difficult to assign different prespecified cipher key values to be used to encrypt information interchanges between different interactive users, since it is necessary to know the identity of the user (to learn his corresponding cipher key value) before decrypting his or her transmissions.

Further, these prior art cryptosystems, like the above-described prior art password systems, provide the optimum degree of protection for the sequestered information only when the access-controlled digital computer system is of the isolated type, such as those commonly found in data communications systems and electronic funds transfer systems, wherein the digital computer system itself is accessible only to a very limited number of carefully selected personnel.

It follows that the prior art information access control systems disclosed above offer far less actual protection when applied to non-isolated or multi-user-accessible digital computer systems, such as those commonly known as "personal computer systems" or "PC systems".

SUMMARY OF THE INVENTION

Accordingly, it is an object of the present invention to provide methods and apparatus for controlling access to information processed by multi-user-accessible or non-isolated digital computers.

Another object of the present invention is to provide methods and apparatus for controlling access to information processed by digital computers, which methods and apparatus combine the best features of the prior art password systems and cryptosystems.

Yet another object of the present invention is to provide methods and apparatus for controlling access to information processed by digital computers, which methods and apparatus combine the advantages of the SafeWord System of ID verification (The Accountable Domain) with the advantages of encryption, while eliminating at least some of the aforementioned disadvantages.

A still further object of the present invention is to provide methods and apparatus for controlling access to information processed by digital computers including systems which automatically learn and verify the identities of authorized accessants and then automatically submit corresponding encryption cipher values to associated cyptosystems, thus initiating automatic encryption of subsequently processed information. (For the sake of terminology, we shall refer to the combination of Accountable Domain and automatic encryption as a "secure environment".)

An additional object of the present invention is to provide methods and apparatus for controlling access to information processed by digital computers, which methods and apparatus eliminate the necessity for allocating particular information storage spaces for each authorized accessant or group of authorized accessants.

A further object of the present invention is to provide methods and apparatus for controlling access to information processed by digital computers, the entire information storage space of each of these computers being accessible to all users thereof, whether authorized accessants or otherwise, thus eliminating the need for elaborately programed information space access hierarchies, and the like.

Other objects of the present invention will in part be obvious and will in part appear hereinafter.

The present invention, accordingly, comprises the several steps and the relation of one or more of such steps with respect to each of the others, and the apparatus embody features of construction, combinations of elements, and arrangements of parts which are adapted to effect such steps, all as exemplified in the following disclosure, and the scope of the present invention will be indicated in the appended claims.

In accordance with a principal feature of the present invention access control systems for controlling access to information to be processed are incorporated into multi-user-accessible of non-isolated digital computer systems.

In accordance with another principal feature of the present invention, access control systems for controlling access to information to be processed by digital computers combines principles and features of both password-type access control systems and cyptographic-type access control systems.

In accordance with yet another principal feature of the present invention, access control systems for controlling access to information stored in digital computers need not allocate particular parts of the information storage spaces of those digital computers to particular authorized accessants.

In accordance with another principal feature of the present invention an access control system for controlling access to particular information contained in a digital computer system comprises a plurality of password issuing devices for issuing authentic passwords to authorized accessants respectively possessing the same. Each of such password issuing devices may issue passwords seriatim without the submission of corresponding cue words, or may derive passwords algorithmically from cue words received as a "challenge" from the associated digital computer containing sequestered or protected information.

In accordance with another principal feature of the present invention such an access-controlled digital computer is programed to internally educe the same password which will be educed by an authentic password issuing device supplied with the corresponding cue or cue word, and to compare the internally-generated password with the password submitted by the applicant for access to particular information sequestered in the computer system.

In accordance with a yet further principal feature of the present invention each digital computer system embodying the same comprises cryptosystem means whereby information (data and/or programs) may be encrypted before storage in a predeter-mined information storage space and decrypted when read from the same information storage space.

In accordance with another principal feature of the present invention said cryptosystem means is interfaced with the abovedescribed password system so that different cipher key values can be selected to correspond with different authorized accessant(s).

In accordance with a yet further principal feature of the present invention said cryptosystem means is interfaced with mass storage means, so that different sections of mass storage can be selected for automatic encryption and decryption to correspond with different authorized accessant(s).

In accordance with a principal feature of certain particular embodiments of the present invention said cryptosystem means is interfaced with communications input/output (I/O) means, so that different communications interchanges can be automatically encrypted and/or decrypted to correspond with different authorized accessant(s).

In accordance with another principal feature of certain particular embodiments of the present invention, provision is made for the creation and management of information necessary to assign different password issuing devices and different encryption methods to different authorized accessants, thereby allowing a large number of different authorized accessants to access and use different data resources in a secure manner with minimal likelihood of security compromise.

For a fuller understanding of the nature and objects of the present invention reference should be had to the following detailed description, taken in connection with the accompanying drawings.

BRIEF DESCRIPTION OF THE DRAWINGS

FIGS. 4A through 4G together comprise a flow chart illustrating the operations carried out by the digital computer of FIG. 3 in accordance with the access control program embodying certain principles of the present invention, which program is borne by the access control program record shown in FIG. 1.

DESCRIPTION OF THE PREFERRED EMBODIMENTS

Figure 1:
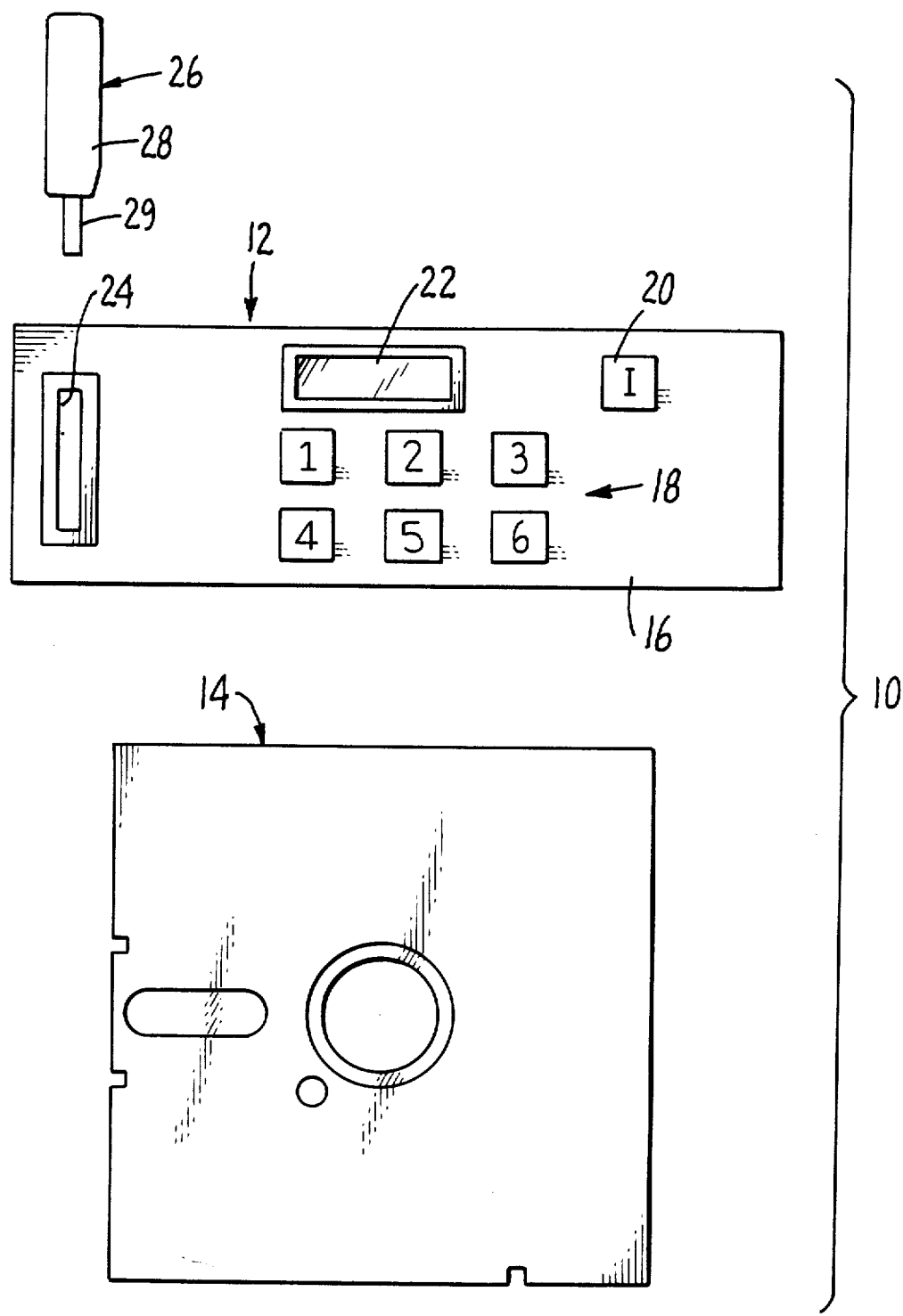
FIG. 1 illustrates the two principal parts of the access kit which is supplied to each authorized accessant to sequestered information stored in the multi-user-accessible digital computers of certain preferred embodiments of the present invention.

Referring now to FIG. 1, there is shown an access kit 10 embodying certain principles of the present invention.

Access kit 10 is one of a plurality of similar access kits all of which are adapted to cooperate with the digital computer of the first preferred embodiment of the present invention (FIG. 3) in carrying out certain teachings of the present invention.

Figure 3:
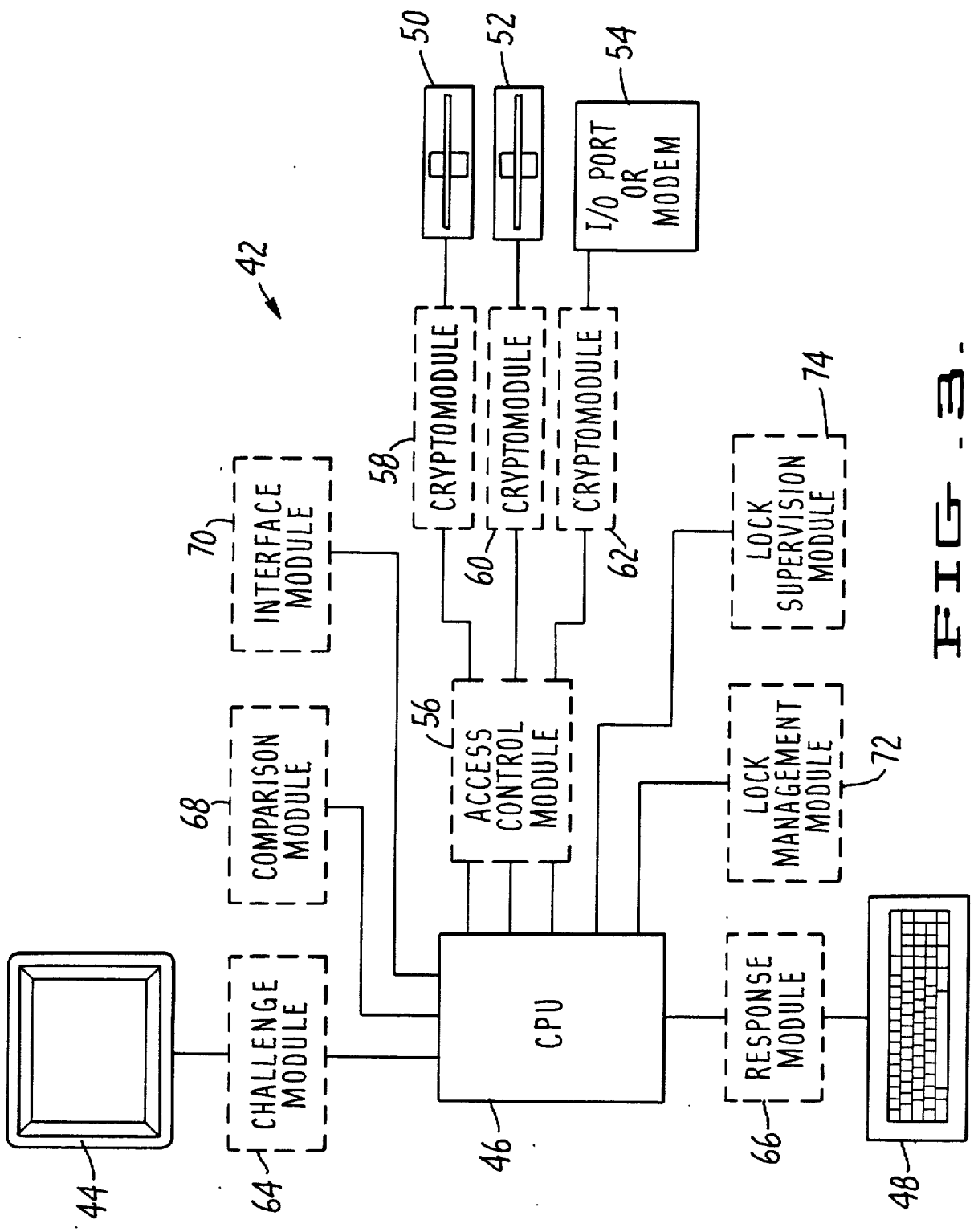
FIG. 3 is a schematic block diagram of a multi-user-accessible digital computer embodying the present invention, which is adapted for cooperation with the access kit of FIG. 1.

In accordance with the teachings of the present invention, the individual access kits of said plurality of access kits are distributed respectively to authorized accessants to information sequestered or to be sequestered in the digital computer of the first preferred embodiment of the present invention (FIG. 3). It is to be understood that the access kits of the present invention do not necessarily consist only of the elements shown in FIG. 1. In some embodiments of the present invention each access kit distributed to a particular authorized accessant may also include suitable instructional literature, maintenance literature, or the like, and may further include a suitable carrying case for both of the elments shown in FIG. 1, etc.

It is further to be understood that not all of the access kits distributed to authorized accessants to information sequestered in the digital computer of any particular preferred embodiment of the present invention will be alike in every respect. To the contrary, the most preferred embodiments of the present invention will each comprise a plurality of access kits none of which is identical to any of the others or remains so throughout the operating life of that preferred embodiment.

In addition, the set of access kits or certain embodiments may comprise several subsets, each adapted to permit access only to corresponding bodies of sequestered information.

Referring again to FIG. 1, it will be seen that access kit 10 comprises a device 12 generally resembling a small pocket calculator and a computer data disk 14 of well known type.

As explained in more detail hereinbelow, device 12 provides, seriatim, the passwords by means of which the authorized accessant to whom the device is distributed gains access to information sequestered in the associated digital computer. For this reason, device 12 will be called a "password issuing device" herein, as will similar but by no means identical devices serving generally the same function in other embodiments of the present invention.

It is to be further understood that not all of the password issuing devices of particular embodiments of the present invention will be physically identical to password issuing device 12 of FIG. 1. For example, certain embodiments of the present invention will comprise synchronous SafeWord systems in which the password issuing devices are devoid of the six numerical data entry keys possessed by password issuing device 12 as shown in FIG. 1.

As will be evident to those having ordinary skill in the computer art, the record 14 shown in FIG. 1 is a magnetic information storage diskette or "floppy disk" of well known type. It is to be understood, however, that the present invention is not limited to access control systems in which the record portions of the access kits are diskettes or "floppy disks", but rather embraces systems in which the record portions of the access kits are any kind of computer information record, whether magnetic or not. Thus, it will be seen that the records of the access kits of certain embodiments of the present invention may not be magnetic diskettes, but rather may be "rigid" magnetic disks of well known kind, magnetic tape cassettes, photoelectric records, etc., all of which will be called "records" herein.

In accordance with the principles of the present invention, the record portion of a particular access kit, e.g., the diskette 14 of FIG. 1, bears a recording of the access control program of the preferred embodiment of the present invention of which that access kit is a part, and further bears certain particular data necessary to the operation of the particular embodiment, such as the date and time when the access kit of which the record is a part was issued, the identification number or word of the authorized accessant to whom that access kit was issued, etc. In certain embodiments of the present invention the record portion of the access kit may also bear a recording of the disk operating system of the digital computer which is to be part of the access-controlled computer system of the particular embodiment, although it is to be clearly understood that this is not a necessary part of the present invention.

Figure 2:
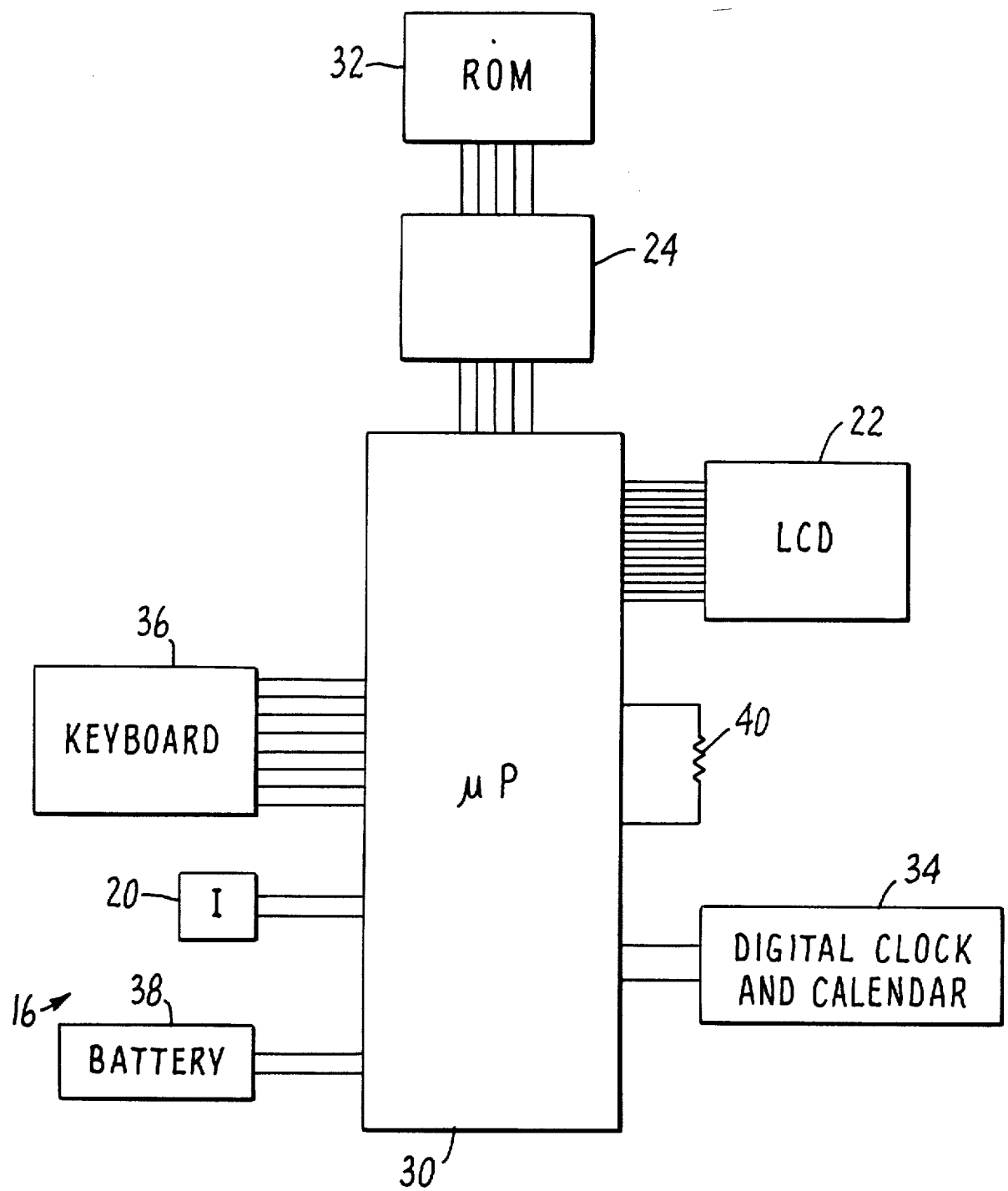
FIG. 2 is a schematic block diagram of the circuit of the password issuing device of the access kit of FIG. 1.

Referring again to FIG. 1, it will be seen that password issuing device 12 comprises a case 16 of the type well known in pocket calculators; which case contains the circuit of password issuing device 12 (FIG. 2). The six keys of a truncated keypad 18 are located on the front face of case 16 in the well known manner. An additional key 20 is also located on the front face of case 16. Each individual key of truncated keyboard 18 may be identified by the reference numeral designating the keyboard, viz., 18, followed by the number found on the key in parenthesis. Thus, the lower middle key of truncated keyboard 18, as seen in FIG. 1, is identified by the reference designation 18(5).

A display device 22 is mounted in a suitable opening in the front face of case 16, e.g., a liquid crystal display device of well known type. A receptacle 24 for receiving and making contact with a separate auxiliary circuit device 26 also passes through the front face of case 16.

As seen in FIG. 1, auxiliary circuit device 26 comprises a main body portion 28 and a projecting edge of a printed circuit board 29. Receptacle 24 is a printed circuit board edge connector of well known type which is adapted to interconnect the auxiliary circuit mounted on printed circuit board 29 and located within main body portion 28 with the circuit of password issuing device 12. The circuit of auxiliary circuit device 26 may in certain embodiments of the present invention comprise a microprocessor and its associated read-only and random access memory means, which together constitute all of the unique portions of the circuit of password issuing device 16 i.e., all of the portions of the circuit of password issuing device 16 which differ from password issuing device to password issuing device within the plurality of password issuing devices comprising a single embodiment of the present invention. Auxiliary circuit devices of this type are well known in the products of Enigma Logic, Inc., of Concord, California, U.S.A.

Referring now to FIG. 2, it will be seen that the circuit of password issuing device 16 comprises an integrated circuit microcomputer 30 of well known type, such as a Hitachi LCD-III microprocessor chip, which is provided in the well known manner with suitable firmware, e.g., the password issuing device program of the program listing which is appended to the present specification as Appendix B.

The translation of the program listing of Appendix B, which is expressed in the well known "C" programming language, into the machine language of the Hitachi LCD-III microprocessor chip, or the machine language of any other microprocessor chip selected for use in embodying the present invention, is within the scope of those having ordinary skill in the computer programming art, informed by the present disclosure, without the exercise of invention or undue experimentation. The "loading" of this translated machine language program into the "onboard" read-only memory of the Hitachi LCD-III microprocessor chip is within the scope of those having ordinary skill in the microcomputer programming and design art, employing well known techniques and widely available equipment.

As also seen in FIG. 2, the circuit of password issuing device 16 further comprises an integrated circuit electrically-erasable, programmable, read-only memory (EEPROM) 32 of well known type, such as a XICOR 2444, 256-bit EEPROM memory, which is mounted on the printed circuit board 29 of auxiliary circuit device 26 (FIG. 1) and thus is detachably connectable to the balance of the circuit of password issuing device 16 by means of the printed circuit board edge connector which is part of receptacle 24 (FIG. 1). In the first preferred embodiment of the present invention the board edge connector portion of receptacle 24 (FIG. 1) is a six-pin card edge connector, such as an EDAC 391-006-520-101 card edge connector, which is well known and widely commercially available.

In certain preferred embodiments of the present invention the EEPROM of the detachable auxiliary circuit of each password issuing device contains information designating the particular authorized accessant to whom that password issuing device is issued or information unique to the particular password generating algorithm assigned to that particular authorized accessant, and is adapted to contain, in microprocessor-readable form, a record of the password most recently issued in response to an access request by said particular authorized accessant, and/or time and date information which is supplied by a digital clock and calendar 34 (FIG. 2) which is a part of each such password issuing device.

Thus, it will be understood that in the particular password issuing device 16 shown in FIGS. 1 and 2 only auxiliary circuit device 26 (FIG. 1), which contains EEPROM 32, is personal and unique to the particular authorized accessant to whom that password issuing device is issued, while the main portion of password issuing device 16 is substantially the same as that of every other password issuing device of the first preferred embodiment of the present invention. Thus, all such main portions in many systems of the present invention are substantially the same as every other one, and thus such main portions may be interchanged with each other within every such system.

The detachable auxiliary circuit devices, e.g., device 26 of FIG. 1, are sometimes called "SafeWord keys" herein, and sometimes called "key chips" or simply "Keys".

The truncated keyboard 18 of password issuing device 16 (FIG. 1) is preferably a dissected portion of a commercially available elastomer keyboard, e.g., an S.P. America SS-12-EL-A1 elastomer keyboard. Other embodiments of the present invention may make use of a full decimal keyboard, such as the S.P. America SS-12-EL-A1 elastomer keyboard, undissected.

Issue key 20 (FIG. 1) is preferably a single key dissected from an S.P. America SS-12-EL-A1 elastomer keyboard.

As explained above, numerical data entry keyboard 18 (FIG. 1) is not provided in all embodiments of the present invention.

Liquid crystal display 22 of password issuing device 16 (FIG. 1) may be a 3.5 digit Refac 61015-3HR-ZA liquid crystal display of a Shelly 6500-4000 liquid crystal display.

Password issuing device 16 further comprises suitable battery holder means holding a bank 38 of batteries of well known type, e.g., four Eveready 357 cells.

Resistor 40 (FIG. 2) determines the timing constant of the "onboard" oscillator of microprocessor 30 in the well known manner.

Digital clock and calendar microcircuit 34 of password issuing device 30 (FIG. 2) provides additional (optional) variables which may be used by the password generators of the access control and password issuing device programs, and may in some embodiments be stored temporarily in EEPROM 32.

The provision of conductors suitably interconnecting receptacle 24, truncated keyboard 18, issue key 20, liquid crystal display 22, resistor 40, digital clock and calendar 34, the battery holder for battery bank 38, and selected pins of the 80-pin flat plastic package of microprocessor 30 is within the scope of those having ordinary skill in the computer art, informed by the present disclosure, without the exercise of invention or undue experimentation, and thus those conductors are shown only schematically in FIG. 2.

It is to be understood that the present invention is not limited to the particular password issuing device configuration designated by the reference numeral 16 in FIGS. 1 and 2 and described in the present specification in connection therewith. For example, truncated keyboard 18, which is necessary for the inputting of challenge or "cue" words, and which is necessary for the utilization of the resequencing procedure which is a principal feature of the invention disclosed in U.S. patent application Ser. No. 796,884, is not needed in password issuing devices adapted for use in synchronous SafeWord systems which do not utilize this resynchronizing procedure, and thus keyboard 18 may be eliminated from password issuing devices for use in synchronous SafeWord systems which do not utilize a resequencing procedure as disclosed in U.S. patent application Ser. No. 796,884.

Referring now to FIG. 3, there is shown a schematic block diagram of the multi-user-accessible digital computer 42 which is a part of the access-controlled digital computer system of the first preferred embodiment of the present invention.

As will now be apparent to those having ordinary skill in the computer art, informed by the present disclosure, the access-controlled digital computer system of the first preferred embodiment of the present invention includes multi-user-accessible digital computer (e.g., personal computer) 42 and a plurality of access kits, 10, 10.1, ..., 10.n, all of which access kits are adapted to cooperate with digital computer 42 in controlling access to one or more bodies of information stored in one or more locations in digital computer 42.

It is to be particularly noted that the dashed rectangles in FIG. 3 represent virtual modules, i.e., parts of digital computer system 42 which might have been implemented in actual physical structures or devices but are instead simulated by the digital computer itself (shown in solid lines) under control of the access control program derived from the access control program recording on record means (FIG. 1).

It is further to be noted that in accordance with the terminology adopted herein the access-controlled digital computer system of the first preferred embodiment of the present invention, comprising digital computer 42 and cooperating access kits 10, 10.1, . . ., 10.n, will sometimes be called a "secure environment system".

The term "secure environment system" as used herein denotes any digital computer system comprising a digital computer and a plurality of access kits adapted to coact therewith in controlling access to one or more bodies of information sequestered in that digital computer.

It is to be understood that while the present invention also finds its highest use in connection with multi-user-accessible or non-isolated digital computers, it is not in any sense limited to systems comprising multi-user-accessible or non-isolated digital computers.

The term "secure environment" as used herein denotes the operational condition of a secure environment system as defined herein whereby information (i.e., data, program steps or both) sequestered in the digital computer which is part of the system is automatically encrypted and/or decrypted for authorized users under the control of the virtual modules shown in FIG. 3, or some of them.

The terms "computer" and "computer system" are used herein in their broadest acceptation to denote not only unitary computers, e.g., computers of the type currently known as "personal computers", and computing and data processing installations, but also teleprocessing and telecomputing systems, database systems, and the like, in which parts of the system are sited in different geographical locations and continuously or intermittently interconnected by telephone lines, microwave links, or the like.

Thus, by way of example, a secure environment system embodying the present invention may comprise as its digital computer component the central data processing installation of a business firm, which itself comprises one or more display means, one or more keyboard means, one or more central processing units (CPU), one or more recorder means, and one or more input/output means, cooperating groups of which means are sited in different geographic locations and continuously or intermittently interconnected by means of communications links, such as those of a common carrier telephone system.

The secure environment system of the first preferred embodiment of the present invention shown and described herein, however, comprises a single personal computer 42, including a display device 44, a central processing unit 46, a keyboard 48, two recorder means (i.e., two disk drives of well known type for "floppy disks" or diskettes of well known type) 50, 52, and an input/output port or modem 54.

In the well known manner, the central processing unit 46 of digital computer 42 (FIG. 3) comprises direct access information storage means in which may be stored program instructions and data or both and processing means for operating upon data stored in the direct access information storage means in accordance with program instructions also stored in the direct access information storage means.

As illustrated in FIG. 3, central processing unit 46 is interconnected with recorder means 50 and 52 and input/output port means or modem means 54 by way of a virtual access control module 56, and by way of virtual cryptomodules 58, 60, 62, respectively.

As noted above, these virtual modules do not exist as separate physical equipment, but rather the personal computer 42 of FIG. 3 operates as though they did have independent existence by virtue of the fact that it is programmed in accordance with the access control program derived from the record means 14 of access kit 10 (FIG. 1) via one of the recorder means 50, 52.

As yet further illustrated in FIG. 3, it is a principal feature of the present invention to connect display means 44 to central processing unit 46 by way of virtual challenge module 64, whose principal function will be discussed in detail hereinbelow. (In accordance with the teachings of the present invention, challenge module 64 may be implemented either in hardware or in software, and may be present only intermittently.)

As further seen in FIG. 3, it is a principal feature of the present invention to connect keyboard 48 to central processing unit 46 through virtual response module 66, whose principal function will also be explained in detail hereinafter.

As will now be understood by those having ordinary skill in the computer art, informed by the present disclosure, each secure environment system embodying the present invention comprises at least one password issuing device, and each such password issuing device comprises at least one password display device, some of said password issuing devices also comprising a manually operable password issue control key (20, FIG. 1) or the like.

As further seen in FIG. 3, digital computer 42 of the secure environment system of the first preferred embodiment further comprises a virtual comparison module 68 and a virtual interface module 70. These modules, as well as challenge module 64, response module 66, access control module 56, and cryptomodules 58, 60, 62 may (each of them or all of them) be implemented either in hardware or in individual electrical circuit structures, or as software instructions executed by central processing unit 46 under control of the access control program derived from record means 14 (FIG. 1).

As yet further illustrated in FIG. 3, digital computer 42 comprises a virtual lock management module 72 and a virtual lock supervision module 74. These modules may be implemented either in hardware as individual electrical circuit structures, or as software instructions executed by central processing unit 46 under the control of the access control program derived from record means 14 (FIG. 1).

The discussions of the challenge module, response module, comparison module, and interface module found hereinbelow will be most readily comprehended in light of the immediately following discussion of the steps typically carried out by the authorized accessant to gain access to sequestered, i.e., encrypted and access restricted, information stored in recorder means 50 and/or 52 of FIG. 3 and within the secure environment thereof.

(It should be recalled at this point that in accordance with the principles of the present invention computer 42 is a standard, completely unmodified, computer, and that thus access kit 10 may be used in connection with any one at a time of several unmodified substantially identical computers 42, 42.1, 42.2, ..., 42.n, in same systems embodying the present invention.

1. Assume that an access seeker wishes to make use in computer 42 (FIG. 3) of certain information (data and/or one or more programs) which is recorded on one or both of the records contained in recorders 50 and 52 (FIG. 3) and is located within the secure environment.

2. After "booting up" computer 42 in the well known manner, and loading the access control program on record diskette 14 into the direct access memory of CPU 46, said access seeker determines that said certain information is recorded in codetext, i.e., in encrypted form, and thus cannot be utilized in computer 42 in the normal manner, i.e., the manner in which cleartext, or unencrypted text, can be utilized in computer 42.

3. Said access seeker then manipulates keyboard 48 in such manner as to inform lock supervision module 74 that he wishes to make use of sequestered or protected, i.e., encrypted, information recorded on the record means contained in one or both of recorders 50 and 52, or present (or expected to arrive) at input/output port or modem 54. (The particular information to which access en clair is sought may be prespecified, e.g., as information to be accessed by only one accessant, or may be specified in the access request.)

4. Lock supervision module 74 then responds by displaying on display device 44 a demand in plain language that the access seeker (not then known to computer 42 to be an actual authorized accessant) submit an identification codeword (which will, of course, be the correct, authentic identification codeword if the access seeker is in fact an authorized accessant).

5. The access seeker then submits a purported identification codeword via keyboard 48 (which purported identification codeword will, of course, be the authentic identification codeword if the access seeker is an authorized accessant).

6. Response module 66 (with or without the cooperation of lock supervision module 74) then searches suitable accessant identification codeword tables held in the direct access memory of central processing unit 46, or on a record in one of the recorders 50, 52, to determine whether the just submitted purported identification codeword matches the authentic identification codeword of any authorized accessant. If no match is found, access to sequestered information in computer 42 is not granted to the access seeker.

7. If, however, a match is found in the previous step, response module 66 (and/or lock supervision module 74) retrieves from the direct access memory of central processing unit 46, or from one of the records in recorders 50 and 52, or both, further information related to the authorized accessant whose authentic identification codeword successfully matched the submitted purported identification codeword, which information will be called herein "accessant identification verification parameters" or "verification parameters". Such verification parameters may for example be, in different embodiments of the present invention, the total number of accesses to sequestered information in the same digital computer by the authorized accessant whose authentic identification codeword has just been successfully matched, the value of any fixed or memorized passwords which should be known by this authorized accessant, the operational status and modes of the password issuing device which should be in the possession of this authorized accessant, etc., or some of them.

8. Comparison module 68 compares the retrived verification parameters with corresponding parameters known to be true (for example, the current date and time, and the number of times this authorized accessant has been granted access in the past). If any unfavorable comparisons are made (for example, if the current date or time falls outside the prescribed dates and times of authorized access) then access is not granted.

9. If all of the comparisons described in Step 8 are completed favorably, then challenge module 64 demands (via display 44) that the access seeker provide any additional information necessary to enable comparison module 68 to make additional comparisons. Usually this will entail demanding that the access seeker provide a memorized password. In accordance with a principal feature of the present invention, challenge module 64 will additionally demand that access seeker provide a changing password which is available only from the password issuing device which should be in the possession of the corresponding authorized accessant. Depending upon the type of password issuing device in the possession of the access seeker, the challenge module may additionally provide a random number of "cue" value to the access seeker.

10. The access seeker then provides or attempts to provide all of the information demanded by challenge module 64. In the system of the first preferred embodiment of the present invention, typically, this will require the access seeker to enter the value of the random number of "cue" into truncated keypad 18 of his password issuing device 12 which translates this random number or "cue" into a corresponding password. Password issuing device 12 then displays said corresponding password on its display means 22, so that the access seeker can read it. The access seeker then enters this password into keyboard 48 of digital computer 42, the secure environment system of the first preferred embodiment of the present invention. Depending upon the type of password issuing device in the possession of the access seeker, the access seeker may obtain the password by slightly different means. The password may, for example, be available at the press of a single key, derived by sophisticated logic as described in U.S. patent application Ser. No. 796,884. Providing all of the verification parameters demanded by computer 44 under control of virtual challenge module 64 may require that the access seeker enter various items of information into computer 42 via keyboard 48 (or other appropriate input means). Such verification parameters or other information may also include a fixed or memorized password in the well known manner.

11. Comparison module 68 then compares all of the verification parameters submitted by the access seeker via keyboard 48 in step 10 with the corresponding authentic verification parameters of the already identified authorized accessant. (For example, comparison module 68 calculates the value of the password independently of the password issuing device, consulting prespecified stored records containing operational details and the last known status of the password issuing device in possession of the authorized accessant. If a random challenge or cue was issued to the access seeker by challenge module 64, its value is used appropriately during the calculation.) If any of these comparisons carried out by comparison module 68 is unfavorable (for example, if the password provided by the access seeker does not match the internally generated password derived from values known to be correct), then access to the desired sequestered information is not granted to the access seeker.

12. If all of the information supplied by the access seeker through keyboard 48 in response to all of the challenges submitted to the access seeker through challenge module 64 and display means 44 compare favorably with values known to be correct by comparison module 68, then the access seeker is deemed to be the authorized accessant.

13. Interface module 70 consults prespecified information (held in the direct access memory of CPU46 or in one of the records in recorders 50, 52) about the encryption methods needed by this authorized accessant for each recorder 50, 52, and/or input/output port or modem 54. Interface module 70 passes this prespecified information to each cryptomodule 58, 60, and/or 62 which has been prespecified for operation with the corresponding authorized accessant. In certain environments (such as personal computers) where unauthorized usurpers may attempt to attack the secure environment, the information passed between interface module 70 and encryption modules 58, 60, and/or 62 is passed in ways which defy understanding by outsiders unable to consult design documentation. Examples include encryption in the well known manner and smoke screens and camouflage as illustrated in Appendix E which may cause hundreds or even thousands or "decoy" values to be passed for each valid value. Further examples including passing incorrect values if the supervision module determines that any module has been improperly modified (including the possibility that some or all of the contents of CPU registers may be temporarily modified).

14. All cryptomodules (58, 60, and/or 62) needed by this authorized accessant begin operation according to the prespecified values.

15. The authorized accessant uses the data in the normal manner, because all encrypted data resident on a record in either of the recorders 50, 52 or arriving from input/output port or modem 54 is automatically decrypted as it passes through its corresponding cryptomodule 58, 60 and/or 62.

16. The authorized accessant can now create new data and store it in the normal manner knowing that it will be secure, because all normal data originating in the direct access memory of CPU 46 is automatically encrypted by the appropriate combination of cryptomodules 58, 60 and/or 62 on its way to recorders 50, 52, or input/output port or modem 54.

As will now be evident to those having ordinary skill in the computer art, informed by the present disclosure, the data records containing prespecified information consulted by the various virtual modules as described in the previous paragraphs must be created and organized in advance. In the preferred embodiment of the present invention, this data creation and organization is carried out by lock management module 72, which is a virtual component of computer 42 (FIG. 3), the virtual existence of which is due to a subprogram of the access control program. In addition to managing a database in the well known manner, containing items of information corresponding to the respective authorized accessants, lock management module 72 encrypts the data items, using an encryption mechanism which can be decrypted as needed by the aforementioned modules. (Appendix D is a full source listing detailing the implementation of said lock management module.)

As will now also be evident to those having ordinary skill in the computer art, informed by the present disclosure, both password issuing device 12 and comparison module 68 are adapted to execute the same password generating algorithm(s), i.e., to apply the same translation function to the challenges or cues received seriatim, in addition to carrying out other operating steps. Appendix A discloses complete details of one of such password generating algorithms, together with other important features of the present invention.

Full details of enhanced password generation algorithms are disclosed in U.S. patent application Ser. No. 976,884.

Many other mathematical procedures and corresponding algorithms for generating sequences of passwords suitable for use in embodiments of the present invention will occur to those having ordinary skill in the computer design and programming arts, informed by the present disclosure, without the exercise of invention or undue experimentation.

The writing of suitable computer instruction sequences or subroutines for executing such password generation algorithms, step-by-step, in response to requests for access or depressions of password issue key 20 is within the scope of those having ordinary skill in the computer programming art, informed by the present disclosure, the disclosure of the above-identified United States Patent Application, and the appendices hereto.

Cryptosystems suitable for the purposes of the present invention are now well known and in widespread use. Design and implementation details of one such system, known as the Data Encryption Standard or "DES", have been published by the National Bureau of Standards. Reprints are available from the U.S. Department of Commerce, National Bureau of Standards, as "FIPS PUB 46" (Federal Information Processing Standards Publication Jan. 15 1977). See also FIPS PUB 74 Apr. 1, 1981 entitled "Guidelines for Implementing and Using the NBS Data Encryption Standard". The implementation of such a system is well within the scope of those having ordinary skill in the programming art, informed by the present disclosure and the publications cited herein.

The remaining elements of the present invention (comparison module 68, lock supervision module 74, challenge module 64, and response module 66, consist of conventional data display, data storage, and database management techniques well known to persons having ordinary skill in the art of computer design and programming, as informed by the present disclosure, without the exercise of invention or undue experimentation. Full source code listings of typical embodiments of these systems in their entirety, including all of the above-named modules, are included in appendices attached hereto.

Referring now to FIG. 4, it will be seen that each operation of the secure environment compute system 42 of FIG. 3 begins (after receipt of a request from an access seeker desiring entry into the secure environment) at initial step 200 (FIG. 4A) with an attempt to open the "Access File". The Access File is a list of data (usually stored on mass storage means, e.g., disk drives 50, 52) containing various items of information about individual authorized accessants.

If the Access File cannot be opened, then no information about authorized accessants is available, and all accessants must therefore be treated as potential adversaries. To recover from this potentially difficult situation, the preferred embodiment of the present invention includes a special part of the access control program (now in the direct access memory of CPU 46) which specifies at least one password issuing device, equipped with a MASTER Key which takes the form of an auxilliary circuit device similar to device 26 (FIG. 1), as a special "MASTER" identifier. Possession of this MASTER identifier verifies that the access seeker has sufficient authority to gain access even in the event that the Access File cannot be opened, thus allowing the possibility of manually rebuilding the Access File.

If the Access File cannot be opened, then the logic of the preferred embodiment branches at decision step 201 via flowline 203 to a request (step 204), displayed on display device 44, for a password, which can only be generated by the MASTER identifier. In this embodiment, the determination of this password requires that the access seeker read from display device 44 a random challenge "cue word", or "cue", in the manner described in U.S. patent application Ser. No. 370,902. The access seeker then enters this cue into keypad 18 (FIG. 1), depresses issue key 20, and reads the corresponding password from display 22.

The desired authentic password is then derived internally (step 205) by digital computer 42 from the cue and/or from the prior usage history of the MASTER password issuing device, in the manner described in U.S. patent application Ser. No. 790,884, without revealing its value to the access seeker.

At step 206 (FIG. 4A) the thus internally derived password is compared with the purported password immediately previously determined from password issuing device 16 by the access seeker and submitted to digital computer 42 by the access seeker via keyboard 48. If the two passwords do not compare favorably, step 206 branches to flow line 207, and access to sequestered information in digital computer 42 is not granted. Instead, a prespecified (default) "Fail Action" (permanently incorporated in the access control program) is taken at step 208.

Figure 4A:
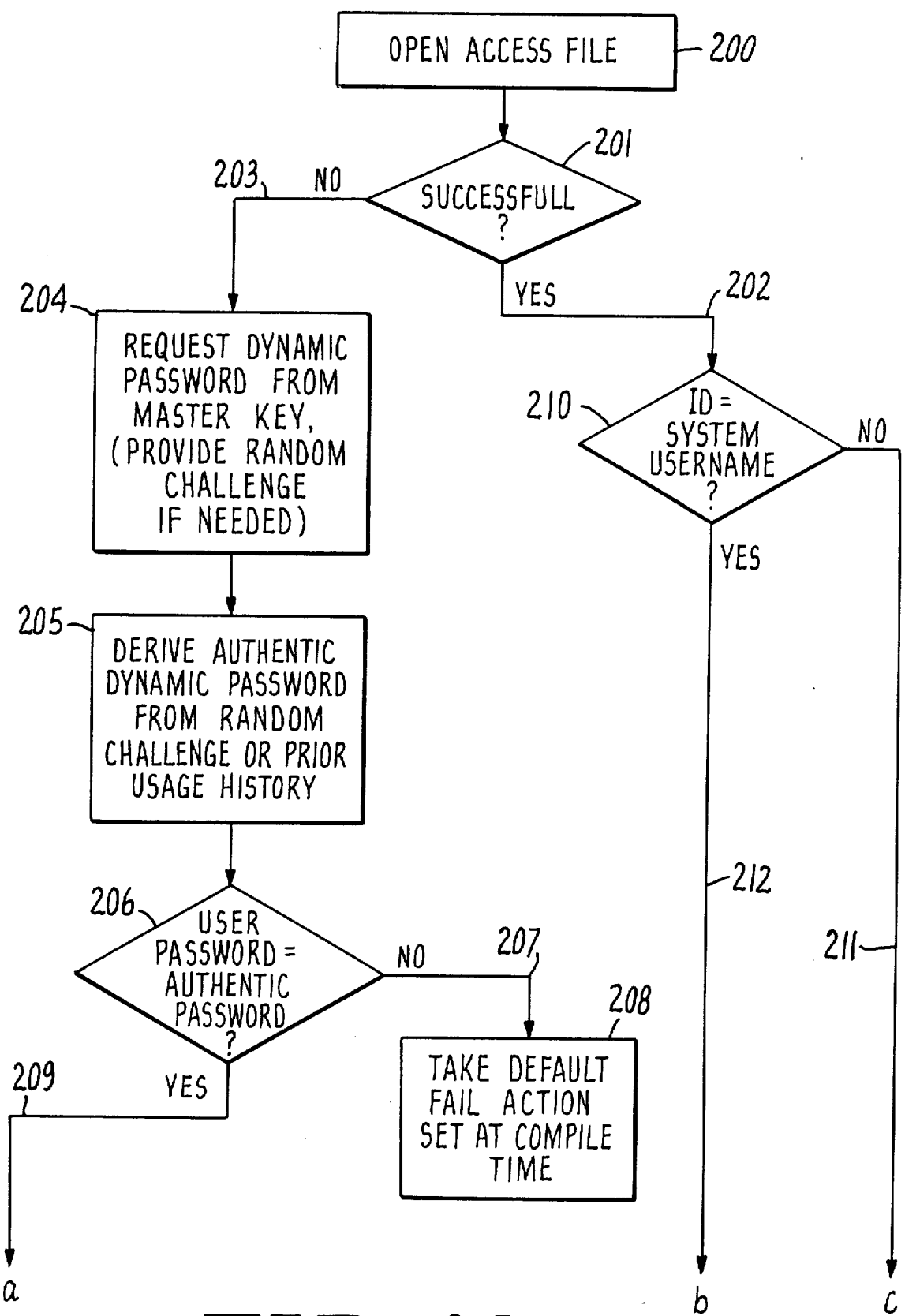
Figure 4C:
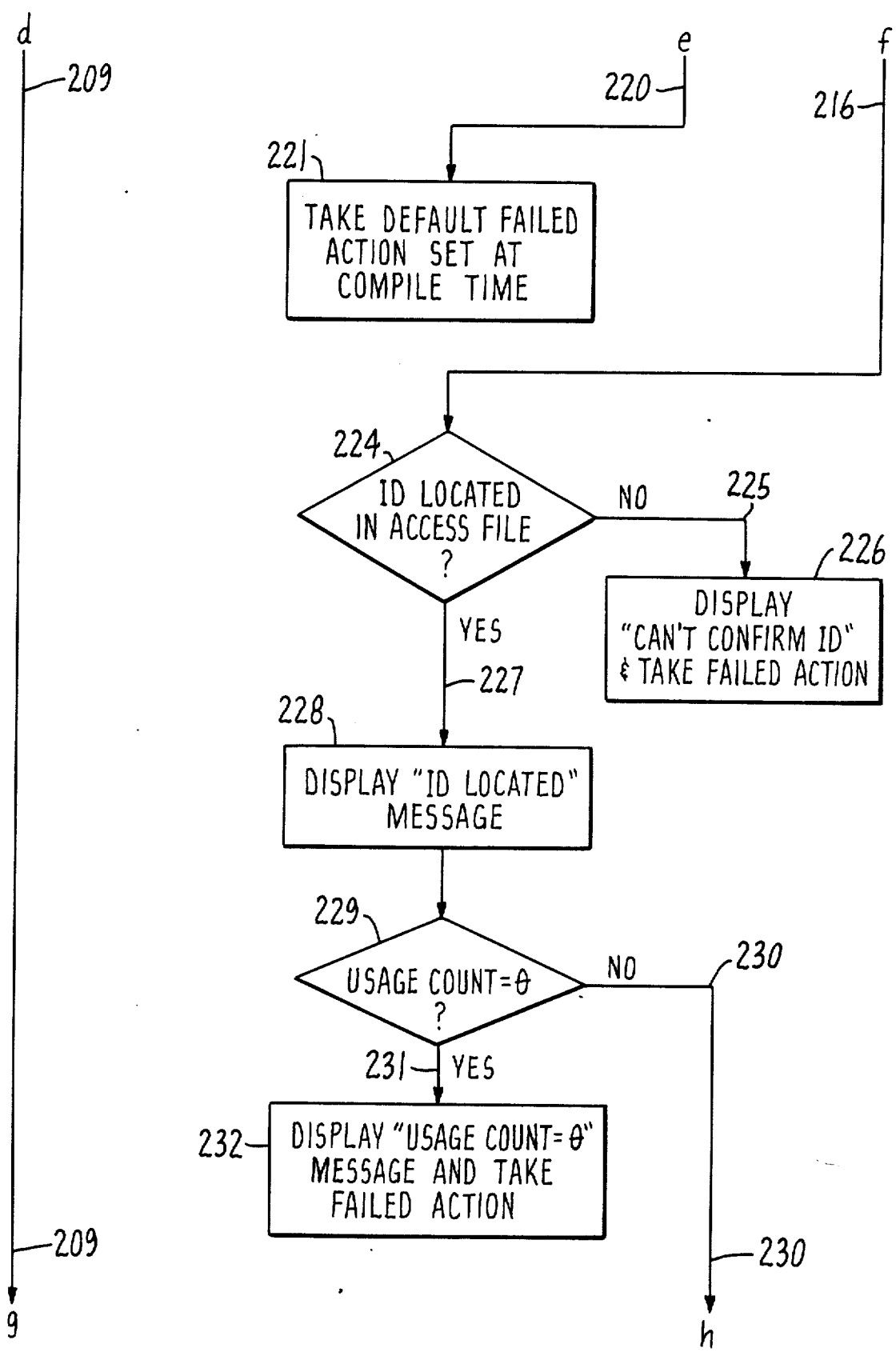
Figure 4D:
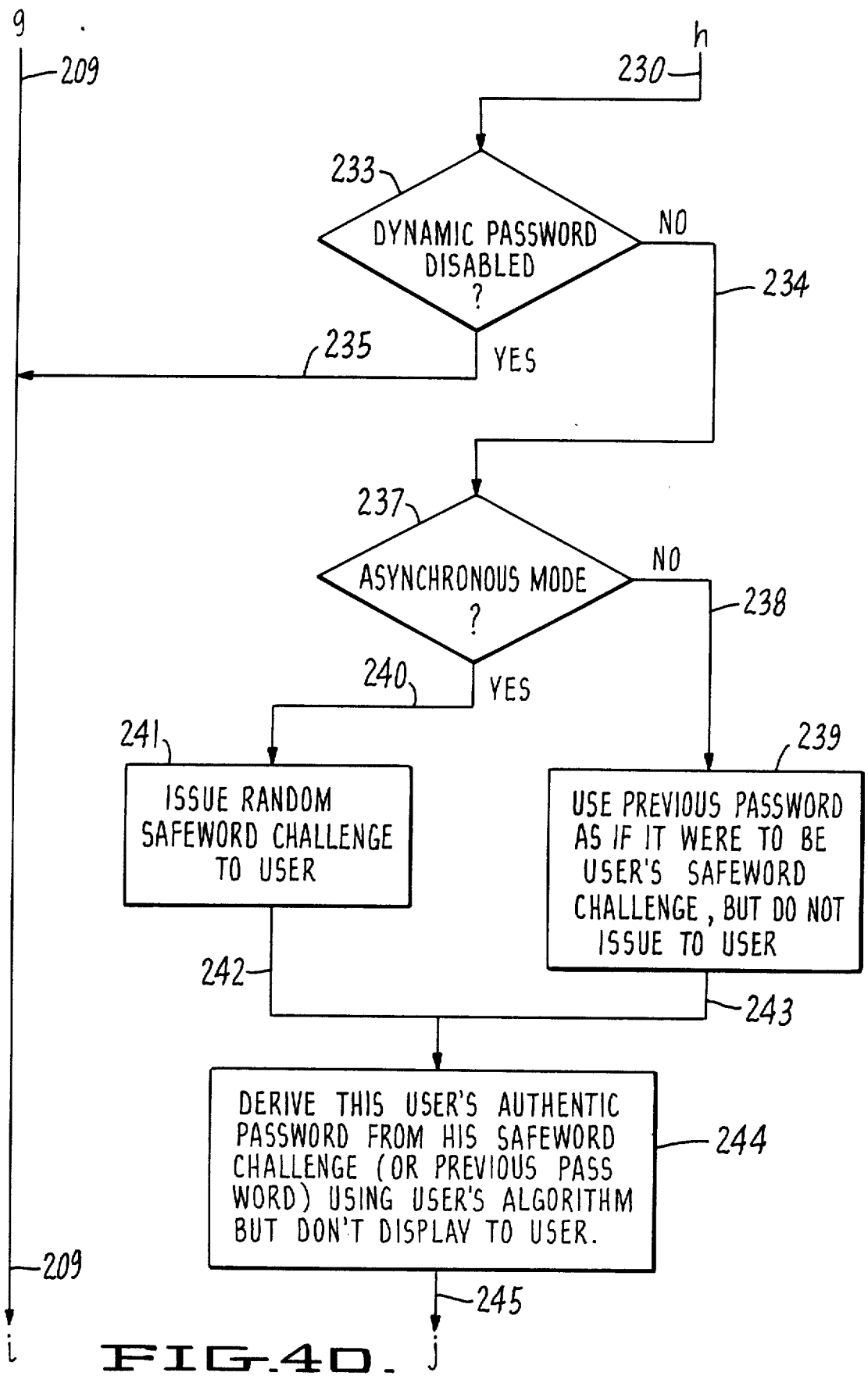
Figure 4E:
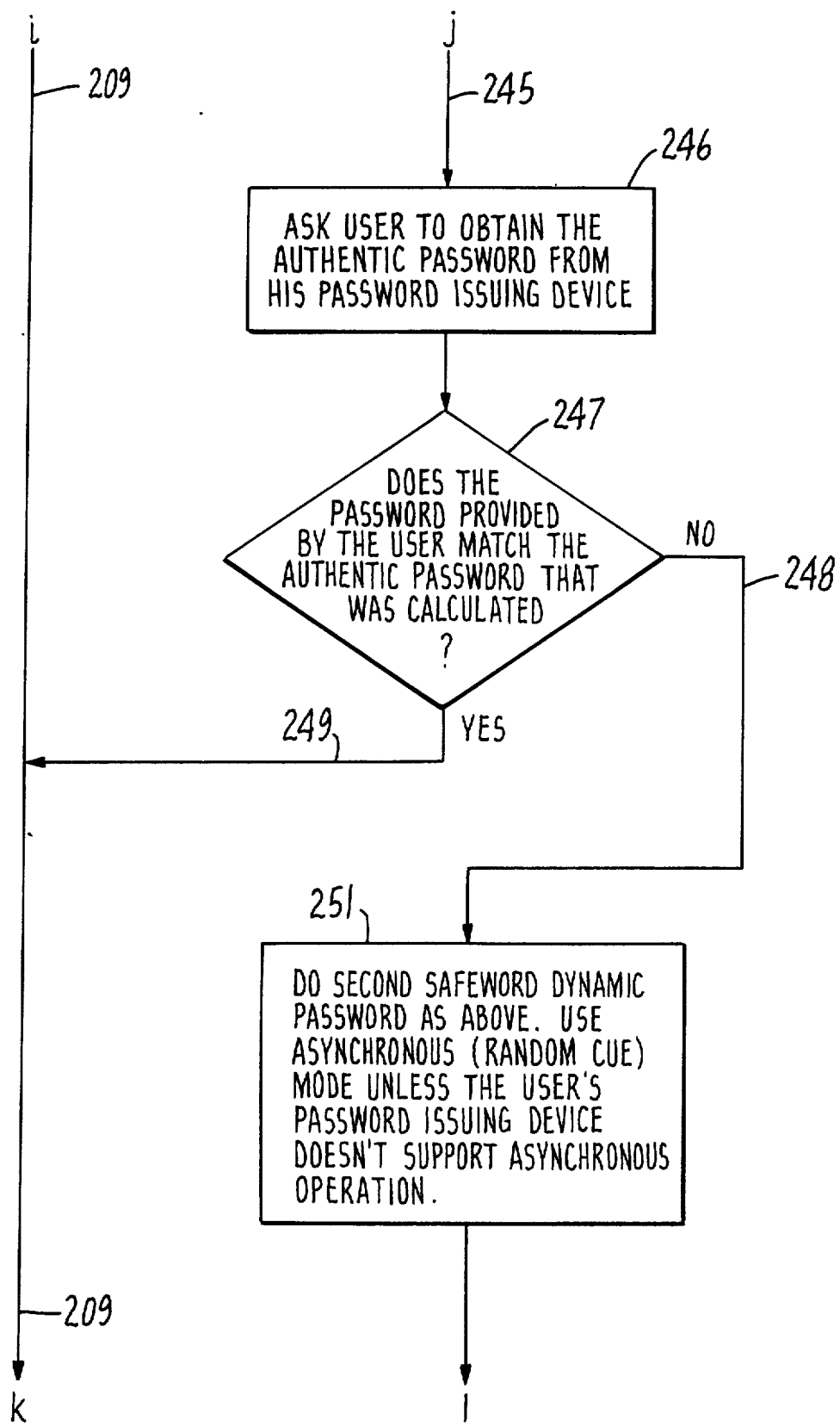
Figure 4F:
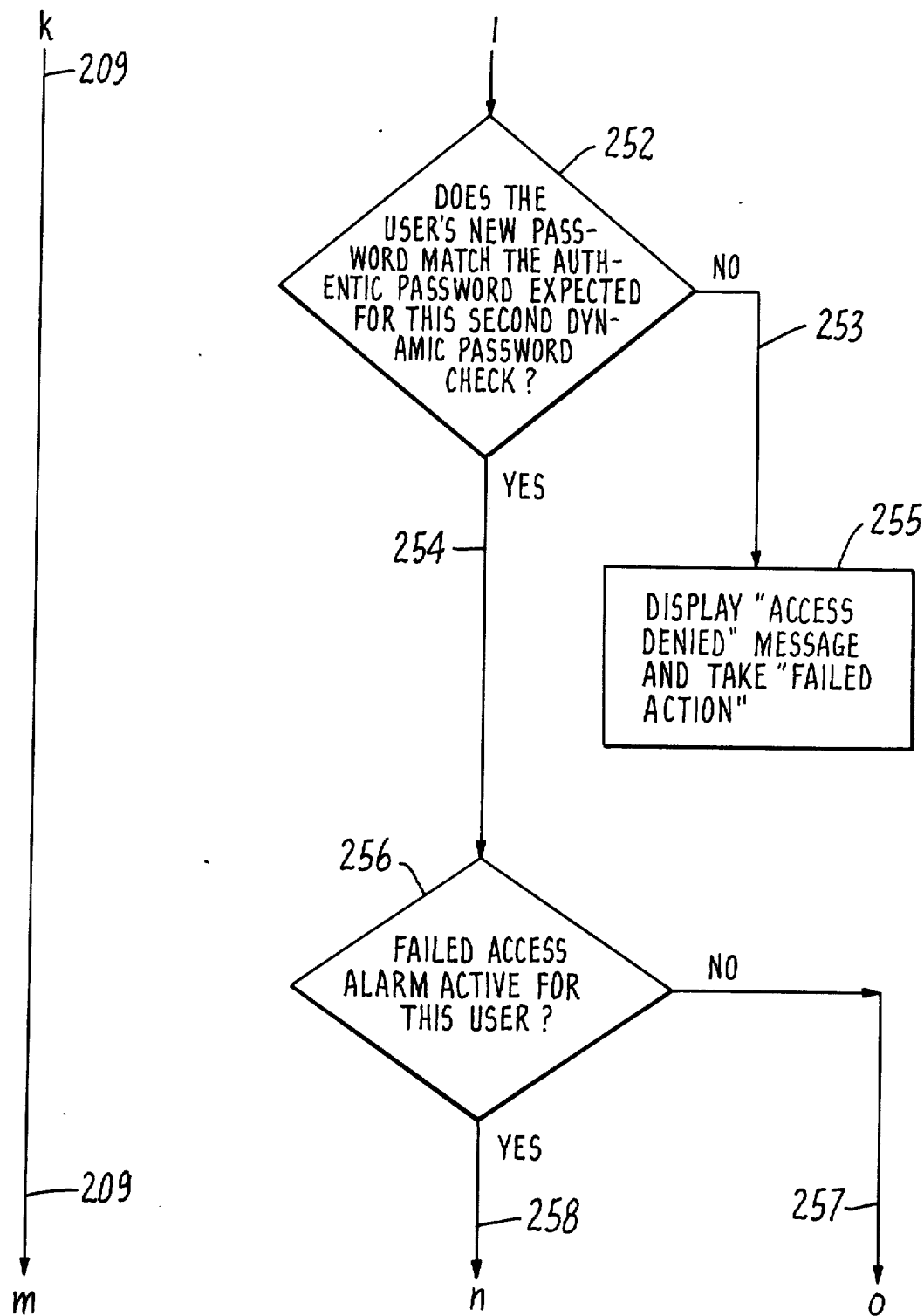
Figure 4G:
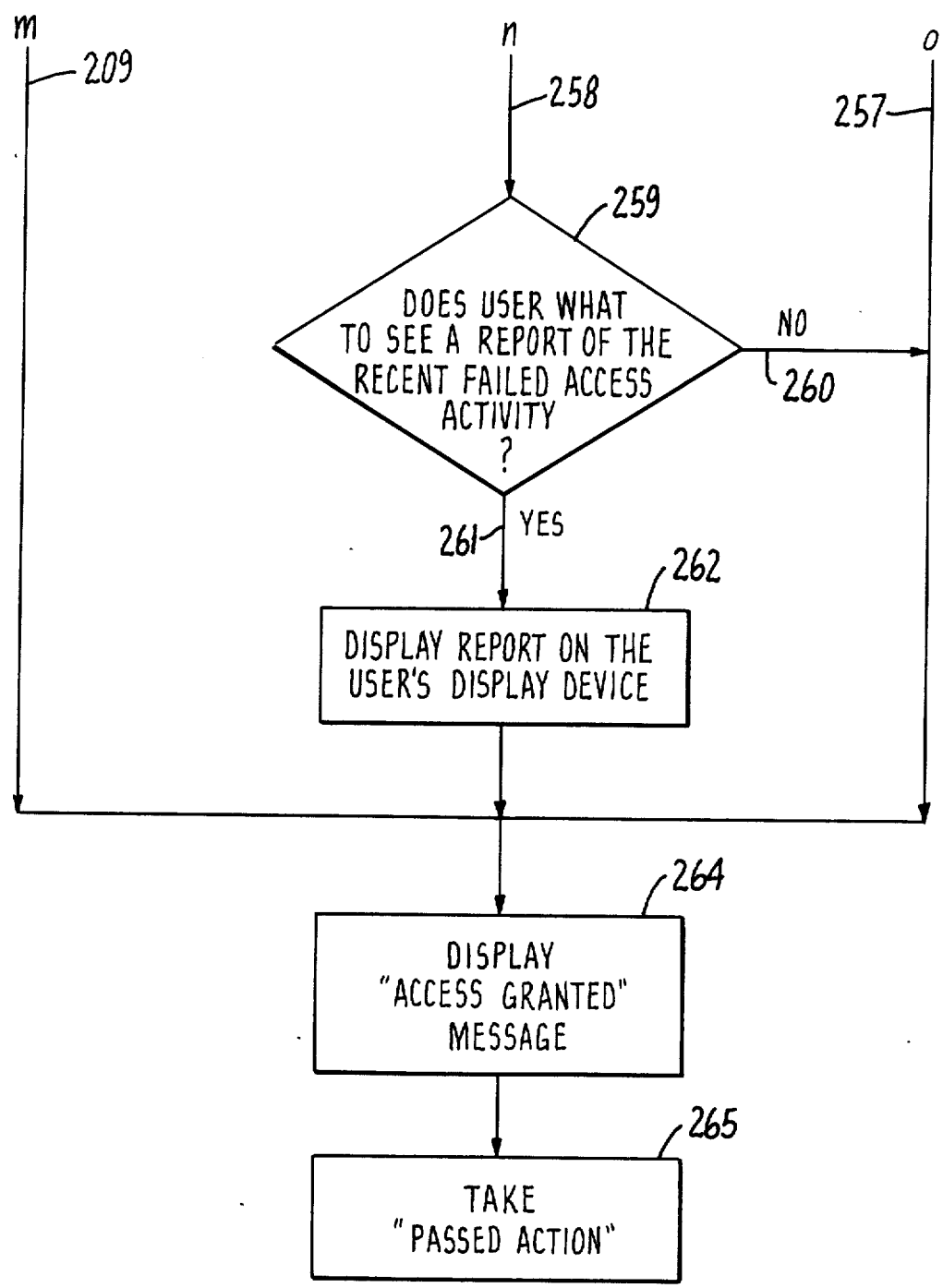

If, on the other hand, the two passwords match, or are related in accordance with some predetermined criterion, i.e., the comparison is favorable, then a message indicating "Access Granted" is displayed (Step 264, FIG. 4G) on display device 44 to the access seeker, who possesses the MASTER password issuing device, and a prespecified (default) "Passed Action" associated with the MASTER password issuing device (permanently preestablished) is taken at step 265 (FIG. 4G).

The preceding paragraphs have dealt with the possibility that the Access File might not be successfully opened. In the more frequent event that the Access File is successfully opened, then the access control program logic continues from step 201 to step 210 via flow line 202 by the searching of the Access File for instructions as to how to request the purported identity of the accessant. If the Access File indicates that the purported identity can be obtained from other programs within the same (or an interconnected) computer system, via flow line 212, then the access seeker's purported identification is obtained from such other programs (usually the operting system) at step 213 (FIG. 4B). Otherwise, the program branches from decision step 210, via flow line 211, and the access seeker is asked for his or her purported identification at step 215 (FIG. 4B).

In either event (step 213 or step 215) the access seeker's purported identification is tested to see if it is "MASTER" at step 214 (FIG. 4B). If so, then a password is requested from the MASTER Key at step 217, compared with the authentic MASTER password (derived at step 218) at step 219, and MASTER access is granted at step 264 (FIG. 4G) if the comparison is favorable. If the comparison is unfavorable decision step 219 branches to flow line 220, whereafter access is denied at step 221 (FIG. 4C). In any event, deriving from the purported identification "MASTER", the logic is very similar to that previously described, so that the elements of the flow chart of FIG. 4 designated 217, 218, 219, 220, and 221 correspond very closely with the previously discussed elements of the flow chart of FIG. 4 designated as 204, 205, 206, 207, 208, respectively.

Usually the test at decision step 214 (FIG. B) will reveal that the access seeker's purported identification is something other than "MASTER". In this event, decision step 214 branches to flow line 216, and an attempt is made at step 224 (FIG. 4C) to locate the access seeker's purported identification in the Access File. If the purported identification cannot be located, decision step 224 branches to flow line 225, and thus the program proceeds to step 226, which results in the displaying on display device 44 of a passage indicating the same, access is not granted to information sequestered in digital computer 42, and a predetermined failure action is taken at step 226.

If the test of step 224 results in the locating of the access seeker's purported identification, the program branches to flow line 227, a message indicating that the access seeker's purported identification has been located is displayed on display device 44 at step 228, and records in the Access File corresponding with this purported identification are consulted to see if the associated "Usage Count" has been exhausted (229).

The Usage Count is maintained in a counter, which is decremented at the time of each authorized access. Separate usage counters are maintained in the Access File for each authorized accessant. Each such usage counter can be initially set to a value greater than zero, allowing the corresponding authorized accessant a proportional number of accesses.

If the usage count associated with the purported identification of the access seeker has previously been decremented to zero, as indicated by a branching to flow line 231, then a message so indicating is displayed on display device 44, and a predetermined failure action is taken at step 232 (FIG. 4C).

If the usage count is nonzero, decision step 229 branches to flow line 230, whereupon the Access File is further consulted, at step 233 (FIG. 4D) to see if the access seeker should be required to provide a Dynamic PassWord, i.e., a password issued by a password issuing device of the kind shown and described herein. If the Dynamic PassWord check has been disabled at decision step 233, the program proceeds along flow line 235 to steps 264 and 265 (FIG. 4G) whereat access to sequestered information in digital computer 42 is granted (step 264) and an appropriate message is displayed (step 265), as previously discussed.

In the usual course of operation of the access control program, the test at decision step 233 reveals that the access seeker should be required to pass through a Dynamic PassWord test. Thus, the program branches via flow line 234 to step 237 (FIG. 4D), and the Access File is consulted to see if the access seeker should be in possession of a password issuing device which operates in the asynchronous mode. If so, decision step 237 branches to flow line 240, and thus to step 241, at which a random challenge is issued to the access seeker. Otherwise, the program follows flow line 238 to step 239, whereat the previous password is selected for subsequent use in password calculation by digital computer 42. The particular example given at step 239 of the flow chart uses the previous password for this purported identification, as if it were the access seeker's random challenge.

In any event (239 or 241), the authentic password which should be provided by the password issuing device in the possession of the corresponding authorized accessant is derived at step 244. At step 246 (FIG. 4E) the access seeker is asked to provide the purported password, and at step 247 the two are compared. If the comparison is favorable, i.e., either a match or a correspondence in accordance with a predetermined relationship, an appropriate message is displayed at step 264 (FIG. 4G), and the access seeker's associated "Pass Action" (which may be stored in the Access File) is taken at step 265. In the system of the present invention, this "Pass Action" includes enabling the cryptomodules 58, 60, 62. This encryption may be enabled immediately, or upon receipt of prespecified data from the access seeker, or after transmission of prespecified data to the access seeker. The Pass Action may also include "self-examination" logic, wherein important portions of the security program logic are examined to verify that they have not been tampered with, and to make appropriate action (such as causing the cryptomodules to operate improperly by passing incorrect values to them) if tampering is detected.

If the comparison at step 247 is unfavorable, and the program branches via flow line 248, it is usually best to request a second Dynamic PassWord, to give the access seeker a second chance, since it is possible that an "honest mistake" (such as a keyboard error) was made in the previous response. Usually it is best to use the asynchronous challenge mode in this "second chance" Dynamic PassWord test. This challenge is issued at step 251, and the access seeker's purported password is compared with the internally generated authentic password at step 252 (FIG. 4F). If the comparison is again unfavorable step 252 branches to flow line 253, access to the desired sequestered information in visual computer 42 is not granted, an appropriate message is displayed on display device 44, and a failure action (which may be read from the Access File or which may be permanently predetermined) is taken at step 255.

If the comparison at step 252 is favorable, and the program proceeds along flow line 254, then the access seeker is deemed to be the identified authorized accessant, and additional information is read from the corresponding area of the Access File. The Access File may indicate, for example, that previous attempts to gain access used the same purported identification unsuccessfully. (Such data is stored at access denied points such as 208, 221, 226, and 255.) This condition is tested at step 256, and if it is present, as indicated by branching along flow line 258, the now recognized authorized accessant is asked if he or she wants to see a summary report detailing the date and time, etc. at step 259 (FIG. 4G). If such a report is desired, and invokes a branching on flow line 261, this report is displayed on display device 44 at step 262 (FIG. 4G). In any event, whether the now recognized authorized accessant is offered the report of step 259 or wants (flow line 261) or does not want (flow line 260) a failure report, an "Access Granted" message is displayed at step 264, and a "Pass Action" is taken. The "Pass Action" may be read from data in the Access File, which corresponds with this authorized accessant's identification, or it may be a prespecified "global default".

In the system of the present invention, the Pass Action includes enabling cryptomodules 58, 60, 62 in accordance with instructions stored in the Access File pertaining to this authorized accessant. This encryption/decryption step may be enabled immediately, or after receipt of prespecified data from the authorized accessant, or after transmission of prespecified data to the authorized accessant. The Pass Action may also include "self-examination" logic of the sort illustrated in Appendix E, wherein the parameters passed to the cryptomodules are incorrect if the program has been tampered with.

A typical computer program capable of producing the "Access File" referred to in the preceeding discussion of the flow chart of FIG. 4 is included herewith in source code listing form as Appendix D.

THE APPENDICES

In order to assure that the present specification and drawings are sufficient to enable one having ordinary skill in the computer art to practice the present invention, the present specification is supplemented with five appendices, A, B, C, D and E, which may be described as follows.

Appendix A is a program listing setting out in detail, in the "C" programming language, a computer program implementing lock supervision module 74, challenge module 64, response module 66, and comparison module 68, in forms which can be employed in many embodiments of the present invention. Many well known computers which may be used as a part of an access-controlled computer system of the present invention are provided with compilers whereby the program of Appendix A can be automatically compiled into the machine language of that particular computer, and the employment of such compilers to adapt the program of Appendix A for use in any such computer is within the scope of one having ordinary skill in the computer art, informed by the present disclosure, without the exercise of invention or undue experimentation. As indicated in Appendix A, systems embodying the present invention are sometimes called "SafeWord systems".

Appendix B is a program listing setting out in detail a program which may be utilized in password issuing devices used to gain access to a secure environment created under the direction of the program disclosed in Appendix A. While this password issuing device program is written in the "C" programming language, it can be converted into the machine language of the microcomputer chip used in those password issuing devices by one having ordinary skill in the computer programming art, informed by the present disclosure, without the exercise of invention or undue experimentation. The "loading" of the thus converted program of Appendix B into the onboard memories of the computer chips of these password issuing devices falls well within the scope of those having ordinary skill in the computer art, employing well known techniques and widely available equipment.

Appendix C is a glossary of the terms used in the other appendices, which terms are not part of the "C" programming language or widely known and generally well understood computer engineering terminology.

Appendix D is a program listing setting out in detail a program which may be utilized to implement a "Lock management module" 72 of the type which may be used with the present invention. While this program is written in the "C" programming language, it can be converted into other languages as needed by one having ordinary skill in the computer programming art, informed by the present disclosure, without the exercise of invention or undue experimentation.

Appendix E is a program listing setting out in detail a program which may be utilized to implement interface module 70 of the present invention. Appendix D illustrates several of the many different techniques which may be used to pass parameters between cryptomodules 58, 60, 62 and the remaining modules of the present invention in a way which defies examination and attack by unauthorized usurpers. While the program is written in the "C" programming language, it can be converted into other languages as needed by one having ordinary skill in the computer programming art, informed by the present disclosure, without the exercise of invention or undue experimentation. The realization of cryptomodules 58, 60 and/or 62 and the adaptation of the same to receive these parameters and carry out the corresponding cryptographic operations can be accomplished by one having ordinary skill in the computer art, informed by the present disclosure, without the exercise of invention or undue experimentation.

GLOSSARY

The following definitions of terms used in the present specification and claims are provided in order to assure that the present disclosure is amply sufficient to enable one having ordinary skill in the computer art to practice the present invention. It is to be understood, however, that this glossary is not exhaustive, but is merely supplemental to the express and implied definitions of terms found throughout the present specification.

The term "unmodified computer" as used herein denotes any digital computer which when unprovided with an access control program of the present invention is incapable of coacting with any password issuing device of the present invention to control access to sequestered information in accordance with the principles of the present invention.

The term "multi-user-accessible" as applied to digital computers herein denotes that such digital computers are not maintained under strict physical security conditions to prevent access thereto by all but a very few authorized persons.

The term "cryptoalgorithm" as used herein denotes an algorithm by means of which information can be both encrypted and decrypted. Thus, a cryptoalgorithm will be seen to include both an encrypting algorithm and a decrypting algorithm, although some well known cryptoalgorithms are essentially "bi-directional" in that the same cryptoalgorithm or a minor modification thereof serves to decrypt information which was encrypted by the same cryptoalgorithm.

The term "terminating event" as used herein denotes any event to which the unmodified digital computer of an embodiment of the present invention responds by ceasing to encrypt and decrypt information. Thus, a "terminating event" as that term applies to the first preferred embodiment of the present invention might be, e.g., the depowering of digital computer 42 due to line power loss, etc.; the insertion into the direct access memory of CPU 46 of a new access control program; the erasure of the currently-operating access control program from the direct access memory of CPU 46; etc.

The term "translation function" as used herein denotes the mathematical process or procedure applied by the circuitry of a password issuing device to a cue emitted by digital computer 42 in order to determine the correct corresponding password.

The term "function" is used herein in its broadest acceptation to denote a set of ordered pairs of numbers or other words no two of which pairs have the same first entry. For any function, the set of its first entries is denominated as its "domain", and the set of its second entries is denominated as its "range". In the terminology adopted herein, the result of "applying" a function to an entry in its domain is the determination of the corresponding entry in its range, without regard to the method by which that determination is made. See e.g., Ideas in Mathematics by M. Evans Monroe, Addison-Wesley Publishing Company, 1968, pages 10 and 11. The term "word" is used herein it its broadest acceptation to denote any group of characters, whether numerical, alphabetic, or otherwise.

The term "virtual" as used herein denotes apparatus which itself has no separate physical existence, but rather is simulated in the operation of a digital computer by means of suitable programming.

The term "actual" as used herein is an antonym to the word "virtual" as defined immediately hereinabove.

It will thus be seen that the objects set forth above, among those made apparent from the preceding description, the accompanying drawings, and Appendices A, B, C, D, and E, are efficiently attained, and since certain changes may be made in the above constructions and the methods carried out thereby without departing from the scope of the present invention it is intended that all matter contained in the above discussion or shown in the accompanying drawings and appendices shall be interpreted as illustrative only, and not in a limiting sense.

It is also to be understood that the appended claims are intended to cover all of the generic and specific features of the present invention hereindescribed, and all statements of the scope of the present invention which, as a matter of language, might be said to fall therebetween.

Appendix A

```
/*
*
*   ID.C     Identification verification program
*
*   Copyright (c) 1984  Enigma Logic, Inc.  All rights reserved
*
*   Uses IDSD & IDMISC
*
*   12/15/84 Jim Tucker  ver 0.1, demonstration version
*   2/10/85  Jim Tucker  ver 0.2, encyphered data files
*            added supervisor entry option
*            moved some code to IDMISC
*   2/14/85  Jim Tucker  made main an infinite loop
*            changed names: pause()->pauser()
*            time()->timestr(),date()->datestr()
*            changed msgs from 'any key' to [RET]
*
*   3/25/85   V1.0  Jim Tucker added opt echo, user id, b-tree
*         p, exec file opt.
*
```

```
*
* 4/10/85    V1.1  Jim Tucker moved verify code to idmisc, added
*                  MASTER entry, calls initenv()
*/ include <stdio.h>
include "iddef.h"
#include "algo.h"

extern char *idtitle[];
extern char *grantmsg[], *failmsg[];
extern char *alarmsg[], *queryrpt;
extern char *xprompt, *cprompt, *nxdflt, *nodflt;
extern int  domaster;      /* set = master entry */
int    errflg;
int    gid, gal;

static char *noafile[] = {
"\n",
"Since the user access data can not be read, only the System Supervisor may\n",
"gain entry. The following security check requires the Master Key.\n\n",
 0
};

main() {
   char idin[IDSIZ + 5];

initenv();
   domaster = 0;
   errflg = 0;
   putmsg(idtitle);
   if(!getaparm())
      goto err;
   if((gid = getu(idin, sizeof(idin), aparm.idecho, aparm.cap, aparm.useuser)) < 0
      goto err;
   if(!gid)
      gonogo();
   if((gal = getalgo(idin)) < 0)
      goto err;
   if(!gal)
      gonogo();
   if(domaster)
      goto doma;
   if(verified()) {   /* run security check on user */
      gogo();
   } else {
      if(!domaster)
         savekpwd(fail.key1, fail.pass1);
      if(verified()) {
         gogo();
      } else {
         if(!domaster)
            savekpwd(fail.key2, fail.pass2);
         gonogo();
      }
   }
   exit();
err:
   errflg = 1;
   putmsg(noafile);
   genrnd();
doma:
   if(master())
      gogo();
```

```
        else
            gonogo();
} gonogo() {
    if(!domaster && gal > 0)
        failed();
    if(errflg)
        nogo(nxdflt,ncdflt);
    else
        nogo(aparm.nxfile,aparm.nxcmd);
} gogo() {
    if(!domaster) {
        passed();
        go(aparm.xfile, aparm.xcmd);
    } else {
        putmsg(grantmsg);
        if(!errflg) {
            if(yes("\nTake normal exit?"))
                go(aparm.xfile, aparm.xcmd);
        }
        printf("\n");
        putline(xprompt);
        if(getstr(aparm.xile, sizeof(aparm.xfile), 1)) {
            if(*cprompt) {
                putline(cprompt);
                getstr(aparm.xcmd, sizeof(aparm.xcmd), 1);
            } else
                *(aparm.xcmd) = 0;
        }
        go(aparm.xfile, aparm.xcmd);
    }
} passed() {      /* update access & user files, report if any */
    if(access.flags & 2) {   /* if alarm flag set */
        putmsg(alarmsg);
        if(yes(queryrpt))
            report();
    }
    upduser(1);    /* udate user file */
    updaccess(0);  /* reset alarm, update seed */
    putmsg(grantmsg);
} failed() {     /* set alarm, update all logs, issue msg */
    upduser(0);
    updfail();
    updaccess(1);
    putmsg(failmsg);
} static char *rep[] = {
"\nInformation for report not found.",
"\nEnd of report.",
"\n\nPress [RET] to continue ",
 0
};

report() {         /* report failures from fail file */
    unsigned short rec;
    int repcnt = 0;
```

```
   if(!getfparm())
       return;
   if(fparm.last) {
       if(access.faillnk <= fparm.last)
           repcnt = reprec(access.faillnk);
   }
   if(!repcnt)
       putline(rep[0]);
   else
       putline(rep[1]);
   putline(rep[2]);
   pauser();
   printf("\n");
   return;

reprec(rec)      /* report fail info if id matches, ret cnt */
   unsigned short rec;
{
   long pos;
   int repcnt = 0;

if(!rec)
      return(repcnt);

do {
   if(!getfrec(rec))
      return(repcnt);
   if(fail.reported || strcmp(access.aid, fail.fid) != 0)
      return(repcnt);
   else {
      if(repcnt == 0)
         rephead();
      repcnt += 1;
      if(repcnt % 20 == 0) {
         putline(rep[2]);
         pauser();
         rephead();
      }
      printf("%s ", fail.fdate);
      printf("%s ", fail.ftime);
      printf("%s ", fail.key1);
      printf("%s ", fail.pass1);
      putchars(' ', 4 - strlen(fail.pass1));
      printf("%s ", fail.key2);
      printf("%s", fail.pass2);
      putchar('\n');
      fail.reported = 1;
      if(!putfrec(rec))
         return(repcnt);
   }
       rec = fail.fidlnk;
   } while(rec && rec <= fparm.last);
   return(repcnt);
} static char *reph[] = {
"\n\nDate",
"Time",
"Kwd",
"Pwd",
 0
};
```

```
rephead() {            /* print report header to scr */
    putline(reph[0]);
    putchars(' ',DATESIZ - 3);
    putline(reph[1]);
    putchars(' ',TIMESIZ - 3);
    putline(reph[2]);
    putchars(' ',KWDSIZE - 2);
    putline(reph[3]);
    putchars(' ', 2);
    putline(reph[2]);
    putchars(' KWDSIZE - 2);
    putline(reph[3]);
    putchars(' ', 2);
    putchar('\n');
    putchars('-', DATESIZ);
    putchar(' ');
    putchars('-', TIMESIZ);
    putchar(' ');
    putchars('-', KWDSIZE);
    putchar(' ');
    putchars('-', 4);
    putchar(' ');
    putchars('-', KWDSIZE);
    putchar(' ');
    putchars('-', 4);
    putchar('\n');
}
/*
*
*  IDSD.C      System dependancies module for ID & IDUTIL
*
*  Copyright (c) 1984  Enigma Logic, Inc. All rights reserved
*
*  12/15/84    V0.1    Jim Tucker
*  2/10/85     V0.2    Jim Tucker      Added parms to execution
*                                      added hide()
*                                      made pause() change random #
*  2/14/85             Jim Tucker      changed names: date()->datestr()
*                                      time()->timestr(),pause()->pauser()
*                                      added VAX stuff for all except go()
*                                      and nogo() and hide(). Note that
*                                      hide is probably unneccesary for VAX.
*  3/25/85     V1.0    Jim Tucker      added loops to vax file funcs, added
*                                      getu(), more default files, copyf(),
*                                      getid(), genrnd()(), execute
*                                      file opt., echo opt on getstr(),
*                                      allow esc from yes(), puteol()
*
*  4/10/85     V1.1    Jim Tucker      made ID source run time option, addded
*                                      environment intialization, added
*                                      logical dir spec for VMS
*/ include <stdio.h>
include "sys.h"
#include "iddef.h"

/* sys.h defines:                                              */
/*      one of: MSDOS, VMS          (operating sys) */
/*      one of: VANILLA, IBM, ANSI  (display type)  */
/*      one of: C88, VAX11C         (compiler)      */
```

```
#ifdef VMS
ifdef VAX11C
#define VAX
#include time
#include iodef
#include descrip
#include ctype
#include signal
/* set TRYxxxx to number of times to attempt to do file i/o before quiting */
#define TRYOPEN 50
#define TRYREAD 50
#define TRYWRIT 50
#endif
endif /*      Messages to user        */ char *idtitle[] = {
"\n\nSafeWord Security Check\n",
 0
};

char *idprompt[] = {
"\nID: ",
 0
};

char *failmsg[] = {
"",
 0
};

char *alarmsg[] = {
"",
 0
};

char *queryrpt = "\nReport failed access attempts?";

char *grantmsg[] = {
"",
 0
};

#ifdef MSDOS
char *xprompt = "Enter name of file to execute: ";
char *cprompt = "Enter parameter line: ";
char *xhead = "\n\tName of file to execute: ";
char *chead = "\n\tParameter line: ";
char *mxdflt = "";      /* default failed access execution data */
char *mcdflt = "";      /* can use a space here to defeat error stat exit */
endif
ifdef VMS
char *xprompt = "Enter command line: ";
char *cprompt = "";
char *xhead = "\n\tCommand line: ";
char *chead = "";
char *mxdflt = "";      /* default failed access execution data */
char *mcdflt = "";      /* can use a space here to defeat error stat exit */
endif /*      Log and access file names       */
```

```
#ifdef MSDOS
char *afile = "IDUDATA.ENC";      /* name of access file */
char *ifile = "IDINDEX.ENC";      /* name of access index file */
char *bafile = "IDUDATA.BUP";     /* name of access file backup */
char *bifile = "IDINDEX.BUP";     /* name of access index file backup */
char *ufile = "IDUSAGE.ENC";      /* name of usage file */
char *ffile = "IDFAIL.ENC";       /* name of fail file */
char *ulfile = "IDUSAGE.LOG";     /* name if default usage log text file */
char *flfile = "IDFAIL.LOG";      /* name of default fail log text file */
#endif
ifdef VMS /* IDDIR is a logical name designating the location of the ID support files */
/* ASSIGN IDDIR to appropriate device and directory upon installation */ char *afile = "IDDIR:IDUDATA.ENC";    /* name of access file */
char *ifile = "IDDIR:IDINDEX.ENC";    /* name of access index file */
char *bafile = "IDDIR:IDUDATA.BUP";   /* name of access file backup */
char *bifile = "IDDIR:IDINDEX.BUP";   /* name of access index file backup */
char *ufile = "IDDIR:IDUSAGE.ENC";    /* name of usage file */
char *ffile = "IDDIR:IDFAIL.ENC";     /* name of fail file */
char *ulfile = "IDDIR:IDUSAGE.LOG";   /* name if default usage log text file */
char *flfile = "IDDIR:IDFAIL.LOG";    /* name of default fail log text file */
endif ifdef MSDOS                     /* end of line string for write() */
ifdef C88
        char *eol = "\r\n";
#endif
endif
ifdef VMS
ifdef VAX11C
        char *eol = "\n";
#endif
endif char copybuf[CBUFSIZ];           /* buffer for copyf() */ extern unsigned rnd1, rnd2;

/*      General system dependant functions      */ ifdef VMS
/* old cntrl char mask for vms */
        unsigned long oldmsk;
/* ctrl-c signal action function */
        int ctlchan();
endif initenv() {    /* initialize environment for ID, do this function first */
ifdef VMS
ifdef VAX11C
        unsigned long dismsk = 0x02100000;

LIB$DISABLE_CTRL(&dismsk, &oldmsk);   /* turn off ctrl-y,t traps */
        signal(SIGINT, ctlchan);              /* trap ctrl-c */
#endif
endif
}
```

```
uninitenv() {              /* restore environment, do tis last */
#ifdef VMS
ifdef VAX11C
        LIB$ENABLE_CTRL(&oldmsk);      /* restore traps */
#endif
endif
} ifdef VMS
ifdef VAX11C
ctlchan() {                            /* ctrl-c interupt handler */
        signal(SIGINT, ctlchan); /* reset trap ctrl-c */
}
endif
endif go(xprog, xparm)                              /* chain to application */
        char *xprog, *xparm;
{
#ifdef MSDOS
ifdef C88
        if(*xprog)
                chain(xprog, xparm);
        uninitenv();
        exit(0);
#endif
endif
ifdef VMS
        struct dsc$descriptor_s  cmdstr;

if(*xprog) {
                cmdstr.dsc$w_length = strlen(xprog);
                cmdstr.dsc$b_dtype = DSC$K_DTYPE_T;
                cmdstr.dsc$b_class = DSC$K_CLASS_S;
                cmdstr.dsc$a_pointer = xprog;
                uninitenv();
                LIB$DO_COMMAND(&cmdstr);
        }
        uninitenv();
        exit(1);
#endif
} nogo(xprog,xparm)                             /* chain to fail prog if any */
        char *xprog, *xparm;
{
#ifdef MSDOS
ifdef C88
        if(*xprog)
                chain(xprog, xparm);
        uninitenv();
        exit(2);
#endif
endif
ifdef VMS
        struct dsc$descriptor_s  cmdstr;

if(*xprog) {
                cmdstr.dsc$w_length = strlen(xprog);
                cmd.dsc$b_dtype = DSC$K_DTYPE_T;
                cmdstr.dsc$b_class = DSC$K_CLASS_S;
```

```
                cmdstr.dsc$a_pointer = xprog;
                uninitenv();
                LIB$DO_COMMAND(&cmdstr);
        }
        uninitenv();
        exit(40);
#endif
} ifdef C88
define bdos    _os
endif ifdef MSDOS
extern char bdos();
endif ifdef C88
unsigned _rax, _rbx, _rcx, _rdx;        /* _doint() interface */
unsigned _rsi, _rdi, _res, _rds;
unsigned _carryf, _zerof;
endif hide(xprog)                    /* hide a program from the user, return success */
        char *xprog;
{
#ifdef MSDOS
ifdef C88
        int xfd;

if((xfd = open(xprog, 0)) < 0) {        /* ck for execute file */
                printf("\nWarning:\nCan't find file %s to hide it.", xprog);
                return(0);
        }
        close(xfd);

/* Hide execute file */
        _rds = -1;              /* set file atribute */
        _rdx = xprog;
        _rax = 0x4301;
        _rcx = 2;               /* 2 = hidden file */
        _doint(33);

return(1);
#endif
endif
} keyflsh()                                       /* Flush console buffer */
{
#ifdef MSDOS
        bdos(12);
#endif
} keyinx()                        Return console character (no echo)    */
{
#ifdef MSDOS
        return(bdos(8));
#endif
ifdef VMS
/*
```

VAX VMS system services call for geting a char from the terminal
with no echo and no filtering.

```
static  short   chan;
int status;
short   iosb[4];
char    buffer;
$DESCRIPTOR(tt, "TT:");

if(!chan) {
        status = sys$assign(&tt,&chan,0,0);
        if(!(status & 1))
                lib$stop(status);
}
status = sys$qiow(0,chan,IO$_TTYREADALL | IO$M_NOECHO,iosb,0,0,&buffer,1,0
if(!(status & 1))
                lib$stop(status);
        if(!(iosb[0] & 1))
                lib$stop(iosb[0]);
        return(buffer);
#endif
} keydn()                                 /* Return true if key typed */
{
#ifdef MSDOS
        return (char) bdos(11);
#endif
} keyinr()                /* Wait for console character and generate    */
{                       /* random number                              */
#ifdef MSDOS
        keyflsh();

while (!keydn()) {
                rnd1 += 3571;
                rnd2 += 3181;
        }
endif
ifdef VMS
        genrnd();
#endif
        return(keyinx());
} pauser() {              /* wait for key stroke, generate rnd# */
        keyinr();
} genrnd() {              /* generate rnd#, pause only if neccessary */
ifdef MSDOS
        printf("\tPlease press [RETURN] when ready to proceed ");
        pauser();
#endif
ifdef VMS
        rndrnd(rand(time(0)));
        rnd2 = rand();
#endif
} putcur(row, col)                                /* Move cursor */
int row, col;
```

```
{
#ifdef IBM
#ifdef C88
        _rax = 0x200;
        _rbx = 0;
        _rdx = (row << 8) | col;
        _rds = -1;
        _doint(16);
#endif
endif
#ifdef ANSI
        printf("\033[%d;%dH", row + 1, col + 1);
#endif
} clrscr()                                    /* Clear screen, home cursor */
{
#ifdef IBM
#ifdef C88
        _rax = 0x600;
        _rbx = 0x700;
        _rcx = 0;
        _rdx = (24 << 8) | 79;
        _doint(16);

putcur(0, 0);
#endif
endif
#ifdef ANSI
        putcur(0, 0);
        puts("\033[2J");
        msdly(50);

putcur(0, 0);
#endif
#ifdef VANILLA
        int i;

#ifdef VAX
        printf("\n\n\n");
#else
        for(i = 0; i < 24; ++i)
                printf("\n");
#endif
endif
} ifdef MSDOS
ifdef C88
#define DLY     43      /* 8088, 4.8 MHz             */
#endif
endif msdly(ms)                                   /* Delay some milliseconds     */
int ms;                                     /* Compiler & computer dependent */
{
#ifdef MSDOS
        unsigned i, j;

for(i = 0; i < ms; ++i)
                for(j = 0; j < DLY; ++j)
                        continue;
```

```
endif
ifdeMS
ifdef VAX11C
        unsigned dly;

dly = (ms + 500) / 1000;
        sleep(dly);
endif
endif penf(name, mode)                                        /* Open file */
har *name;                    /* mode 0=read, 1=write, 2=read/write */
nsigned mode;

ifdef C88
        return(open(name, mode));
endif
ifdef VMS
ifdef VAX11C
        int fd;
        int i;

i = TRYOPEN;
        while(i--) {
                if((fd = open(name, mode)) >= 0)
                        break;
        }
        return(fd);
endif
endif readf(fd, buf, n)                                       /* Read file */
        int fd, n;
        char *buf;

ifdef C88
        return(read(fd, buf, n));
endif
ifdef VMS
ifdef VAX11C
        int retcode;
        int i;

i = TRYREAD;
        while(i--) {
                if((retcode = read(fd, buf, n)) >= 0)
                        break;
        }
        return(retcode);
endif
endif writef(fd, buf, n)                                     /* write file */
        int fd, n;
        har *buf;

ifdef C88
        return(write(fd, buf, n));
endif
ifdef VMS
```

```
#ifdef VAX11C
        int err;
        int i;

i = TRYWRIT;
        while(i--) {
                if((err = write(fd, buf, n)) >= 0)
                        break;
        }
        return(err);
#endif
endif
} creatf(name)                                    /* Create file */
char *name;
{
#ifdef C88
        return(creat(name));
#endif
#ifdef VAX11C
        return(creat(name, 0600));      /* protection-mode: OWN R/W */
#endif
} unlinkf(name)                                   /* Delete file */
        char *name;
{
#ifdef VAX11C
        delete(name);
#else
        unlink(name);
#endif
} copyf(dest, sourc)                              /* copy file, ret success */
        char *dest, *sourc;
{
        int sfd, dfd, n;

if((sfd = openf(sourc, 0)) < 0) {
                filemsg(sourc, NOPEN);
                return(0);
        }
        if((dfd = creatf(dest)) < 0) {
                filemsg(dest, NCREAT);
                goto abo1;
        }
        do {
                if((n = readf(sfd, copybuf, sizeof(copybuf))) > 0) {
                        if(writef(dfcopybuf, n) < 0) {
                                filemsg(dest, NWRITE);
                                goto abo2;
                        }
                } else {
                        if(n < 0) {
                                filemsg(sourc, NREAD);
                                goto abo2;
                        }
                }
        } while(n);
        close(sfd);
```

```c
        close(dfd);
        return(1);
abo2:
        close(dfd);
        unlinkf(dest);
abo1:
        close(sfd);
        return(0);
} yes(msg)                                    /* Ask user yes or no   */
        char *msg;                          /* ret N = 0, Y = 1, Esc = -1 */
{
        char yorn;

putline(msg);
        printf(" (Y/N): ");
        for(;;) {
                yorn = keyinr() & 0xdf;
                if(yorn == 27) {
                        printf("\n");
                        return(-1);
                }
                if (yorn != 'Y' && yorn != 'N') {
                        printf("\007");
                        continue;
                } else
                        putchar(yorn);
                break;
        }
        printf("\n");
        return (yorn == 'Y');
} getstr(str, len, echo)                      /* get string from console */
        char *str;                          /* note that length includes 0 terminator */
        int len;
        unsigned short int echo;

char *p;

len -= 1;
    p = str;
    while(p < str + len) {
            *p = keyinr();
            if (*p == '\b' || *p == 0x7f) {
                    if (p > str) {
                            if(echo)
                                    printf("\b \b");
                            p -= 2;
                    } else
                            p--;
            } else if (*p == '\n' || *p == '\r')
                    break;
            else if (*p == 27) {
                    *str = *p++;
                    break;
            } else {
                    if(echo)
                            putchar(*p);
```

```
            }
            if(++p == str + len) {
                    keyinr();
                    break;
            }
    }
            *p = 0;
            printf("\n");
            return(strlen(str));
} ifdef VAX11C
char *index(string,chr)             /* return pointer to chr in string */
                                    /* return 0 if no chr found */
        char *string, chr;
{
        while(*string) {
                if(*string == chr)
                        return(string);
                string++;
        }
        return(0);
}
endif getu(name, size, echo, cap, useuser)                /* get user name */
        char *name;
        int size;
        unsigned short int echo, cap, useuser;
{
#ifdef MSDOS
        putmsg(idprompt);
        return(getid(name, size, echo, cap));
#endif
ifdef VMS
ifdef VAX11C
        char *cuserd;

if(useuser) {
                cuserid(name);
                return(1);
        } else {
                putmsg(idprompt);
                return(getid(name, size, echo, cap));
        }
endif
#eif
} capstr(str)
        char *str;
{
        while(*str) {
                if(isalpha(*str))
                        *str = toupper(*str);
                str++;
        }
} getid(name, size, echo, cap)        /* input idstr, ret got something */
        char *name;
        int size;
        unsigned short int echo, cap;
```

```
{
        if(!getstr(name, size, echo))
                return(0);
        if(*name != 27 && cap)
                capstr(name);
        return(strlen(name));
} char *timestr() {                               /* return str ptr to time */
        int hr, min;
        static char tstr[10];

#ifdef MSDOS
ifdef C88
        _rax = 0x2c00;  /* bdos func gettime */
        _rds = -1;
        _doint(33);
        hr = ((_rcx >> 8) & 0xff);
        min = _rcx & 0xff;
#endif
endif
ifdef VMS
ifdef VAX11C
        long t, time();
        struct tm *lt;

t = time(0);
        lt = localtime(&t);
        hr = lt->tm_hour;
        min = lt->tm_min;
#endif
endif
        sprintf(tstr, "%02d%02d", hr, min);
        return(tstr);
} char *datestr() {                               /* return str ptr to date */ int month, day;
        static char dstr[10];

#ifdef MSDOS
ifdef C88
        _rax = 0x2a00;  /* bdos func getdate */
        _rds = -1;
        _doint(33);
        day = _rdx & 0xff;
        month = (_rdx >> 8) & 0xff;
#endif
endif
ifdef VMS
ifdef VAX11C
        long t, time();
        struct tm *lt;

t = time(0);
        lt = localtime(&t);
        day = lt->tm_mday;
        month = lt->tm_mon + 1;
#endif
endif
        sprintf(&dstr[0], "%02d%02d", month, day);
        return(dstr);
```

```
}
putmsg(msg)                         /* Write multi-line message to screen */
char **msg;
{
        while (*msg)
                putline(*msg++);
} putline(str)                        /* write line to screen */
        char *str;
{
#ifdef VAX
        printf("%s",str);
#else
        while(*str)
                putchar(*str++);
#endif
} filemsg(name, i)                    /* Write file message   */
        char *name;
        int i;
{
        static char *fm[] = {
"Can't open file:",
"Can't create file:",
"Can't read file:",
"Can't write file:",
"Can't position file:",
"Can't configure file:",
"I/O error reading file:",
"I/O error writing file:",
 0
};
        printf("%s %s\n", fm[i], name);
}
/*
*
*       IDMISC.C
*
*       Misc common functions for ID & IDUTIL
*
* 2/10/85       V.2     JimTucker
* 2/14/85       V.2     Jim Tucker      took out keyflsh(), took out
*                                       Disk Full? filemsg
* 3/25/85       V1.0    Jim Tucker      get/putstruc() -> get/putblk()
*                                       shortened verify msgs
* 4/10/85       V1.1    Jim Tucker      added getalgo(), get/put log recs
*                                       and verify code, made MASTER entry
*                                       pwd entry takes 0,o,0
*/
include <stdio.h>
#include "algo.h"
#include "iddef.h"

char    kwd[KWDSIZE];               /* KeyWord array */
char    passin[20];                 /* password input buffer */
char    n0,n1,n2,n3,c0,c1,c2,c3;    /* xlat reg & constants */
int     domaster;                   /* flag indicating master entry */
unsigned rnd1 = 0x32d7;             /* Set by pause() and/or getstr() */
unsigned rnd2 = 0x27c1;
```

```
tatic char mskbuf[MSKSIZ];

xtern char *idprompt[];
xtern char *failmsg[];
xtern char *alarmsg[];
xtern char *queryrpt;
xtern char *grantmsg[];
xtern char *afile;
xtern char *ufile;
xtern char *ffile;
xtern char *ifile;
xtern char *datestr();
xtern char *timestr();
xtern char *xprompt, *cprompt, *mxdflt, *mcdflt;

xtern unsigned short int readbt();

nsigned short  arec, frec, urec;            /* current records */
nt      afd, ufd, ffd;         /* file descriptors */
ong     lseek();
tatic char     idstr[IDSIZ + 5];
nt      apg;                   /* apg flag */
tatic int repcnt;              /* cnt of found fail reports */
nt      pwdsiz;                /* PassWord size */

;taparm() {             /* get access parameters rec, return success */
        if((afd = openf(afile, 0)) < 0) {       /* open access file */
                filemsg(afile, NOPEN);
                return(0);
        }
        if(!getblk(afd, &aparm, sizeof(aparm))) {
                filemsg(afile, NREAD);
                close(afd);
                return(0);
        }
        close(afd);
        return(1);
} etarec(rec)                    /* get specified access record */
        unsigned short rec;

if((afd = openf(afile, 0)) < 0) {       /* open access file */
                filemsg(afile, NOPEN);
                return(0);
        }
        if(!seekarec(rec))
                goto reterr;
        if(!getblk(afd, &access, sizeof(access))) {
                filemsg(afile, NREAD);
                goto reterr;
        }
        close(afd);
        return(1);
reterr:
        close(afd);
        return(0);

utaparm() {            /* update access parameters rec, ret success */
```

```
        if((afd = openf(afile, 2)) < 0) {      /* open access file */
                filemsg(afile, NOPEN);
                return(0);
        }
        if(!putblk(afd, &aparm, sizeof(aparm))) {
                filemsg(afile, NWRITE);
                close(afd);
                return(0);
        }
        close(afd);
        return(1);
} putarec(rec)                    /* update access file record, return success */
        unsigned short rec;
{
        if((afd = openf(afile, 2)) < 0) {      /* open access file */
                filemsg(afile, NOPEN);
                return(0);
        } if(!seekarec(rec))
                goto reterr;

if(!putblk(afd, &access, sizeof(access))) {
                filemsg(afile, NWRITE);
                goto reterr;
        } close(afd);
        return(1);
reterr:
        close(afd);
        return(0);
} seekarec(rec)                   /* position at access rec */
        unsigned short rec;
{
        long loc;

arec = rec;
        loc = (long) (aparm.arec1 + ((rec - 1) * aparm.asize));
        if(lseek(afd, loc, 0) < 0) {
                filemsg(afile, NPOS);
                return(0);
        }
        return(1);
} getfparm() {                    /* get access parameters rec, return success */
        if((ffd = openf(ffile, 0)) < 0) {      /* open access file */
                filemsg(ffile, NOPEN);
                return(0);
        }
        if(!getblk(ffd, &fparm, sizeof(fparm))) {
                filemsg(ffile, NREAD);
                close(ffd);
                return(0);
        }
        close(ffd);
        return(1);
}
```

```
getfrec(rec)                            /* get specified fail record */
        unsigned short rec;
{
        if((ffd = openf(ffile, 0)) < 0) {       /* open fail file */
                filemsg(ffile, NOPEN);
                return(0);
        }
        if(!seekfrec(rec))
                goto reterr;
        if(!getblk(ffd, &fail, sizeof(fail))) {
                filemsg(ffile, NREAD);
                goto reterr;
        }
        close(ffd);
        return(1);
reterr:
        close(ffd);
        return(0);
} putfparm() {            /* update fail parameters rec, ret success */ if((ffd = openf(ffile, 2)) < 0) {       /* open fail file */
                filemsg(ffile, NOPEN);
                return(0);
        }
        if(!putblk(ffd, &fparm, sizeof(fparm))) {
                filemsg(ffile, NWRITE);
                close(ffd);
                return(0);
        }
        close(ffd);
        return(1);
} putfrec(rec)            /* update fail file record, return success */
        unsigned short rec;
{
        if((ffd = openf(ffile, 2)) < 0) {       /* open fail file */
                filemsg(ffile, NOPEN);
                return(0);
        } if(!seekfrec(rec))
                goto reterr;

if(!putblk(ffd, &fail, sizeof(fail))) {
                filemsg(ffile, NWRITE);
                goto reterr;
        }
        close(ffd);
        return(1);
reterr:
        close(ffd);
        return(0);
} seekfrec(rec)                           /* position at fail rec */
        unsigned short rec;
{
        long loc;

frec = rec;
```

```
        loc = (long) (fparm.recl + ((rec - 1) * fparm.size));
        if(lseek(ffd, loc, 0) < 0) {
                filemsg(ffile, NPOS);
                return(0);
        }
        return(1);
} getuparm() {            /* get user parameters rec, return success */ if((ufd = openf(ufile, 0)) < 0) {       /* open user file */
                filemsg(ufile, NOPEN);
                return(0);
        }
        if(!getblk(ufd, &uparm, sizeof(uparm))) {
                filemsg(ufile, NREAD);
                close(ufd);
                return(0);
        }
        close(ufd);
        return(1);
} geturec(rec)            /* get specified user record */
        unsigned short rec;
{
        if((ufd = openf(ufile, 0)) < 0) {       /* open user file */
                filemsg(ufile, NOPEN);
                return(0);
        }
        if(!seekurec(rec))
                goto reterr;
        if(!getblk(ufd, &user, sizeof(user))) {
                filemsg(ufile, NREAD);
                goto reterr;
        }
        close(ufd);
        return(1);
reterr:
        close(ufd);
        return(0);
} putuparm() {            /* update user parameters rec, ret success */ if((ufd = openf(ufile, 2)) < 0) {       /* open user file */
                filemsg(ufile, NOPEN);
                return(0);
        }
        if(!putblk(ufd, &uparm, sizeof(uparm))) {
                filemsg(ufile, NWRITE);
                close(ufd);
                return(0);
        }
        close(ufd);
        return(1);
} puturec(rec)            /* update user file record, return success */
        unsigned short rec;
{
```

```
        if((ufd = openf(ufile, 2)) < 0) {         /* open user file */
                filemsg(ufile, NOPEN);
                return(0);
        } if(!seekurec(rec))
                goto reterr;

if(!putblk(ufd, &user, sizeof(user))) {
                filemsg(ufile, NWRITE);
                goto reterr;
        }
        close(ufd);
        return(1);
reterr:
        close(ufd);
        return(0);
} seekurec(rec)                    /* position at user rec */
        unsigned short rec;
{
        long loc;

urec = rec;
        loc = (long) (uparm.recl + ((rec - 1) * uparm.size));
        if(lseek(ufd, loc, 0) < 0) {
                filemsg(ufile, NPOS);
                return(0);
        }
        return(1);
} getblk(fd, sp, size)    /* get sp from file fd, of size and decrypt */
        int fd, size;   /* return success */
        char *sp;
{
        if(readf(fd,sp,size) != size)
                return(0);
        crypts(sp,size);
        return(1);
} putblk(fd, sp, size)    /* encrypt and put block sp of size to file fd */
        int fd, size;   /* return success */
        char *sp;
{
        *((short *)(sp + size - sizeof(short))) = (short)rnd1;
        crypts(sp,size);
        if(writef(fd, sp, size) != size) {
                crypts(sp,size);
                return(0);
        }
        crypts(sp,size);
        return(1);
} crypts(sp, size)              /* crypt block of data */
        char *sp;
        int size;
{
        int i;
        char *p, *q, *endq;
```

```
    if(size) {
        size -= 2;
        n2 = 3;
        n3 = 8;
        n1 = 13;
        n0 = 15;
        c0 = 1;
        c1 = 5;
        c2 = 7;
        c3 = 12;
        p = mskbuf;
        i = sizeof(mskbuf);
        while(i--) {
                *p = n0 + (n1 << 4);
                p++;
                if(i--) {
                        *p = n2 + (n3 << 4);
                        p++;
                        xlat();
                } else
                        break;
        }
        p = sp;
        q = mskbuf;
        endq = mskbuf + sizeof(mskbuf);
        while(size--) {
                *p = *p ^ *q;
                p++;
                q++;
                if(q == endq)
                        q = mskbuf;
        }
    }
} sctoh(c)        /* Convert SafeWord ascii char to hex integer */
        int c;
{
        if (c >= '0' && c <= '9')
                return (c - '0');

switch (c & 0x5F) {     /* Convert hex letters; force caps   */
        case 'A':
                return (10);
        case 'H':
                return (11);
        case 'C':
                return (12);
        case 'P':
                return (13);
        case 'E':
                return (14);
        case 'F':
                return (15);
        default:
                return (-1);
        }
} atoh(s)         /* ascii string to hex number */
        char *s;
{
```

```
            int h = 0;
            int c;

if(*s) {
                    while(*s <= '0' || *s == 'x' || *s == 'X') {
                            if(*s++ == 0)
                                    return(0);
                    }
                    while((c = ctoh(*s++)) != -1)
                            h = h << 4 | c;
            }
            return(h);
    }
    ctoh(c)             /* ascii char to hex number */
            int c;
    {
            if ( c <= '9' && c >= '0')
                    return (c - '0');           /* digits 0-9 */
            c &= 0x5f;                  /* force caps */
            if(c <= 'F' && c >= 'A')
                    return(c - 'A' + 10);
            return(-1);
    } htosc(n)                    /* hex to SafeWord decoder ascii */
            char n;
    {
            if(n <= 9)
                    return (n + '0');
            switch (n) {
            case 11:
                    return('H');
            case 13:
                    return('P');
            default:
                    return(n + 55);
            }
    } htoc(n)                     /* hex to ascii */
            char n;
    {
            if(n <= 9)
                    return(n + '0');
            return(n + 'A' - 10);
    } putchars(c, n)              /* put c to scrn n times */
            char c;
            int n;
    {
            while(n--)
                    putchar(c);
    } master() {                  /* do master key security check */
            printf("\n");
            getalgo("MASTER");
            putkwd();
            if(!vfypwd(MPWDSIZ, 0)) {
                    putkwd();
                    if(!vfypwd(MPWDSIZ, 0)) {
```

```
                    putmsg(failmsg);
                    return(0);
                }
        }
        return(1);
} getalgo(idstr)      /* get algo, return success if found in access file */
                    /* 0 not found, -1 fatal error */
        char *idstr;
        int i;
        unsigned short int rec;

if(strcmp(idstr, "MASTER") == 0) {
                c0 = C0;
                c1 = C1;
                c2 = C2;
                c3 = C3;
                pwdsiz = MPWDSIZ;       /* force input behavior */
                aparm.pwecho = 0;
                apg = 0;
                domaster = 1;
                return(1);
        }
        if((rec = readbt(ifile, idstr)) == 0xffff)
                return(-1);
        if(rec == 0)
                return(0);
        if(!getaparm())
                return(-1);
        if(!getarec(rec))
                return(-1);
        if(strcmp(idstr, access.aid) == 0){
                n3 = access.seed >> 12 & 15;
                n2 = access.seed >> 8 & 15;
                n1 = access.seed >> 4 & 15;
                n0 = access.seed & 15;
                c0 = access.const >> 12 & 15;
                c1 = access.const >> 8 & 15;
              c2 = access.const >> 4 & 15;
                c3 = access.const & 15;
                apg = access.flags & 1;
                if(access.upwdl)
                        pwdsiz = access.upwdl;
                else
                        pwdsiz = aparm.dpwdl;
                return(1);
        } else
                printf("\nIndex error\n");
        return(0);
} static char *apgmsg[] = {
"\nPress the [E] key on your decoder.",
0
};

verified() {              /* output kwd, input pwd, return match */
        if(access.const == 0)   /* 0000 algo never gets in */
                return(0);
        if(access.const == 0xffff)      /* ffff algo gets in free */
                return(1);
        if(apg)
```

```
                putmsg(apgmsg);
        else
                putkwd();
        if(vfypwd(pwdsiz, aparm.pwecho)) {
                access.seed = (n3 << 12) + (n2 << 8) + (n1 << 4) + n0;
                return(1);
        } else {
                apg = 0;
                return(0);
        }
}
savekpwd(k, p)          /* save kwd & pwd for fail file */
        char *k, *p;
{
        int i;

for(i = 0; i < KWDSIZE; i++)
                *k++ = htoc(kwd[i]);
        *k = 0;
        for(i = 0; i < 4; i++) {
                if(passin[i])
                        *p++ = passin[i];
                else
                        break;
        }
        *p = 0;
} updaccess(alm)  /* update access file */
        char alm;
{
        if(alm)
                access.flags |= 2;
        else
                access.flags &= 0xfd;
        putarec(arec);
} upduser(acc)    /* updater user file */
        char acc;
{
        user.accessed = acc;
        strcpy(user.uid, access.aid);
        strcpy(user.udate, datestr());
        strcpy(user.utime, timestr());
        user.uidlnk = access.uselnk;    /* ptr to last rec */
        f(!getuparm()) {
                msdly(2000);
                return;
        }
        if(!puturec(uparm.next)) {
                msdly(2000);
                return;
        }
        access.uselnk = uparm.next;     /* access now pts to this rec */
        if(uparm.next > uparm.last)
                uparm.last = uparm.next;
        if(++uparm.next > uparm.max)
                uparm.next = 1;
        if(!putuparm())
                msdly(2000);
} updfail() {             /* update fail file */
```

```
        strcpy(fail.fid, access.aid);
        fail.reported = 0;
        strcpy(fail.fdate, datestr());
        strcpy(fail.ftime, timestr());
        fail.fidlnk = access.faillnk;
        if(!getfparm()) {
                msdly(2000);
                return;
        }
        if(!putfrec(fparm.next)) {
                msdly(2000);
                return;
        }
        access.faillnk = fparm.next;
        if(fparm.next > fparm.last)
                fparm.last = fparm.next;
        if(++fparm.next > fparm.max)
                fparm.next = 1;
        if(!putfparm())
                msdly(2000);
} static char *kwdmsg[] = {
"\nKeyWord: ",
 0
};

putkwd()         /* Generate KeyWord from rnd & display */
{
        int i;
        unsigned ran;

putline(kwdmsg[0]);
        ran = rnd1;
        for (i = 0; i < KWDSIZE; ++i) {
                kwd[i] = (ran % 6) + 1;
                if (i == 4)
                        ran = rnd2;
                else
                        ran /= 6;
        }

/*      Avoid special commands   */ if (kwd[CDIGIT1] + kwd[CDIGIT2] < 6)
                kwd[CDIGIT2] = 6 - kwd[CDIGIT1];

/*      Fold KeyWord into variables used by translator   */ n0 = KWDSIZE > 4 ? kwd[0] + kwd[4] : kwd[0];
        n1 = KWDSIZE > 5 ? kwd[1] + kwd[5] : kwd[1];
        n2 = KWDSIZE > 6 ? kwd[2] + kwd[6] : kwd[2];
        n3 = KWDSIZE > 7 ? kwd[3] + kwd[7] : kwd[3];

for (i = KWDSIZE - 1; i >= 0; --i)
                printf("%x", kwd[i]);
} static char *vp[] = {
```

```
"\n\nPassWord",
"characters)",
" (rightmost ",
"character)",
": ",
"\nPress the [E] key again.",
"\nIncorrect\n",
"\nCorrect\n",
"",
 0
        };

vfypwd(pwdlen, echo)            /* Prompt user and verify password */
        int pwdlen;
        unsigned short int echo;
{
        int i, n, chk;
        char *p;
        static int pwdmsk[4] = {
                0, 0xf, 0xff, 0xfff
        };

for (;;) {                          /* Get PassWord              */
                putline(vp[0]);
                if (pwdlen >= 4)
                        putline(vp[8]);
                else {
                        putline(vp[2]);
                        if (pwdlen > 1) {
                                printf("%d ", pwdlen);
                                putline(vp[1]);
                        } else
                                putline(vp[3]);
                }
                putline(vp[4]);

if(!getstr(passin, sizeof(passin), echo))
                        goto ret0;
                capstr(passin);          /* change 'O' to 0 */
                while(p = index(passin, 'O'))
                        *p = '0';
                while(p = index(passin, 'B'))    /* 'B' to 8 */
                        *p = '8';
                if(*passin == 27) {
                        printf("\nMaster entry\n\n");
                        putkwd();
                        c0 = C0;
                        c1 = C1;
                        c2 = C2;
                        c3 = C3;
                        echo = 0;
                        domaster = 1;
                        pwdlen = pwdsiz = MPWDSIZ;
                        continue;
                } xlat();
                n = 0;
                for (p = passin; *p; ++p)
                        n = (n << 4) + sctoh(*p);
                chk = n0 | (n1 << 4) | (n2 << 8);
                if (n3 >= 7)
                        chk |= 0x1000;
```

```
            if (pwdlen < 4) {
                    chk &= pwdmsk[pwdlen];
                    n &= pwdmsk[pwdlen];
            } if (n != chk)
                    goto ret0;

if ((pwdlen -= 4) > 0)
                    putline(vp[5]);
            else
                    break;
        } putline(vp[7]);
        return (1);

ret0:   putline(vp[6]);
        return (0);
}
```

Appendix B

```
/****************************************************************
*
*       Program: DECODER.C
*
*       Simulate SafeWord Decoder
*
*       Needed modules:
*                       IBMCRT (or equivalent)
*                       XLAT
*                       CMDLIB
*
*       Version 1.0   4/26/84  by Jim Tucker
*               1.1   4/30/84  externed xlat
*               1.2   6/18/84  new labels     JJT
*               1.3   6/27/84  new algorithm  JJT
****************************************************************/ include "stdio.h"
define MASK 0x0F        /* nibble mask */
#define TRUE 1
define FALSE 0

/*
*       translation function variables and constants
*/
extern          xlat();            /* in AKALGO */
extern char     n0,n1,n2,n3;       /* Key Register */
extern int      kwdsize;           /* number of digits in keyword */
extern int      cdigit1;           /* special keyword digit */
extern int      cdigit2;           /* special keyword digit */
extern char     kwdnum[];
extern long     random;

/*
```

```
*       Global Variables
*
*/
char    pn0, pn1, pn2, pn3;
char    dn0, dn1, dn2, dn3;
char    *keyfile = "DECDATA.DAT";        /* Filename for last keys */ int     passcnt;
int     first = TRUE;         /* 1st pass flag */ char *ms0[] =
{
"\nSafeWord Decoder Simulation:\n\n\n",
"1. Enter KeyWord if it is given. If no KeyWord goto step 2.\n\n",
"2. Press 'E' or <RETURN> for enter.\n\n",
"3. Read the PassWord in the display window above the 'E' key.\n\n\n\n",
"Press <ESC> to exit the program. ",
0
};

main()
{
        display(2);
        clrscr();
        putm(ms0);
        drawfs();
        readkeys();
        lastpkey();
        for (;;)
                kwdin();
} drawfs()
{
        int i, at, row, col;
        char ch;

setnorm();
        setsingle();
        box(15,35,22,78);
        box(16,41,21,45);
        setdouble();
        box(16,52,18,60);
        setsingle();
        setrev();
        putcur(17,54);
        printa("      ");
        setnorm();
        plchar('K',17,43);
        plchar('E',18,43);
        plchar('Y',19,43);
        putkey('E');
        putkey('1');
        putkey('2');
        putkey('3');
        putkey('4');
        putkey('5');
        putkey('6');
        putcur(23,48);
        printf("SafeWord Decoder");
}
```

```
putkey(key)
        char key;
{
        int row, col;

switch (key) {
        case '1' :
                row = 16;
                col = 63;
                break;
        case '2' :
                row = 16;
                col = 68;
                break;
        case '3' :
                row = 16;
                col = 73;
                break;
        case '4' :
                row = 19;
                col = 63;
                break;
        case '5' :
                row = 19;
                col = 68;
                break;
        case '6' :
                row = 19;
                col = 73;
                break;
        case 'E' :
                row = 19;
                col = 56;
                break;
        }
        box(row, col, row + 2, col + 4);
        plchar(key, row + 1, col + 2);
} dline(row)
        int row;
{
        setdouble();
        hline(0,79,row);
        putcur(row+2,0);
}
readkeys()
{
        FILE *fp;

if((fp = fopen(keyfile,"r")) != NULL)
                fscanf(fp,"%lx%lx%lx%lx%lx%lx%lx%lx%x",
                &pn0,&pn1,&pn2,&pn3,&dn0,&dn1,&dn2,&dn3,&passcnt);
        else
                writekeys();
} savepkey()
{
        pn0 = n0;
        pn1 = n1;
        pn2 = n2;
        pn3 = n3;
```

```
}
lastpkey()
{
        n0 = pn0;
        n1 = pn1;
        n2 = pn2;
        n3 = pn3;
} writekeys()
{
        FILE *fp;

if((fp = fopen(keyfile,"w")) != NULL) {
                fprintf(fp,"%x%x%x%x%x%x%x%x%x",
                pn0,pn1,pn2,pn3,dn0,dn1,dn2,dn3,passcnt);
                fclose(fp);
        }
} savedkey()
{
        dn0 = n0;
        dn1 = n1;
        dn2 = n2;
        dn3 = n3;
} lastdkey()
{
        n0 = dn0;
        n1 = dn1;
        n2 = dn2;
        n3 = dn3;
} kwdin()
{
        extern char kwdnum[];
        extern int passcnt;
        long int kwdreg;
        int i, dispreg;
        char c;

curoff();
        dispreg = kwdreg = 0;
        for (i=0; i < 30000; ++i) {
                do {
                        c = keyinx();
                        if ( c == 27 ) {
                                writekeys();
                                clrscr();
                                curon();
                                exit();
                        }
                }
                while ((c < '1' || c > '6') && c != 'e' && c != 'E' && c != 13);
                if (c != 'e' && c != 'E' && c != 13){
                        kwdreg = (kwdreg << 3) + (c - '0');
                        setintense();
                        setdouble();
                        putkey(c);
```

```c
            setnorm();
            setsingle();
            if (i == 0) {
                    putcur(17,54);
                    printf("  000");
            }
            dispreg = (dispreg << 3) + (c - '0');
            msdly(200);
            setrev();
            plchar((dispreg & 7) + '0', 17, 58);
            if (i > 0)
            plchar(((dispreg >> 3) & 7) + '0', 17, 57);
            if (i > 1)
            plchar(((dispreg >> 6) & 7) + '0', 17, 56);
            setnorm();
            msdly(100);
            putkey(c);
    }
    else {
            setintense();
            setdouble();
            putkey('E');
            setnorm();
            setsingle();
            if (i == 0) {
                    putcur(17,54);
                    printf("  000");
            }
            if (i == kwdsize || i == 0) {
                savepkey();
                if (kwdreg){
                    for (i = 0; i != kwdsize; ++i)
                            kwdnum[i] = (kwdreg >> i * 3) & 0x7;
                    foldkwd();
                }
                else
                    lastdkey();
                xlat();
                msdly(500);
                putpwd();
                putkey('E');
                savedkey();
                lastpkey();
                flush();
            }
            else {
                putcur(17,54);
                printf("  000");
                msdly(500);
                putkey('E');
            }
            return;
    }
   }
  }
} foldkwd()               /* fold keyword into 4 nibble key register */
{
    n0= kwdsize > 4 ? kwdnum[0] + kwdnum[4] : kwdnum[0];
    n1= kwdsize > 5 ? kwdnum[1] + kwdnum[5] : kwdnum[1];
    n2= kwdsize > 6 ? kwdnum[2] + kwdnum[6] : kwdnum[2];
    n3= kwdsize > 7 ? kwdnum[3] + kwdnum[7] : kwdnum[3];
}
```

```c
putm(msg)
        char *msg[];
{
        int i = 0;

while(msg[i])
                printf(msg[i++]);
}
/****************************************************************
 *
 *      put password to display
 *
 ****************************************************************/
putpwd()
{
        char d3,d2,d1,d0;

d3 = n3 >= 7 ? '1' : ' ';
        d2 = conv(n2);
        d1 = conv(n1);
        d0 = conv(n0);
        putcur(17,54);
        printf(" %c%c%c%c",d3,d2,d1,d0);
}
conv(rm)                        /* convert to special SafeWord numbers */
        char rm;
{
        if (rm >= 0 && rm <= 9)
                return rm + '0';
        switch (rm) {
        case 10 :
                return 'A';
        case 11 :
                return 'H';
        case 12 :
                return 'C';
        case 13 :
                return 'P';
        case 14 :
                return 'E';
        case 15 :
                return 'F';
        }
}
/****************************************************************
 *
 *      Module: XLAT.C
 *
 *      copyright (c) 1984 ENIGMA LOGIC INC., ALL RIGHTS RESERVED
 *
 *      SafeWord translation function.
 *
 *      uses:   CMDLIB - For translation commands
 *              ALGO.H - For translation algorithm
 *
 *      Version 1.0   5/2/84    by Jim Tucker
 *      Version 1.1   6/18/84   made label changes  JJT
 *
 ****************************************************************/ include "stdio.h"
include "algo.h"          /* translation algorithm */
```

```c
/*
 *      Global Variables
 *
 */
char    n0,n1,n2,n3;            /* Key Register */
char    c0 = C0;                /* constants */
char    c1 = C1;
char    c2 = C2;
char    c3 = C3;
char    cd;                     /* current date */
char    kwdnum[KWDSIZE];        /* KeyWord array */
int     kwdsize = KWDSIZE;      /* # of digits in KeyWord */
int     cdigit1 = CDIGIT1;      /* command digit locations */
int     cdigit2 = CDIGIT2;
int     loopcnt = LOOPCNT;

/****************************************************************
 *
 *      Translate the KeyWord into the new PassWord
 *
 *      THIS SEQUENCE OF FUNCTIONS IS CUSTOM MADE AND
 *      MUST NOT BE CHANGED.
 *
 ****************************************************************/ xlat()
{
        int i;

add4321();
        CMD1();
        CMD2();
        for (i = 0; i < loopcnt; ++i) {
                CMD3();
                CMD4();
                CMD5();
                CMD6();
                CMD7();
                CMD8();
        }
        CMD9();
        CMD10();
        CMD11();
}

/****************************************************************
 *
 *      Program: IBMCRT.C
 *
 *      copyright (c) 1984 ENGIMA LOGIC INC., ALL RIGHTS RESERVED
 *
 *      IBM screen functions and character graphics etc.
 *
 *      Version 1.0     3/15/84   by Jim Tucker
 *              1.1     3/21/84   added printa
 ****************************************************************/
include "stdio.h"

/*      crt attributes */
#define NORM 0x07
#define REV 0x70
#define DIM 0x01
#define INTENSE 0x0f
```

```
/*      GRAPHICS CHARS  */
#define VERT1 179       /* single line */
#define HORZ1 196
#define TRC1  191
#define TLC1  218
#define BRC1  217
#define BLC1  192
#define HORZ2 205       /* double line */
#define VERT2 186
#define TRC2  187
#define TLC2  201
#define BRC2  188
define BLC2  200 int     attribute = NORM;
long    random;
char    vert, horz, trc, tlc, brc, blc;

struct regval{
int     ax;
int     bx;
int     cx;
int     dx;
int     si;
int     di;
int     ds;
int     es;
};
struct regval srv;

/*****************************************************************
*       set display mode   0 = 40x25 BW        4 = 320x200 Color
*                          1 = 40x25 Color     5 = 320x200 BW
*                          2 = 80x25 BW        6 = 640x200 BW
*                          3 = 80x25 Color
*****************************************************************/
display(x)
        int x;
{
        srv.ax = x;
        sysint(16, &srv, &srv);

}

/*****************************************************************
*
*       put cursor at row, col
*
*****************************************************************/
putcur(row,col)
        int row,col;
{
        srv.ax = 0x200;
        srv.dx = (row << 8) + col;
        srv.bx = 0;
        sysint(16, &srv,&srv);
}
/*****************************************************************
*
*       scroll window
*
*****************************************************************/
```

```c
scroll(lines,upordn,ulcrow,ulcool,lrcrow,lrcool)
        int     lines,          /* lines to scroll, 0 = blank all */
                upordn,         /* 0 = scroll up, else = scroll down */
                ulcrow,ulcool,  /* upper left corner of window */
                lrcrow,lrcool;  /* lower left corner of window */
{
        if (upordn)
                srv.ax = 0x700 + lines;
        else
                srv.ax = 0x600 + lines;
        srv.cx = (ulcrow << 8) + ulcool;
        srv.dx = (lrcrow << 8) + lrcool;
        srv.bx = 0x0700;        /* atribute -> bh  (normal) */
        sysint(16, &srv, &srv);
}

/****************************************************************
*
*       read cursor position
*       store position @ ptr locations
*       ex. getcur(&row,&col);
*
****************************************************************/
getcur(prow,pcol)
        int *prow, *pcol;
{
        srv.ax = 0x0300;
        srv.bx = 0;     /* bh = pg no., must be 0 for graphics */
        sysint(16, &srv, &srv);
        *prow = (srv.dx >> 8) & 0xff;
        *pcol = srv.dx & 0xff;
}

/****************************************************************
*
*       clear to end of line
*
****************************************************************/
ceol()
{
        int row, col;

getcur(&row, &col);
        scroll(0,0,row,col,row,79);
        putcur(row, col);
}

/****************************************************************
*
*       home cursor and clear screen
*
****************************************************************/
clrscr()
{
        scroll(0,0,0,0,24,79);
        putcur(0,0);
}
/****************************************************************
*
*       move cursor up one line
*
****************************************************************/
```

```c
upcur()
{
        int row,col;

getcur(&row, &col);
        if (row)
                putcur(row - 1, col);
}
/*************************************************
 *
 *      move cursor down one line
 *
 *************************************************/
dncur()
{
        int row, col;

getcur(&row, &col);
        if (row < 24)
                putcur(row + 1, col);
}
/*************************************************
 *
 *      clear to end of screen
 *
 *************************************************/
ceos()
{
        int row, col;

getcur(&row, &col);
        ceol();
        if (row < 24)
                scroll(0,0,row + 1,0,24,79);
}

/*************************************************
 *      delay ms milliseconds
 *************************************************/
msdly(ms)
        unsigned int ms;
{
        unsigned int i,j;
        for (i=0; i <= ms; ++i)
                for (j=0; j <= 32; ++j) ;
}

/*************************************************
 *
 *      draw vertical line
 *
 *************************************************/
vline(fromrow, torow, col)
        int  fromrow, torow, col;
{
        int temp;

if (fromrow > torow){
                temp = torow;
                torow = fromrow;
                fromrow = temp;
        }
```

```c
        for (; fromrow <= torow; ++fromrow)
                plchar(vert, fromrow, col);
}

/************************************************
 *
 *      draw horizontal line
 *
 ************************************************/
hline(fromcol, tocol, row)
        int fromcol, tocol, row;
{
        int temp;

if (fromcol > tocol){
                temp = tocol;
                tocol = fromcol;
                fromcol = temp;
        }
        for (; fromcol <= tocol; ++fromcol)
                plchar(horz, row, fromcol);
}

/************************************************
 *
 *      draw box
 *
 ************************************************/
box(tlrow,tlcol, brrow, brcol)
        int tlrow, tlcol, brrow, brcol; /* topleft corner, bottom right */
{
        plchar(tlc, tlrow, tlcol);
        hline(tlcol+1, brcol-1, tlrow);
        vline(tlrow+1, brrow-1, tlcol);
        plchar(blc, brrow, tlcol);
        hline(tlcol+1, brcol-1, brrow);
        plchar(trc, tlrow, brcol);
        vline(tlrow+1, brrow-1, brcol);
        plchar(brc, brrow, brcol);
}

/************************************************
 *
 *      Print a string using the current attribute
 *
 ************************************************/
printa(pchar)
        char    *pchar;
{
        int     row, col;

getcur(&row, &col);
        while(*pchar) {
                plchar(*pchar, row, col);
                pchar++;
                if(++col > 79) {
                        col = 0;
                        if(++row > 24)
                                return;
                putcur(row,col);
                }
        }
}
```

```c
/***********************************************
 *
 *      place character on crt with current attribute
 *
 ***********************************************/
plchar(ch, row, col)
        unsigned char ch;       /* character */
        int row, col;
{
        putcur(row, col);
        srv.ax = 0x0900 + ch;
        srv.bx = attribute;  /* bl = attribute, bh = display pg */
        srv.cx = 1;     /* # of chars to write */
        sysint(16, &srv, &srv);
}

/***********************************************
 *
 *      get char and it's attribute from the cursor position
 *
 ***********************************************/
getchat(pch, pat, row, col)
        char *pch;      /* where to put char */
        int *pat;       /* and attribute */
        int row, col;
{
        putcur(row, col);
        srv.ax = 0x0800;
        srv.bx = 0;     /* bh = display pg */
        sysint(16, &srv, &srv);
        *pch = srv.ax & 0xff;
        *pat = (srv.ax >> 8) & 0xff;
}

/***********************************************
 *
 *      set attribute of specified character
 *
 ***********************************************/
setatt(at, row, col)
        int at; /* attribute */
        int row, col;
{
        char ch;
        int tmp;

getchat(&ch, &tmp, row, col);
        attribute = at;
        plchar(ch, row, col);
}

/***********************************************
 *
 *      turn off cursor
 *
 ***********************************************/
curoff()
{
        srv.ax = 0x0300;
        srv.bx = 0;
        sysint(16, &srv, &srv);
        srv.cx = srv.cx | 0x2000;
        srv.ax = 0x0100;
        sysint(16, &srv, &srv);
}
```

```
/*************************************************
 *
 *      turn on cursor
 *
 *************************************************/
curon()
{
        srv.ax = 0x0300;
        srv.bx = 0;
        sysint(16, &srv, &srv);
     srv.cx = srv.cx & 0xdfff;
        srv.ax = 0x0100;
        sysint(16, &srv, &srv);
}

/*************************************************
 *
 *      set graphics to draw double lines
 *
 *************************************************/
setdouble()
{
        vert = VERT2;
        horz = HORZ2;
        tlc  = TLC2;
        trc  = TRC2;
        blc  = BLC2;
        brc  = BRC2;
}

/*************************************************
 *
 *      set graphics to draw single lines
 *
 *************************************************/
setsingle()
{
        vert = VERT1;
        horz = HORZ1;
        tlc  = TLC1;
        trc  = TRC1;
        blc  = BLC1;
        brc  = BRC1;
}

/*************************************************
 *      set attribute
 *************************************************/
setnorm()
{
        attribute = NORM;
}
setrev()
{
        attribute = REV;
}
setdim()
{
        attribute = DIM;
}
setintense()
{
        attribute = INTENSE;
```

```
/*****************************************
 *
 *      key board interaction functions
 *
 *****************************************/
keyin()         /* echo and return next keystroke */
{
        return (char) bdos(1);
}
keyinx()        /* return next keystroke, do not echo */
{
        return (char) bdos(8);
}
keydn()         /* return true if key is pressed */
{
        return (char) bdos(11);
}
flush()         /* flush keyboard buffer */
{
        bdos(12);
}

/*****************************************
 *
 *      key wait and random number genterator
 *
 *****************************************/
keywait()
{
        flush();
        curoff();
        do
                random += 71;
        while (keydn() == 0);
        flush();
        curon();
}
lwait()
{
        setintense();
        printa("(Press any key to continue)");
        keywait();
        putchar(13);
        ceol();
}
blwait()
{
        putcur(24,0);
        lwait();
}

/*****************************************
 *      display time and date
 *****************************************/
time(row,col)
        int row, col;   /* where to print time */
{
        int hr, min;

srv.ax = 0x2c00;           /* bdos func gettime */
        sysint(33, &srv, &srv);
        hr = ((srv.cx >> 8) & 0xff) % 12;
        if (hr == 0)
```

```
                hr = 12;
        min = srv.cx & 0xff;
        tcur(row,col);
        if (hr < 10)
                putchar(' ');
        printf("%d:",hr);
        if (min < 10)
                putchar('0');
        printf("%d",min);
} date(row,col)
        int row, col;   /* where to print date */
{
        int month, day;

srv.ax = 0x2a00;        /* bdos func getdate */
        sysint(33, &srv, &srv);
        day = srv.dx & 0xff;
        month = (srv.dx >> 8) & 0xff;
        putcur(row, col);
        if (month < 10)
                putchar(' ');
        printf("%d ",month);
        if (day < 10)
                putchar('0');
        printf("%d",day);
}

/****************************************************************
*
*       Module: SWSIMU.C
*
*       Common code for the SafeWord simulator. To be included
*       in SWLIB.
*
*       uses:
*               XLAT
*               CMDLIB
*               IBMCRT or nt
*               CLIB
*
*       Version 1.0     5/7/84     by Jim Tucker
*               1.1     6/18/84    changed labels    JJT
****************************************************************/
include "stdio.h"

/*
*       translation function variables and constants
*/
extern          xlat();                 /* translation function */
extern char     n0,n1,n2,n3;            /* Key Register */
extern int      kwdsize;                /* number of digits in KeyWord */
extern int      odigit1;                /* special KeyWord digit */
extern int      odigit2;                /* special KeyWord digit */
extern char     kwdnum[];               /* KeyWord array */
extern long     random;                 /* random number made by keywait() */

/*
*       Global Variables
*
*/
```

```
char    pn0, pn1, pn2, pn3;
char    dn0, dn1, dn2, dn3;

drawsw()
{
        int i, at, row, col;
        char ch;

setnorm();
        setsingle();
        box(15,35,22,78);
        box(16,41,21,45);
        setdouble();
        box(16,52,18,60);
        setsingle();
        setrev();
        putcur(17,54);
        printa("      ");
        setnorm();
        plchar('K',17,43);
        plchar('E',18,43);
        plchar('Y',19,43);
        putkey('E');
        putkey('1');
        putkey('2');
        putkey('3');
        putkey('4');
        putkey('5');
        putkey('6');
        putcur(23,48);
        printf("SafeWord Decoder");
} putkey(key)
        char key;
{
        int row, col;

switch (key) {
        case '1' :
                row = 16;
                col = 63;
                break;
        case '2' :
                row = 16;
                col = 68;
                break;
        case '3' :
                row = 16;
                col = 73;
                break;
        case '4' :
                row = 19;
                col = 63;
                break;
        case '5' :
                row = 19;
                col = 68;
                break;
        case '6' :
                row = 19;
```

```
                col = 73;
                break;
            case 'E' :
                row = 19;
                col = 56;
                break;
        }
        box(row, col, row + 2, col + 4);
        plchar(key, row + 1, col + 2);
} dline(row)
        int row;
{
        setdouble();
        hline(0,79,row);
        putcur(row+2,0);
} savepkey()
{
        pn0 = n0;
        pn1 = n1;
        pn2 = n2;
        pn3 = n3;
}
lastpkey()
{
        n0 = pn0;
        n1 = pn1;
        n2 = pn2;
        n3 = pn3;
} savedkey()
{
        dn0 = n0;
        dn1 = n1;
        dn2 = n2;
        dn3 = n3;
} lastdkey()
{
        n0 = dn0;
        n1 = dn1;
        n2 = dn2;
        n3 = dn3;
} kwdin()
{
        extern char kwdnum[];
        extern int passcnt;
        long int kwdreg;
        int i, dispreg;
        char c;

curoff();
        dispreg = kwdreg = 0;
        for (i=0; i < 30000; ++i) {
                do
                        c = keyinx();
```

```
        while ((c < '1' || c > '6') && c != 'e' && c != 'E' && c != 13);
        if (c != 'e' && c != 'E' && c != 13){
                kwdreg = (kwdreg << 3) + (c - '0');
                setintense();
                setdouble();
                putkey(c);
                setnorm();
                single();
                if (i == 0) {
                        putcur(17,54);
                        printf("  000");
                }
                dispreg = (dispreg << 3) + (c - '0');
                msdly(200);
                setrev();
                plchar((dispreg & 7) + '0', 17, 58);
                if (i > 0)
                plchar(((dispreg >> 3) & 7) + '0', 17, 57);
                if (i > 1)
                plchar(((dispreg >> 6) & 7) + '0', 17, 56);
                setnorm();
                msdly(100);
                putkey(c);
        }
        else {
                setintense();
                setdouble();
                putkey('E');
                setnorm();
                setsingle();
                if (i == 0) {
                        putcur(17,54);
                        printf("  000");
                }
                if (i == kwdsize || i == 0) {
                    savepkey();
                    if (kwdreg){
                        for (i = 0; i != kwdsize; ++i)
                                kwdnum[i] = (kwdreg >> i * 3) & 0x7;
                        foldkwd();
                    }
                    else
                        lastdkey();
                    xlat();
                    msdly(500);
                    putpwd();
                    putkey('E');
                    savedkey();
                    lastpkey();
                    flush();
                }
                else {
                    putcur(17,54);
                    printf("  000");
                    msdly(500);
                    putkey('E');
                }
                return;
        }
    }
}
```

```c
/****************************************************************
 *
 *      put PassWord to display
 *
 ****************************************************************/
putpwd()
{
        extern char n0, n1, n2, n3;
        char d3,d2,d1,d0;

d3 = n3 >= 7 ? '1' : ' ';
        d2 = conv(n2);
        d1 = conv(n1);
        d0 = conv(n0);
        putcur(17,54);
        printf(" %c%c%c%c",d3,d2,d1,d0);
}
conv(nm)                /* convert to special PassWord numbers */
        char nm;
{
        if (nm >= 0 && nm <= 9)
                return nm + '0';
        switch (nm) {
        case 10 :
                return 'A';
        case 11 :
                return 'H';
        case 12 :
                return 'C';
        case 13 :
                return 'P';
        case 14 :
                return 'E';
        case 15 :
                return 'F';
        }
}

/************************************************************
 *
 *      read in KeyWord, output PassWord on decoder
 *
 ************************************************************/
kwdin()
{
        extern char kwdnum[];
        long int kwdreg;
        int i;
        char c;

kwdreg = 0;
        for (i=0; i < 30000; ++i) {
                do
                        c = keyinx();
                while ((c < '1' || c > '6') && c != 'e' && c != 'E' && c != 13);
                if (c != 'e' && c != 'E' && c != 13){
                        kwdreg = (kwdreg) + (c - '0');
                        putchar(c);
                }
                else {
```

```
                if (i == kwdsize || i == 0) {
                    savepkey();
                    if (kwdreg){
                        for (i = 0; i != kwdsize; ++i)
                            kwdnum[i] = (kwdreg >> i * 3) & 0x7;
                        foldkwd();
                    }
                    else
                        lastdkey();
                    xlat();
                    putpwd();
                    savedkey();
                    lastpkey();
                    flush();
                }
                else {
                    putm(ms26);
                    printf("000");
                }
                return;
            }
        }
}
include     "stdio.h"
define MASK 15 extern char n0, n1, n2, n3;

/******************************************************************
 *
 *      Hash n0, n1, n2, n3 with 1, 2, 3, 4
 *
 ******************************************************************/ add4321() { n0 = n0 + 1 & MASK;
        n1 = n1 + 2 & MASK;
        n2 = n2 + 3 & MASK;
        n3 = n3 + 4 & MASK;
}
include     "stdio.h"
define MASK 15 extern char n0, c0;

/******************************************************************
 *
 *      Add Constant 0 to Nibble 0 (no carry)          [CMD 5]
 *
 ******************************************************************/ addc0(){ n0 = n0 + c0 & MASK;
} include     "stdio.h"
define MASK 15 extern char n0, n1, n2, c1, c2, c3;
```

```
/******************************************************************
 *
 *      Add Constants 1 thru 3 to Nibbles 0 thru 2 (no carrys)   [CMD 4]
 *
 ******************************************************************/ addc123()
{
        n0 = n0 + c3 & MASK;
        n1 = n1 + c2 & MASK;
        n2 = n2 + c1 & MASK;
}
include       "stdio.h"
define MASK 15 extern char n0, c2 ;

/******************************************************************
 *
 *      Add Constant 2 to Nibble 0 (no carry)              [CMD 7]
 *
 ******************************************************************/ addc2()
{
        n0 = n0 + c2 & MASK;
}
include       "stdio.h"
define MASK 15 extern char n0, n1, n2, n3;

/******************************************************************
 *
 *      Increment Almost nibbles 0 thru 3 (no carrys)   [CMD 3]
 *
 ******************************************************************/ incalm()
{
        char fifteens;

fifteens = 0;
        if ((n0 = ++n0 & MASK) == 15 )
                ++fifteens;
        if ((n1 = ++n1 & MASK) == 15)
                ++fifteens;
        if (fifteens == 2)
                return;
        if ((n2 = ++n2 & MASK) == 15)
                ++fifteens;
        if (fifteens)
                return;
        n3 = ++n3 & MASK;
} include       "stdio.h"

extern char n0, n1, n2, n3;
```

```c
#include        "stdio.h"

extern char n0, n1;

/******************************************************************
 *
 *      Swap Nibbles n0 and n1                    [CMD 14]
 *
 ******************************************************************/ swap10()
{
        char nt;

nt = n1;
        n1 = n0;
        n0 = nt;
}
#include        "stdio.h"
define MASK 15 extern char n0;

/******************************************************************
 *
 *      Twos Complement Nibble 0                  [CMD 13]
 *
 ******************************************************************/ tcpln0()
{
        n0 = (~n0) + 1 & MASK;
}
#include        "stdio.h"
define MASK 15
#define TRUE 1
define FALSE 0 extern char n0, n1, n2, n3;     /* Key Register */

/******************************************************************
 *
 *      Input a PassWord from the console, and compare it to the
 *      Key Register contents. Return TRUE if they match.
 *
 ******************************************************************/ getpwd()
{
        int c, key;

printf("\nInput your PassWord: ");
        do                              /* skip spaces */
                c = getchar();
        while
                ( c != EOF && isspace(c) );
        for ( key = 0; number(&c); c = getchar())
                key = 16 * key + c;     /* get hex number */
        if (n0 != (key & MASK))         /* comparison */
                return(FALSE);
        if (n1 != (key >> 4 & MASK))
                return(FALSE);
```

```c
        if (n2 != (key >> 8 & MASK))
                return(FALSE);
        if ( (n3 >= 7 ? 1 : 0) != (key >> 12 & MASK) )
                return(FALSE);
        return(TRUE);
} number(pn)      /* if *pn is ascii for valid number, return true and
                 * convert it to the number, else return false
                 */
        char *pn;
{
        if ( *pn >= '0' && *pn <= '9' ) {
                *pn = *pn - '0';                /* digits 0-9 */
                return (TRUE);
        }
        switch (*pn & 0x5F) {                   /* special hex letters, force caps */
                case 'A': *pn = 10;
                        break;
                case 'H': *pn = 11;
                        break;
                case 'C': *pn = 12;
                        break;
                case 'P': *pn = 13;
                        break;
                case 'E': *pn = 14;
                        break;
                case 'F': *pn = 15;
                        break;
                default: return (FALSE);
        }
        return (TRUE);
}
#include        "stdio.h"

extern  char    n0,n1,n2,n3;

/******************************************************************
 *
 *      Display PassWord to console in LCD format
 *
 ******************************************************************/
dispwd()
{
        char    d3,d2,d1,d0;

d3 = n3 >= 7 ? '1' : '0';
        d2 = conv(n2);
        d1 = conv(n1);
        d0 = conv(n0);

printf("%c%c%c%c ",d3,d2,d1,d0);

} conv(rm)
char    rm;
{
        if (rm >= 0 && rm <= 9 ){
                rm = rm + '0';
                return(rm);
```

```
        }
        switch( nm ){
                case 10 :
                        return('A');
                case 11 :
                        return('H');
                case 12 :
                        return('C');
                case 13 :
                        return('P');
                case 14 :
                        return('E');
                case 15 :
                        return('F');
                default :
                        return ('?');
        }
}
include     "stdio.h"
define MASK 15

/*
 *
 *      uses:   IBMCRT or equivialant
 *
 */ extern  char kwdnum[], n0,n1,n2,n3;
extern  int  kwdsize, cdigit1, cdigit2;

getkwd()
{
extern char kwdnum[];
extern int kwdsize, cdigit1, cdigit2;
int     i;
char    c;
static char     *op[16] = {
        "Increase PassWord count.",
        "Load slave data into Master if Armed.",
        "Absorb & Erase Slave if Armed.",
        "Arm Absorb and Erase.",
        "Time lock enabling hour",
        "Time lock disabling hour",
        "Create Decoder ID number.",
        "Make this Key a Secure clockset Key.",
        "Activate time lock.",
        "De-activate time lock.",
        "Arm de-activate time lock with this Secure clockset Key.",
        "Dedicate this Key to this Decoder.",
        "Display number of PassWords remaining.",
        "Display number of PassWords remaining.",
        "Display time of last usage.",
        "Display date of last usage."
        };

printf("\nEnter KeyWord of %d digits =",kwdsize);
        for( i = kwdsize-1 ; i >= 0 ; --i) {
                c = keyin();
                if( c >= '1' && c <= '6' ){
                        c = c - '0';
                        kwdnum[i] = c;
                }
```

```
            else {
                printf("\nInvalid Digit Entered!\n");
                printf("\nStrike return for exit.");
            }
    }
    if( kwdnum[cdigit1] + kwdnum[cdigit2] < 6 ){
        c = 0;
        for( i = 0 ; i < kwdsize ; i++)
            c = (c + kwdnum[i]) & MASK;
        printf("\nThis is a command KeyWord : \n %s",op[c]);
    }
    n0 = kwdsize > 4 ? kwdnum[0] + kwdnum[4] : kwdnum[0];
    n1 = kwdsize > 5 ? kwdnum[1] + kwdnum[5] : kwdnum[1];
    n2 = kwdsize > 6 ? kwdnum[2] + kwdnum[6] : kwdnum[2];
    n3 = kwdsize > 7 ? kwdnum[3] + kwdnum[7] : kwdnum[3];
        printf("\n");
} include      "stdio.h"

extern char kwdnum[];
extern int  kwdsize;

/****************************************************************
 *      Display KeyWord.
 ****************************************************************/
putkwd()
{
        int i;

printf("\nThe KeyWord is ");
        for ( i = kwdsize - 1; i >= 0; --i)
            printf("%x",kwdnum[i]);
} include      "stdio.h"
define FALSE 0 extern char kwdnum[];           /* KeyWord array */
extern char n0, n1, n2, n3;     /* Key Register */
extern int  kwdsize;            /* # digits in KeyWord */
extern int  cdigit1, cdigit2;   /* command digit locations */
extern long random;             /* random number generated during keywait()*/

/****************************************************************
 *
 *      Generate KeyWord
 *
 *      uses: IBMCRT or equivialant
 *
 *      Prompt user, wait till a carriage return is pressed,then
 *      Generate a random KeyWord and put it in kwdnum[],
 *      Put the hashed value in n0, n1, n2, n3.
 *      Display KeyWord.
 *
 ****************************************************************/
genkwd()
{
        int i;

flush();                /* flush input */
```

```
printf("\n\nSecurity Check - Press any key to continue");
keywait();
flush();                        /* flush buffer */
for (i = 0; i != kwdsize; ++i)  /* parse random */
        kwdnum[i] = ((random >> i * 3) % 6) +1;
while (kwdnum[cdigit1] + kwdnum[cdigit2] < 6)
        kwdnum[cdigit2]++;  /* prevent special cmd */
/* fold the KeyWord into the Key Register */
n0= kwdsize > 4 ? kwdnum[0] + kwdnum[4] : kwdnum[0];
n1= kwdsize > 5 ? kwdnum[1] + kwdnum[5] : kwdnum[1];
n2= kwdsize > 6 ? kwdnum[2] + kwdnum[6] : kwdnum[2];
n3= kwdsize > 7 ? kwdnum[3] + kwdnum[7] : kwdnum[3];

}
```

Appendix C

Secure Environments Glossary of Terms

Accountable Domain

An accountable domain is a group of computer resources which cannot be accessed by any user until: (1) his or her identity is confirmed using tangible identifiers which are difficult or impossible to duplicate without special equipment, and (2) His or her supervisor has access to the special equipment necessary to duplicate, modify, or disallow the identifiers if necessary, and (3) an encrypted log of the access is recorded so that supervisors may access it at any time.

Decoder:

Portable password issuing device used in conjunction with SafeWord Keys to calculate changing PassWords. The Decoder makes no electrical connection with any computer, terminal, or data communications equipment, and is therefore universally hardware compatible.

Demo Algorithm:

Enigma Logic has written several software demonstrations of the SafeWord System. All such demonstrations use the same PassWord derivation algorithm in their Keys, and clients wishing to evaluate the SafeWord system are given full disclosure of the contents of this demo algorithm. Thus the demo algorithm is not intended to be "secure". Note that since there are billions upon billions of potential algorithms, full knowledge of this demo algorithm does not compromise the security of any other algorithm. The demo algorithm is fully disclosed in the source code listings which accompany this patent application. It is included purely for purposes of illustration and should not be interpreted as the only type of algorithm which may be used in inventions of the type which are the subject of this patent application. Persons of ordinary skill in the art of computer programming are capable of creating an unlimited variety of algorithms appropriate to the purposes of the present invention.

Key:

A small electronic device that has been programmed with data elements which can uniquely identify an individual SafeWord algorithm. The unique algorithm enables the SafeWord lock to recognize an authorized system user. The Key is placed in a Decoder each time a new PassWord is required. The Key also stores the previous purported PassWord.

PassWord:

When "PassWord" is spelled in this way (capital "P" and capital "W") it refers to a changing or dynamic password which grants secure access, as opposed to a fixed password. When spelled without the capital "W", the reader must deduce whether this word refers to a modern dynamic PassWord or an old-fashioned memorized or static password.

Secure environment:

A group of computer resources protected by the combination of an accountable domain and automatic, user-specific encryption.

Software Lock:

The main software portion of the SafeWord System, responsible for verifying the identity of users who request access to protected resources. The Synchronous SafeWord module herein disclosed is an embodiment of such a software lock.

Synchronous Decoder:

A Decoder, (or portable password issuing device) which operates in the Synchronous SafeWord mode. Schematic diagrams and firmware source code listings (implementing a Synchronous Decoder in the "C" programming language) are included herewith, entitled "Synchronous SafeWord password issuing device program listing."

Synchronous SafeWord Module:

Those portions of the invention described in United States patent application number 796,884 which ordinarily reside inside the access-controlled computer system. These portions are usually implemented in software inside said access-controlled computer system, but could instead be implemented in hardware. Source code implementing a Synchronous SafeWord Module in the "C" programming language is included herewith, entitled "Synchronous SafeWord operation source code listing".

Variable PassWord length:

The software lock can demand PassWords of any desired length by requesting that the user press the Decoder's "E" button more than once. Each time the "E" button is pressed, additional PassWord digits are calculated and displayed. As mentioned in the accompanying Claims, this method is useful in confirming the legitimacy of a purported PassWord which corresponds with an authentic PassWord.

Appendix D

```
/*
 *
 *      IDUTIL.C
 *
 *      Creates ID support files.
 *      Hides a file and puts the filename in ACCESS.IDV
 *
 *      Uses IDSD & IDMISC
 *
 *      V.1     12/30/84  Jim Tucker
 *      V.2     2/10/85   kar - encyphered data files
 *                                  added view log files
 *                                  added security check
 *                                  extracted some code to IDMISC
 *      V.3     2/14/85   Jim Tucker  changed pause()->pauser()
 *                                  wait()->waitr(), 'any' -> [RETURN]
 *      V1.0    3/25/85   Jim Tucker  added b-tree database struct, file bu
 *                                  enhanced editing, report to file,
 *                                  selective report, help func, opt
 *                                  password length, opt id & pw echo,
 *                                  optimized for multi-user sys
 *
 *      V1.1    4/10/85   Jim Tucker  Added MASTER, SUPER. Now checks
 *                                  file exists before creat, new
 *                                  config code for more run time opts,
 *                                  modified report code to share with ID
 */
include <stdio.h>
include "iddef.h"
#include "algo.h"

/* global variables */ extern char c0,c1,c2,c3;            /* xlat constants */ extern unsigned rnd1, rnd2;         /* random numbers */ extern char    *afile, *ufile, *ffile, *ifile;  /* support file names */
extern char    *ulfile, *flfile, *bafile, *bifile;
extern char    *eol;                /* end of line char(s) */
extern char    *xprompt, *cprompt, *xhead, *chead, *mxdflt, *mcdflt;
extern int     domaster;            /* master entry flag */ long    aloc, floc, uloc;           /* file locators */
int     xfd, afd, ufd, ffd, lfd;    /* file descriptors */
int     outf;                       /* flag reports go to file */
long    lseek();
char    instr[60];                  /* general input buffer */
char    idin[IDSIZ + 1];
unsigned short int edrec;           /* current record being edited */
int     entflg = 0;                 /* enterrec() flg, 1 = statics valid */
int     ednew = 0;                  /* set means were editing a new rec */
int     faterr = 0;                 /* fatal error flag, database i/o err */
int     logerr = 0;                 /* error flag indicates bad write to log */
char    logid[IDSIZ + 1],           /* id for log report */
        logfile[FNSIZ + 1];         /* file to output log to */
unsigned short int logidx;          /* rec # of logid */
char    lastdate[DATESIZ + 1],      /* last log time, for reports */
        lasttime[TIMESIZ + 1];
```

```c
char    xprog[FNSIZ + 1];       /* execution file name str */
char    xparm[CMDSIZ + 1];      /* exec file parameter line */
char    rxprog[FNSIZ + 1];      /* execution file name str on fail */
char    rxparm[CMDSIZ + 1];     /* exec file parameter line on fail */ unsigned rptcnt;        /* number of records displayed */ extern unsigned short int readbt();

static char *title[] = {
"\n\n\n\n\n",
"\t    Utility program for ID      V1.1   ENIGMA LOGIC INC.\n",
"\t    ------------------------------------------------\n\n\n",
 0
};

main() {
        clrscr();
        putmsg(title);
        if(secure())
                domenu();
        else {
                clrscr();
                exit(1);
        }
        clrscr();
} static char *menu[] = {
"\t\t\tMenu of functions:\n\n\n",
"\t\t\t[1] Report usage log.\n\n",
"\t\t\t[2] Report fail log.\n\n",
"\t\t\t[3] Edit Access file.\n\n",
"\t\t\t[4] Create new User log file.\n\n",
"\t\t\t[5] Create new Fail log file.\n\n",
"\t\t\t[6] Create new Access file.\n\n",
"\t\t\t[Q] Quit program.\n\n",
"       Enter selection  [ ]\b\b",
 0
};

domenu() {                                              /* main menu loop */ int c;

for(;;) {
                putmsg(title);
                putmsg(menu);
                while(!index("12345678Qq", c = keyinr()))
                        printf("\007");
                if(c == 'q')
                        c = 'Q';
                putchar(c);
                printf("\n\n");
                switch(c) {
                case '4':
                        mkuser();
                        break;
                case '5':
                        mkfail();
                        break;
                case '3':
```

```
                    editaccess();
                    break;
            case '6':
                    mkaccess();
                    break;
            case '1':
                    repulog();
                    break;
            case '2':
                    repflog();
                    break;
            case 'q':
            case 'Q':
                    return;
            }
      }
} static char *chk[] = {
"\t\t\tSafeword Security Check\n\n",
"\n\n",
"\tA SafeWord security check must passed in order to use this program.\n",
"\tYou will need a Decoder and the Supervisors Key to pass the check.",
"\n\n\n",
0
};

static char *noafile[] = {
"\n",
"Since the user access data can not be read, the System Supervisor may\n",
"only gain entry by using the Master Key.\n\n",
0
};
static char*nosuper[] = {
"\n",
"The SUPER ID data not be found in the user data. Therefore the Master\n",
"Key must be used to gain entry.\n\n",
0
};

secure() {                          /* do security chk, return success */
        int gal;

if(!getaparm())
                goto err;
        if((gal = getalgo("SUPER")) < 0)
                goto err;
        if(gal == 0 || access.const == 0) {
                putmsg(nosuper);
                genrnd();
                return(master());
        } putmsg(chk);
        if(verified()) {            /* run security check on SUPER */
                if(!domaster)
                        passed();
                return(1);
        } else {
                if(!domaster)
                        savekpwd(fail.key1, fail.pass1);
                if(verified()) {
```

```
                        if(!domaster)
                                passed();
                        return(1);
                } else {
                        if(!domaster) {
                                savekpwd(fail.key2, fail.pass2);
                                failed();
                        }
                        return(0);
                }
        }
err:
        putmsg(noafile);
        genrnd();
        return(master());
} static char *almmsg[] = {
"\n\nAn attempt has been made to gain access. See log report for details.\n",
 0
};

passed() {        /* update access & user files, report if any */
        if(access.flags & 2) {        /* if alarm flag set */
                putmsg(almmsg);
                waitc();
                printf("\n\n");
        }
        upduser(1);                /* udate user file */
        updaccess(0);   /* reset alarm, update seed */
} failed() {        /* set alarm, update all logs, issue msg */
        upduser(0);
        updfail();
        updaccess(1);
} static char *mamsg[] = {
"\n\nCreate a new Access file.\n\n",
 0
};

mkaccess() {                                /* make new access file */ clrscr();
        putmsg(mamsg);
        if((afd = openf(afile, 0)) >= 0) {
                close(afd);
                if(!yes("An Access file already exists. Do wish to supercede it?"))
                        goto retabol;
        }
        if((afd = creatf(afile)) < 0) {
                filemsg(afile, NCREAT);
                goto retabol;
        }
        close(afd);
        aparm.aatrib = 3;        /* fixed rec len & crypted */
        aparm.arecl = sizeof(aparm);
        aparm.asize = sizeof(access);
        aparm.alast = 1;         /* must have one rec to start */
        aparm.afree = 0;
        aparm.dpwdl = PWDSIZ;
```

```
        aparm.cap = UPCASE;
        aparm.idecho = ECHOID;
        aparm.pwecho = ECHOPW;
        aparm.useuser = 0;
        strcpy(aparm.xfile, "");   /* dflt execute file null */
        strcpy(aparm.xcmd, "");
        strcpy(aparm.nxfile, nxdflt);  /* dflt execute file for fail */
        strcpy(aparm.nxcmd, ncdflt);
        if(!putfree(1))         /* start rec must be free */
                goto retabo;
                                        /* create index file */
        if(!creatbt(ifile, IDSIZ))
                goto retabo;
        if(!enterxdata())       /* input execute file name */
                goto retabo2;
        if(!enterconf())        /* input config data */
                goto retabo2;
        editaccess();           /* go enter data */
        return;

retabo2:
        unlinkf(ifile);
retabo:
        unlinkf(afile);
retabo1:
        printf("\n\nTask Aborted...No Access file created");
        waitr();
} static char *eahelp[] = {
"\n\n",
"To execute commands in the menu, enter the first letter of the command.\n\n",
"New     New user entry, find the first empty record and enter edit mode.\n",
"Search  Search for a user ID in the database.\n",
"Jump    Jump to a specific record or end of file.\n",
"Backup  Backup one record in the database and display it.\n",
"Forward Forward to next record in database and display it.\n",
"Edit    Edit the current record being displayed.\n",
"        ID of SUPER is used for access to this program. Enter it like\n",
"        other users. If not entered, access defaults to MASTER.\n",
"        ID of MASTER is reserved. Do not use it.\n",
"        The last digit of the Algorithm is the APG flag:\n",
"         1 = Automatic PassWord Generation enabled, 0 = APG disabled.\n",
"        Algorithm FFFF disables challenge, access is always granted.\n",
"        Algorithm 0000 disables challenge, access is never granted.\n",
"Delete  Delete the current record being displayed.\n",
#if USERID
"Config  Set ID source to either console or operating system user name.\n",
#else
"Config  Set various paramters:\n",
#endif
"        Set default PassWord length for users.\n",
"        Set echo modes for ID and PassWord entry.\n",
"        Set case mode for ID.\n",
"        Set action to take on Access/Fail condition.\n",
"Quit    Quit the database editor, and return to the Main Menu.\n",
"\nPress [RETURN] to continue ",
 0
};

static char *ea[] = {
"\n\n\nNew Search Jump Backup Forward Edit Delete Config Help Quit: ",
"\n\tRecord # ",
```

```
"\n\tIdentification: ",
"\n\tAlgorithm: ",
"\n\nEnd of file, add new records here.",
"\n\tExecutable file: ",
"\n\tParameter line: ",
"\n\tPassword length: ",
"\n\tDefault Password length: ",
 0
};

editaccess() {                  /* edit current access file */
        int c;

faterr = 0;     /* reset fatal error flag */
        if(!getaparm()) {       /* get file parameters */
                waitr();
                return;
        }
        if(!backup()) {         /* make bakup files */
                waitr();
                return;
        }
        edrec = 1;

for(;;) {               /* main edit loop */
                ednew = 0;
                printf("\n\n\n\n");
                if(!showrec(edrec))
                        goto fatal;
                putline(ea[0]);
                while(!index("NSJBFEDHCQ", c = keyinr() & 0xdf))
                        printf("\007");
                putchar(c);
                printf("\n");

switch(c) {
                case 'N':
                        enternew();
                        break;
                case 'S':
                        findid();
                        break;
                case 'J':
                        jump();
                        break;
                case 'B':
                        if(edrec > 1)
                                --edrec;
                        break;
                case 'F':
                        if(edrec < aparm.alast)
                                ++edrec;
                        break;
                case 'E':
                        enterrec(edrec);
                        break;
                case 'D':
                        delrec(edrec);
                        break;
                case 'H':
                        putmsg(eahelp);
                        waitr();
                        break;
```

```
                case 'C':
                        if(enterxdata())
                                enterconf();
                        break;
                case 'Q':
                        goto ret;
                }
                if(faterr)
                        goto fatal;
        }
ret:                     /* delete bakup files and return */
        delbak();
        return;
fatal:                   /* fatal error, recover org files and return */
        if(recover())
                printf("\n\nDue to fatal error, orginal database has been restored")
        else
                printf("\n\nFailed to restore database after fatal error");
        waitr();
} jump() {                                /* jump to a specific record */
        printf("\n\nEnter record number (use 'L' for last): ");
        if(!getstr(instr, sizeof(instr), 1))
                return;
        if(*instr == 27)
                return;
        if(index(instr, 'l') || index(instr, 'L')) {
                edrec = aparm.last;
                return;
        }
        edrec = atoi(instr);
        if(edrec < 1)
                edrec = 1;
        if(edrec > aparm.last)
                edrec = aparm.last;
        return;
} findid() {                              /* find a specific ID */
        unsigned short int retcode;
        printf("\n\nEnter ID to find: ");
        if(!getid(idin, IDSIZ + 1, 1, aparm.cap))
                return(1);
        if(*idin == 27)
                return(1);
        if((retcode = readbt(ifile, idin)) == 0xffff)
                goto ferr;
        if(retcode == 0) {
                printf("\n\nCan't find ID: %s",idin);
                goto retw;
        }
        edrec = retcode;
        return(1);
retw:
        waitc();
        return(1);
```

```
ferr:
        faterr = 1;
        return(0);
} enternew() {                            /* find empty rec and enter new user */ if(edrec = aparm.afree) {       /* if rec in free list */
                if(!getfree(edrec))
                        goto ferr;
        } else {                        /* else add to end of file */
                ararec();
                edrec = ++aparm.alast;
                if(!putarec(edrec))
                        goto ferr;
                if(!putaparm())
                        goto ferr;
        }
        ednew = 1;
        return(enterrec(edrec));        /* go get data */
ferr:
        faterr = 1;
        return(0);
} static char *ma[] = {
"Identification: ",
"Algorithm (as 5 digit hex number): ",
"Name of executable file: ",
"\nInvalid Algoritm.\n\n",
"Parameter line: ",
"PassWord length (0 for default): ",
"User default PassWord length: ",
"\nEnter data ([RETURN] for current data, [ESC] to quit)\n\n",
"Supervisor PassWord length: ",
 0
};

enterrec(rec)   /* enter data into access record and update, ret success */
        unsigned short int rec;
{
        char oldid[IDSIZ + 1], oldflg;
        unsigned short int oldcon, oldpwdl, retcode;
        static unsigned short int lastcon, lastpwl;
        static char lastflg;

if(access.flnk) {               /* take out of free list if free */
                if(!getfree(rec))
                        goto ferr;
        }
        strcpy(oldid, access.aid);      /* save current data in case of user abort */
        oldcon = access.const;
        oldpwdl = access.upwdl;
        oldflg = access.flags;
        if(entflg && ednew) {           /* if new rec, default to last entry if any */
                access.const = lastcon;
                access.upwdl = lastpwl;
                access.flags = lastflg;
        }

/* get data */
```

```
putline(ma[7]);
for(;;) {
    putline(ma[0]);
    getid(idin, IDSIZ + 1, 1, aparm.cap);
    if(*idin == 0x1b)
        goto retua;
    if(*idin) {
        strcpy(access.aid, idin);
    } else {
        if(!(*access.aid)) {
            printf("\n\nMust enter new ID.\n\n\007");
            continue;
        }
    }
    if((retcode = readbt(ifile, access.aid)) == 0xffff)
        goto ferr;
    if(retcode != 0 && retcode != rec) {
        printf("\n\nID: %s already exists.\n\n\007",idin);
        continue;
    }
    break;
} for(;;) {
    putline(ma[1]);
    getstr(instr, sizeof(instr), 1);
    if(*instr == 0x1b)
        goto retua;
    if(*instr == 0)
        break;
    if(strlen(instr) == 5) {
        if(instr[4] == '0')
            access.flags = 0;  /* set apg flg */
        else
            access.flags = 1;
        instr[4] = 0;
        access.const = atoh(instr);
        break;
    }
    putline(ma[3]);
}
putline(ma[5]);
getstr(instr, sizeof(instr), 1);
    if(*instr == 0x1b)
        goto retua;
    if(*instr)
        access.upwdl = atoi(instr);
    if(access.upwdl < 0)
        access.upwdl = 0;

lastcon = access.const;      /* save data for future */
lastflg = access.flags;
lastpwl = access.upwdl;
entflg = 1;                  /* flag we saved it */
access.seed = rnd1;          /* scramble apg seed */
if(!putarec(rec))
    goto ferr;
if(strcmp(oldid, access.aid) != 0) {
    access.uselnk = 0;
    access.faillnk = 0;      /* new rec so 0 log links */
    if(*oldid) {             /* delete old id from index */
        if(delbt(ifile, oldid) == 0xffff)
            goto ferr;
```

```
        }
            if(!insbt(ifile, access.aid, rec))    /* insert new id in index */
                    goto ferr;
    }
    return(1);

retua:

/* here if user aborted task, we must make sure empty recs re */
    /* deleted, others restored to to original state */ if(!(*oldid))
            return(delrec(rec));
    strcpy(access.aid, oldid);
    access.const = oldcon;
    access.upwdl = oldpwdl;
    access.flags = oldflg;
    return(1);
ferr:
        faterr = 1;
        return(0);
} enterconf() {                        /* input configuration info */
        int c;

printf("\n\n\nInstall configuration data.\n");
        dispconf();

do {
            putline(ma[7]);

#if USERID
        printf("Get ID from User name? (on/off): ");
        getstr(instr, sizeof(instr), 1);
        if(*instr == 0x1b)
                goto abo;
        if(index(instr, 'n') || index(instr, 'N'))
                aparm.useuser = 1;
            else if(index(instr, 'f') || index(instr, 'F'))
                aparm.useuser = 0;
endif putline(ma[6]);
        getstr(instr, sizeof(instr), 1);
        if(*instr == 0x1b)
                goto abo;
        if(*instr)
                aparm.dpwdl = (short)(atoi(instr));
        if(aparm.dpwdl == 0)
                aparm.dpwdl = PWDSIZ;

if(!aparm.useuser) {
                printf("Echo ID during entry? (on/off): ");
                getstr(instr, sizeof(instr), 1);
                if(*instr == 0x1b)
                        goto abo;
                if(index(instr, 'n') || index(instr, 'N'))
                        aparm.idecho = 1;
                else if(index(instr, 'f') || index(instr, 'F'))
                        aparm.idecho = 0;
        }
```

```c
        printf("Echo PassWord during entry? (on/off): ");
        getstr(instr, sizeof(instr), 1);
        if(*instr == 0x1b)
            goto abo;
        if(index(instr, 'n') || index(instr, 'N'))
            aparm.pwecho = 1;
        else if(index(instr, 'f') || index(instr, 'F'))
            aparm.pwecho = 0;

printf("Ignore ID case? (on/off): ");
        getstr(instr, sizeof(instr), 1);
        if(*instr == 0x1b)
            goto abo;
        if(index(instr, 'n') || index(instr, 'N'))
            aparm.cap = 1;
        else if(index(instr, 'f') || index(instr, 'F'))
            aparm.cap = 0;

dispconf();
    } while ((c = yes("\n\nIs all information correct?")) == 0);
    if(c < 0)
        goto abo;

if(!putaparm())
        goto ferr;
    return(1);
abo:
    if(!getaparm())
        goto ferr;
    return(1);
ferr:
    faterr = 1;
    return(0);
} dispconf() {                            /* display current config info */
if USERID
    printf("\n\n\tGet ID from User name         %s", aparm.useuser? "ON": "OFF
#endif
    printf("\n\tUser default PassWord length: %d", aparm.dpwdl);
    if(!aparm.useuser)
        printf("\n\tEcho ID during entry          %s", aparm.idecho? "ON":
    printf("\n\tEcho PassWord during entry    %s", aparm.pwecho? "ON": "OFF");
    printf("\n\tIgnore ID case                %s\n", aparm.cap? "ON": "OFF");
} static char *gxmsg[] = {
"\n\n\nSet action to take on Access/Fail condition.\n\n",
 0
};

enterxdata() {                          /* input execution file & parm line */
    int c;

putmsg(gxmsg);
    *aparm.xcmd = 0;
    *aparm.nxcmd = 0;
    dispxd();

do {
        printf("\nEnter data ([RETURN] for no data, [ESC] to quit)\n\n");
        printf("* Action for Access granted *\n");
```

```
        putline(xprompt);
        getstr(aparm.xfile, sizeof(aparm.xle), 1);
        if(*aparm.xfile == 0x1b)
                goto abo;
        if(*aparm.xfile) {
                if(*cprompt) {
                        putline(cprompt);
                        getstr(aparm.xcmd, sizeof(aparm.xcmd), 1);
                        if(*aparm.xcmd == 0x1b)
                                goto abo;
                }
        } else
                *aparm.xcmd = 0;
        printf("* Action for Failed access *\n");
        putline(xprompt);
        getstr(aparm.nxfile, sizeof(aparm.nxfile), 1);
        if(*aparm.nxfile == 0x1b)
                goto abo;
        if(*aparm.nxfile) {
                if(*cprompt) {
                        putline(cprompt);
                        getstr(aparm.nxcmd, sizeof(aparm.nxcmd), 1);
                        if(*aparm.nxcmd == 0x1b)
                                goto abo;
                }
        } else
                *aparm.nxcmd = 0;
        dispxd();
   } while ((c = yes("\nIs all information correct?")) == 0);
   if(c < 0)
        goto abo;

printf("\n");
   if(!putaparm())
        goto ferr;
        if(*aparm.xfile) {
                if(!hide(aparm.xfile))
                        waitc();
        }
   return(1);
abo:
   if(!getaparm())
        goto ferr;
   return(1);
ferr:
        faterr = 1;
        waitc();
        return(0);
} dispxd() {                               /* display execution data */
        printf("\n\t* Action for Access granted *\n");
        putline(xhead);
        if(*aparm.xfile)
                printf("%s", aparm.xfile);
        else
                printf("<exit program with ok status>");
        if(*chead) {
                putline(chead);
                if(*aparm.xcmd)
                        printf("%s\n", aparm.xcmd);
                else
                        printf("<no parameters specified>");
```

```
        }
        printf("\n\n\t* Action for Failed access *\n");
        putline(xhead);
        if(*aparm.nxfile)
                printf("%s", aparm.nxfile);
        else
                printf("<exit program with error status>");
        if(*chead) {
                putline(chead);
                if(*aparm.nxcmd)
                        printf("%s\n", aparm.nxcmd);
                else
                        printf("<no parameters specified>");
        }
        printf("\n");
} delrec(rec)             /* empty data flds of edrec, add to free list */
        int rec;        /* and remove id from index, return success */
{
        unsigned short node;

/* delete key from index file */
        if(*access.aid) {
                if(delbt(ifile, access.aid) == 0xffff)
                        goto ferr;
        }
        if(access.flnk == 0) {
                if(!putfree(rec))       /* era and put in free list */
                        goto ferr;
        }
        return(1);
ferr:
        faterr = 1;
        return(0);
} erarec() {                      /* erase current access rec buffer(edrec) */
        access.seed = rnd2;
        access.flags = 0;
        access.upwdl = 0;
        strcpy(access.aid, "");
        access.const = 0;
} putfree(rec)    /* erase rec and add to free list, return success */
        unsigned short int rec;
{
        unsigned short int next, last;

if(aparm.afree == 0) {          /* if no free rec in list */
                erarec();
                access.flnk = access.blnk = aparm.afree = rec;
                if(!putarec(rec))
                        return(0);
        } else {        /* else we must insert into list */
                next = aparm.afree;
                if(!getarec(next))
                        return(0);
                last = access.blnk;
                access.blnk = rec;
```

```
                if(!putarec(next))                        return(0);
                if(!getarec(last))
                        return(0);
                access.flnk = rec;
                if(!putarec(last))
                        return(0);
                access.flnk = next;
                access.blnk = last;
                if(!putarec(rec))
                        return(0);
        }
        return(putaparm());
} getfree(rec)            /* remove rec from free list, return success */
        unsigned short int rec;
{
        unsigned short int next, last;

if(!getarec(rec))
                return(0);
        if(aparm.afree == 0 || access.flnk == 0) {
                printf("\nfree rec sync err");
                return(0);      /* not in free list */
        }
        if(access.flnk == rec)          /* if only rec in free list */
                aparm.afree = 0;
        else {                          /* else must delete from list */
                last = access.blnk;
                next = access.flnk;
                if(!getarec(last))
                        return(0);
                access.flnk = next;
                if(!putarec(last))
                        return(0);
                if(!getarec(next))
                        return(0);
                access.blnk = last;
                if(!putarec(next))
                        return(0);
                aparm.afree = next;
        }
        access.flnk = access.blnk = 0;  /* reset free list links */
        return(putaparm());             /* update free list root node */
} showrec(rec)                    /* get & display access record */
        int rec;
{
        if(!getarec(rec))
                return(0);
        dispacc(rec);
        return(1);
} dispacc(rec)                    /* display data in access rec */
        int rec;
{
        putline(ea[1]);
        printf("%d", rec);
        putline(ea[2]);
        intf("%s", access.aid);
        putline(ea[3]);
```

```
                printf("%04x%d",access.const, access.flags & 1);
                putline(ea[7]);
                if(access.upwdl)
                        printf("%d", access.upwdl);
                else
                        printf("default (%d)", aparm.dpwdl);
} static char *umsg[] = {
"\n\nCreate new Usage file.\n\n\n",
 0
};

mkuser() {                                      /* make new usage file */
        int tot;

putmsg(umsg);
        if((ufd = openf(ufile, 0)) >= 0) {
                close(ufd);
                if(!yes("An Usage file already exists. Do wish to supercede it?"))
                        goto retabo;
        }
        if((tot = gettot(sizeof(user))) == 0)
                goto retabo;
        uparm.atrib = 3;        /* fixed rec len & crypted */
        uparm.last = 0;
        uparm.next = 1;
        uparm.recl = sizeof(uparm);
        uparm.size = sizeof(user);
        uparm.max = (short)tot;
        uparm.free = 0;

if((ufd = creatf(ufile)) < 0) {
                filemsg(ufile, NCREAT);
                goto retabo;
        }
        if(!putblk(ufd, &uparm, sizeof(uparm))) {
                filemsg(ufile, NWRITE);
                close(ufd);
                unlinkf(ufile);
                goto retabo;
        }
        close(ufd);
        printf("\n\nTask complete.");
        waitr();
        return;
retabo:
        printf("\n\nTask aborted");
        waitr();
} static char *fmsg[] = {
"\n\nCreate new Fail file.\n\n\n",
 0
};

mkfail() {                                      /* make fail file */
        int tot;

putmsg(fmsg);
        if((ffd = openf(ffile, 0)) >= 0) {
                close(ffd);
```

```
                if(!yes("A Fail file already exists. Dwish to supercede it?") > 0)
                        goto retabo;
        }
        if((tot = gettot(sizeof(fail))) == 0)
                goto retabo;
        fparm.atrib = 3;        /* fixed rec len & crypted */
        fparm.last = 0;
        fparm.next = 1;
        fparm.recl = sizeof(fparm);
        fparm.size = sizeof(fail);
        fparm.max = (short)tot;
        fparm.free = 0;

if((ffd = creatf(ffile)) < 0) {
                filemsg(ffile, NCREAT);
                goto retabo;
        }
        if(!putblk(ffd, &fparm, sizeof(fparm))) {
                filemsg(ffile, NWRITE);
                close(ffd);
                unlinkf(ffile);
                goto retabo;
        }
        close(ffd);

printf("\n\nTask complete.");
                waitr();
                return;
retabo:
                printf("\n\nTask aborted");
                waitr();
} gettot(recsiz)                                  /* input log file size */
        int recsiz;
{
        int tot;

for(;;) {
                printf("Enter maximum number of records (%d bytes each) to keep: "
                if(!getstr(instr, sizeof(instr), 1))
                        return(0);
                if(*instr == 0x1b)
                        return(0);

tot = atoi(instr);
                if(tot < 32000 && tot > 0)
                        break;
                printf("\n\nInvalid number - use 1 to 32000\n\n");
        }
        return(tot);
} static char *frep[] = {
"\nNo information found in fail log.",
"\nReport complete.",
"\n\nPress [RETURN] key to continue, [ESC] to abort ",
 0
};

repflog() {                             /* reporfail log */
        unsigned short rec, repfrec();
```

```
clrscr();
if(!logopt(flfile))     /* input report options */
        goto retabo;
rptcnt = 0;             /* init count of items in report */
logerr = 0;             /* init err flg */
if(!getfparm())
        goto retabo;
if(fparm.last) {        /* if any rec in log file */
    if(*logid == 0) {   /* if report all users */
        rec = fparm.next - 1;
        while(rec)
                if(repfrec(rec--) == 0xffff)
                                goto retabo;
        rec = fparm.last;
        while (rec >= fparm.next)
                if(repfrec(rec--) == 0xffff)
                                goto retabo;
    } else {            /* else report one user */
        if(!getaparm())
                goto retabo;
        if(!getarec(logidx))
                goto retabo;

if(rec = access.faillnk) {
                inittime();
                do {
                        if(rec > fparm.last)
                                break;
                        if((rec = repfrec(rec)) == 0xffff)
                                goto retabo;
                } while(rec);
        }
    }
}
if(!rptcnt)
        putline(frep[0]);
else
        putline(frep[1]);
if(outf)
        close(lfd);
waitr();
return;
retabo:
        if(outf) {
                close(lfd);
                unlinkf(logfile);
        }
        printf("\n\rTask aborted");
        waitr();
} unsigned short int
repfrec(rec)            /* show fail rec, ret next rec #, ret -1 if */
        unsigned short rec;    /* error */
{ if(!getfrec(rec))
                return(0xffff);
        if(*logid) {    /* if one user, check for wrap around */
                if(strcmp(logid, fail.fid) != 0)
                        return(0);
                if(!earlier(fail.fdate, fail.ftime))
                        return(0);
```

```
}
        if(rptcnt == 0)
                repfhead();
        rptcnt += 1;
        if(!outf && rptcnt % 20 == 0) { /* if not file out & scrn full */
                putline(frep[2]);
                if(keyinr() == 27)
                        return(0xffff);
                repfhead();
        }
        rputlsp(fail.fid);
        rputchars(' ', IDSIZ - strlen(fail.fid));
        rputlsp(fail.fdate);
        rputlsp(fail.ftime);
        rputlsp(fail.key1);
        rputlsp(fail.pass1);
        rputchars(' ', 4 - strlen(fail.pass1));
        rputlsp(fail.key2);
        rputlsp(fail.pass2);
        rputeol();
                if(logerr)
                        return(0xffff);
                return(fail.fidlnk);
} static char *freph[] = {
"ID",
"Date",
"Time",
"Kwd",
"Pwd",
 0
};

repfhead() {                        /* print record header to scr or file */
        if(!outf)
                printf("\n\n\n");
        rputline(freph[0]);
        rputchars(' ',IDSIZ - 1);
        rputline(freph[1]);
        rputchars(' ',DATESIZ - 3);
        rputline(freph[2]);
        rputchars(' ',TIMESIZ - 3);
        rputline(freph[3]);
        rputchars(' ', KWDSIZE - 2);
        rputline(freph[4]);
        rputchars(' ', 2);
        rputline(freph[3]);
        rputchars(' ', KWDSIZE - 2);
        rputline(freph[4]);
        rputchars(' ', 2);
        rputeol();
        rputchars('-', IDSIZ);
        rputchars(' ', 1);
        rputchars('-', DATESIZ);
        rputchars(' ', 1);
        rputchars('-', TIMESIZ);
        rputchars(' ', 1);
        utchars('-', KWDSIZE);
        rputchars(' ', 1);
        rputchars('-', 4);
        rputchars(' ', 1);
```

```
                rputchars('-', KWDSIZE);
                rputchars(' ', 1);
                rputchars('-', 4);
                rputeol();
        } static char *urep[] = {
        "\nNo information found in usage log.",
        "\nReport complete.",
        "\n\nPress [RETURN] key to continue, [ESC] to abort ",
        "Yes",
        "No",
         0
        };

repulog() {                                     /* report usage log */
                unsigned short rec, repurec();
                clrscr();
                if(!logopt(ulfile))      /* get report options */
                        goto retabo;
                rptcnt = 0;
                logerr = 0;
                if(!getuparm())
                        goto retabo;
                if(uparm.last) {         /* if any recs in log */
                        if(*logid == 0) {   /* if report all users */
                                rec = uparm.next - 1;
                                while(rec)
                                        if(repurec(rec--) == 0xffff)
                                                goto retabo;
                                rec = uparm.last;
                                while (rec >= uparm.next)
                                        if(repurec(rec--) == 0xffff)
                                                goto retabo;
                        } else {            /* else report one user */
                                if(!getaparm())
                                        goto retabo;
                                if(!getarec(logidx))
                                        goto retabo;
                                if(rec = access.uselnk) {
                                        intime();
                                        do {
                                                if(rec > uparm.last)
                                                        break;
                                                if((rec = repurec(rec)) == 0xffff)
                                                        goto retabo;
                                        } while(rec);
                                }
                        }
                }
                if(!rptcnt)
                        putline(urep[0]);
                else
                        putline(urep[1]);
                if(outf)
                        close(lfd);
                waitr();
                return;
        retabo:
                if(outf) {
                        close(lfd);
                        unlinkf(logfile);
                }
```

```
        printf("\n\nTask aborted");
        waitr();
} unsigned short int
repurec(rec)                            /* show usage rec, ret next rec#, -1 error */
        unsigned short int rec;
{
        if(!geturec(rec))
                return(0xffff);
        if(*logid) {                    /* if one user, ck for wrap around */
                if(strcmp(logid, user.uid) != 0)
                        return(0);
                if(!earlier(user.udate, user.utime))
                        return(0);
        }
        if(rptcnt == 0)
                repuhead();
        rptcnt += 1;
        if(!outf && rptcnt % 20 == 0) {
                putline(urep[2]);
                if(keyinr() == 27)
                        return(0xffff);
                repuhead();
        }
        rputlsp(user.udate);
        rputlsp(user.utime);
        rputlsp(user.uid);
        rputchars(' ', IDSIZ - strlen(user.uid));
        if(user.accessed)
                rputline(urep[3]);
        else
                rputline(urep[4]);
        rputeol();
        if(logerr)
                return(0xffff);
        return(user.uidlnk);
} static char *ureph[] = {
"Date",
"Time",
"ID",
"Access granted",
 0
};

repuhead() {                            /* print record header to scr or file */
        if(!outf)
                printf("\n\n\n");
        rputline(ureph[0]);
        rputchars(' ',DATESIZ - 3);
    rputline(ureph[1]);
        rputchars(' ',TIMESIZ - 3);
        rputline(ureph[2]);
        rputchars(' ',IDSIZ - 1);
        rputline(ureph[3]);
        rputeol();
        rputchars('-', DATESIZ);
        rputchars(' ', 1);
        rputchars('-', TIMESIZ);
        rputchars(' ', 1);
```

```
                rputchars('-', IDSIZ);
                rputchars(' ', 1);
                rputchars('-', 14);
                rputeol();
        } logopt(lfn)             /* ask report options for logs, return 0 for abort */
        char *lfn;      /* lfn is default out file name for log */
{
        int retcode;

outf = 0;       /* reset out to file flag */
        if((retcode = yes("\n\nWrite log report to a file?")) > 0) {
                printf("\nEnter log file name ([Return] for default %s): ",lfn);
                if(!getstr(logfile, sizeof(logfile), 1))
                        strcpy(logfile, lfn);
                else if (*logfile == 27)
                        return(0);
                if((lfd = creatf(logfile, 2)) < 0) {
                        filemsg(logfile, NCREAT);
                        return(0);
                }
                outf = 1;
        } else if (retcode == -1)
                return(0);
        for(;;) {
                printf("\n\nEnter user ID to report ([Return] for all users): ");
                if(!getid(logid, sizeof(logid), 1, aparm.cap))
                        goto ret1;
                if(*logid == 27)
                        goto ret0;
                if((logidx = readbt(ifile, logid)) == 0xffff)
                        goto ret0;
                if(logidx)
                        goto ret1;
                printf("\nCan't find ID: %s", logid);
        }
ret0:
        printf("\n");
        return(0);
ret1:
        printf("\n");
        return(1);
} inittime() {    /* init time compare to future, used by earlier() */
        strcpy(lasttime, "2460");
        strcpy(lastdate, "1231");
} earlier(date, time)     /* check time against last time, return compare */
                        /* this funbc allows us to determine end of user */
                        /* log recs cuz they may have been over written by */
                        /* a later entry */
        char *date, *time;
{
        int comp;

if((comp = strcmp(lastdate, date)) < 0)
                return(0);
        if(comp > 0)
                return(1);
```

```
        if((comp = strcmp(lasttime, time)) < 0)
                return(0);
        return(1);      /* return earlier if times same */
}
rputlsp(s)      /* print str to screen or file, add space */
        char *s;
{
        rputline(s);
        rputchars(' ', 1);
} rputeol() {     /* write \n to screen or file */
                /* eol is defined in IDSD */
        if(outf) {
                if(writef(lfd, eol, strlen(eol)) < 0)
                        logerr = 1;
        } else
                printf("\n");
}
rputline(s)     /* print str to screen or file, dont use \n */
        char *s;
{
        if(outf) {
                if(writef(lfd, s, strlen(s)) < 0)
                        logerr = 1;
        } else
                printf("%s", s);
} rputchars(c, n)         /* char c n times to file or screen */
        char c;
        int n;
{
        if(outf) {
                while(n--) {
                        if(writef(lfd, &c, 1) < 0) {
                                logerr = 1;
                                return;
                        }
                }
        } else {
                while(n--)
                        putchar(c);
        }
} backup() {      /* backup Access and Index files in case of fatal err */
        if(!copyf(bafile, afile))
                return(0);
        if(!copyf(bifile, ifile)) {
                unlinkf(bafile);
                return(0);
        }
        return(1);
} recover() {     /* had a fatal err so restore org files */
        int success = 1;

if(!copyf(afile, bafile))
                success = 0;
        if(!copyf(ifile, bifile))
                success = 0;
```

```
        if(success) {
                delbak();
                return(1);
        } else
                return(0);
}
        rputchars(' ', 1);
} rputeol() {     /* write \n to screen or file */
                /* eol is defined in IDSD */
        if(outf) {
                if(writef(lfd, eol, strlen(eol)) < 0)
                        logerr = 1;
        } else
                printf("\n");
}
rputline(s)     /* print str to screen or file, dont use \n */
        char *s;
{
        if(outf) {
                if(writef(lfd, s, strlen(s)) < 0)
                        logerr = 1;
        } else
                printf("%s", s);
} rputchars(c, n)         /* char c n times to file or screen */
        char c;
        int n;
{
        if(outf) {
                while(n--) {
                        if(writef(lfd, &c, 1) < 0) {
                                logerr = 1;
                                return;
                        }
                }
        } else {
                while(n--)
                        putchar(c);
        }
} backup() {      /* backup Access and Index files in case of fatal err */
        if(!copyf(bafile, afile))
                return(0);
        if(!copyf(bifile, ifile)) {
                unlinkf(bafile);
                return(0);
        }
        return(1);
} recover() {     /* had a fatal err so restore org files */
        int success = 1;

if(!copyf(afile, bafile))
                success = 0;
        if(!copyf(ifile, bifile))
                success = 0;
        if(success) {
                delbak();
                return(1);
        } else
                return(0);
}
```

```
delbak() {         /* no fatal err so delete backup files */
        unlinkf(bafile);
        unlinkf(bifile);
} waitr() {                           /* pause till key in */
        printf("\n\nPress [RETURN] key to return to menu. ");
        pauser();
} waitc() {
        printf("\n\nPress [RETURN] key to continue. ");
        pauser();
} chain() {       /* dummy func to satisfy IDSD since we dont use exec.o */
}
/*
 *      BIREAD.C
 *
 *      Module for obtaining a data pointer from an index file
 *      (created by BIEDIT) given a unique key.
 *
 *      3/8/85  Jim Tucker
 *
 */
include <stdio.h>
#include "btdef.h"

unsigned short int
readbt(fname, key)                  /* return data ptr for key, 0xffff = err */
                                    /* 0 = not found */
        char *fname, *key;
{
        unsigned short rp, findkey();

if(!openidx(fname, 0))
                return(0xffff);
        rp = (key);
        closeidx();
        return(rp);
} openidx(fname, mode)                /* open B+ tree index file, return success */
                                    /* automatically loads root node and inits vars */
        char *fname;
        int mode;       /* 0=rd only, 1=wr only, 2=rd/wr */
{
        strcpy(idxfile, fname);             /* save file name for future ref */
                                            /* by other functions */
        if((ifd = openf(idxfile, mode)) < 0) {  /* open index file */
                filemsg(idxfile, NOPEN);
                return(0);
        }
        if(!getblk(ifd, &iparm, sizeof(iparm))) {
                closeidx();
                filemsg(idxfile, NREAD);
                return(0);
        }

/* order of tree */
        order = (iparm.ndsiz - 1 - sizeof(short)) / (iparm.keylen + sizeof(short))
        klen = iparm.keylen;                    /* for quick ref */
```

```
        fptrptr = (short *)ndbuf;                              /* ptr to ptrs */
        fkeyptr = ndbuf + (order * sizeof(short));             /* ptr to 1st key */
        lfp = ndbuf + iparm.ndsiz - 1 - sizeof(short);         /* ptr to leaf flag */ if(!getnode(iparm.rootnd, ndbuf)) {                    /* load root */
                closeidx();
                return(0);
        }
        return(1);
} closeidx() {                            /* close index file and free memory */
        close(ifd);
}
unsigned short int
findkey(key)                            /* find key in currently open index file */
        char *key;                      /* return 0 if not found, -1 if err */
{
        unsigned short int  node, *ip, recno;
        char *kp;

if(curnode != iparm.rootnd) {
                if(!getnode(node = iparm.rootnd))
                        return(0xffff);
        }
        for(;;) {
                ip = fptrptr;   /* make int ptr to node */
                kp = fkeyptr;
                if(*lfp == 'N') {
                        while(strcmp(kp, "") != 0 && strcmp(kp, key) < 0) {
                                ip++;
                                kp += (klen);
                        }
                        node = *ip;
                        if(!getnode(node, ndbuf))
                                return(0xffff);
                } else {
                        while(*ip != 0) {
                                if(strcmp(kp, key) == 0)
                                        return(*ip);
                                ip++;
                                kp += klen;
                        }
                        return(0);      /* not found */
                }
        }
} getnode(node, np)                       /* get node from file to np, return success
                                                                             */
        unsigned short int node;
        char *np;
{
        long offset, lseek();

if(np == ndbuf)
                curnode = node;
        offset = (long)((iparm.ndsiz * (node - 1)) + iparm.ncdel);

if(lseek(ifd, offset, 0) < 0) {
                filemsg(idxfile, NPOS);
                return(0);
        }
```

```c
        if(!getblk(ifd, np, NDSIZ)) {
                filemsg(idxfile, NREAD);
                return(0);
        }
        return(1);
}
/*
 *      BTEDIT.C
 *
 *      Module for creating and editing B+ tree index files.
 *      Needs BTREAD and BTDEF.H
 *
 *      3/8/85  Jim Tucker
 *
 */
include <stdio.h>
#include "btdef.h"

define PSTKMAX 50              /* max depth for place stack */ static unsigned short int pstkptr,      /* pointer into place stack */
                        pstk[PSTKMAX];  /* place stack */ static char tempbuf[NDSIZ];             /* extra node buffer */
static char freebuf[NDSIZ];             /* extra node buffer */ unsigned short int ppop(), getnew();
long lseek();

insbt(fname, key, dataptr)    /* insert a key in an index file, return success */
        char *fname, *key;
        unsigned short dataptr;
{
        int success;

if(!openidx(fname, 2))
                return(0);
        success = inskey(key, dataptr);
        close(ifd);
        return(success);
} delbt(fname, key)          /* delete key from index le, ret 1 ok, */
                           /* 0 not found, 0xffff error */
        char *fname, *key;
{
        int retcode;

if(!openidx(fname, 2))
                return(0);
        retcode = delkey(key);
        close(ifd);
        return(retcode);
} creatbt(fname, keylen)          /* create a new index file, return success */
                                /* closes file after creation */
        char *fname;
        int keylen;
{
        strcpy(idxfile, fname);         /* save file name for future ref */
                                        /* by other functions */
```

```
        iparm.atribu = 3;              /* fixed rec len & crypted */
        iparm.rootnd = 1;              /* init iparm rec */
        iparm.keylen = keylen + 1;     /* add 1 for str terminator */
        iparm.lastnd = 1;
        iparm.freend = 0;
        iparm.nodel = sizeof(iparm);
        iparm.ndsiz = NDSIZ;

clrnode(ndbuf);                /* clr node buffer to all 0's */
        lfp = ndbuf + NDSIZ - 3;
        *lfp = 'Y';                    /* set leaf flag */ if((ifd = creatf(idxfile)) < 0) {
                filemsg(idxfile, NCREAT);
                return(0);
        }
        if(!putiparm())
                goto err;
        if(!putnode(1, ndbuf))
                goto err;
        close(ifd);
        return(1);
err:
        close(ifd);
        unlinkf(idxfile);
        return(0);
} clrnode(np)                            /* clr node to all 0's */
        char np[];
{
        int i;

for(i = 0; i < NDSIZ; i++)
                np[i] = 0;
} inskey(key, dataptr)   /* insert a key in index file, retrun success */
                       /* must have executed openidx() in update mode */
                       /* before calling this function */
                       /* this function leaves the file open */
        char *key;
        unsigned short int dataptr;
{
        unsigned short int i, newnode, kpos, node, holdptr;
        unsigned short int *ip, *ip1, *ip2, *ip3, last;
        char *cp,*cp1,*cp2,*cp3, *ftkeyptr, leaf;

ftkeyptr = tempbuf + (order * sizeof(short));   /* ptr to 1st key in new *

/* find place to insert key */
        if(place(key) == 0xffff)       /* leave node/key(s) on stack */
                return(0);
        if((kpos = ppop()) == 0xffff)
                return(0);
        if((node = ppop()) == 0xffff)
                return(0);
        leaf = 'Y';

for(;;) {
                ip = fptrptr + (order - 1);
                holdptr = *ip;         /* save last ptr */

/* move rec ptrs right 1 position */
```

```
        ip2 = ip;                   /* dest */
        ip1 = ip2 - 1;              /* source */
        ip3 = fptrptr + kpos;       /* last to move */
        while(ip1 >= ip3)
                *ip2-- = *ip1--;

/* move keys right 1 position */
cp2 = fkeyptr + ((klen) * (order - 1));  /* dest */
cp1 = cp2 - klen;                        /* source */
cp3 = fkeyptr + (kpos * klen);           /* last to move */
while(cp1 >= cp3) {
        strcpy(cp2, cp1);
        cp1 -= klen;
        cp2 -= klen;
} strcpy(cp3, key);           /* insert key & ptr */
*ip3 = dataptr;
*lfp = leaf;                /* and set leaf flag */

/* test for key overflow, save and quit if none */
cp = fkeyptr + ((klen) * (order - 1));
if(strcmp(cp, "") == 0) {
        if(!putnode(node, ndbuf))
                return(0);
        return(1);
}
/* else must divide node */ last = (order / 2) + 1;
newnode = 0;

/* move last half of keys to new node */
cp2 = ftkeyptr;                          /* dest */
cp1 = fkeyptr + (last * klen);           /* source */
cp3 = fkeyptr + (order * klen);  /* one past last to move */
while(cp1 < cp3)
        *cp2++ = *cp1++;

/* move last half of ptrs to new node */
ip2 = (short *)tempbuf;         /* dest */
ip1 = fptrptr + last;           /* source */
ip3 = fptrptr + order;          /* one past last to move */
while(ip1 < ip3)
        *ip2++ = *ip1++;
*ip2 = holdptr;                 /* insert ovrflo ptr */

/* zero remaining ptrs and keys in new node */
ip3 = (short *)ftkeyptr;        /* one past last to null */
while(++ip2 < ip3)
        *ip2 = 0;
cp3 = tempbuf + NDSIZ;          /* one past last to null */
while(cp2 < cp3)
        *cp2++ = '\000';

/* set leaf flag to old value */
cp = tempbuf + NDSIZ - 1 - sizeof(short);
*cp = leaf;

/* get last key in first half of split node */
```

```
        cp1 = fkeyptr + (last - 1) * klen;
        strcpy(key, cp1);

/* zero moved keys and ptrs in split node */
        ip1 = fptrptr + last;    /* start */
        ip3 = fptrptr + order;   /* end + 1 */
        while(ip1 < ip3)
                *ip1++ = 0;
        cp1 = ndbuf + (last * klen);    /* start */
        cp3 = ndbuf + (order * klen);   /* end + 1 */
        while(cp1 < cp3)
                *cp1++ = '\000';

if(!(newnode = getnew()))           /* record new node # */
                return(0);
        if(!putnode(newnode, tempbuf))    /* write out new node */
                return(0);
        if(!putnode(node, ndbuf))         /* write split node */
                return(0);
        if(!putiparm())
                return(0);                  /* update iparm rec */

/* get next node off stack */
        dataptr = node;           /* save node value before poping stk */
        if((kpos = ppop()) == 0xffff)
                return(0);
        if((node = ppop()) == 0xffff)
                return(0);

/* if not null, get parent node and insert ptr & key for new node */
        if(node) {
                if(!getnode(node, ndbuf))
                        return(0);
                ip = fptrptr + kpos;
                *ip = newnode;     /* insert new node # */
                leaf = 'N';        /* mark as branch node */
                continue;          /* go insert key */
        }

/* else it was the root we split, so make new root */
        clrnode(ndbuf);
        ip = fptrptr;
        *ip++ = dataptr;                  /* insert ptr to split node */
        *ip = newnode;                    /* insert ptr to new node */
        strcpy(fkeyptr, key);             /* insert key */
        *lfp = 'N';                       /* reset leaf flag, ie mark as branch */
        if(!(newnode = getnew()))         /* get new node number */
                return(0);
        if(!putnode(newnode, ndbuf))
                return(0);
        iparm.rootnd = newnode; /* update root node number */
        if(!putiparm())         /* update iparm rec */
                return(0);

return(1);       /* call it successful */
    } /* end forever loop */
} delkey(key)              /* delete key from index, return -1 err, 1 ok */
    char *key;     /* 0 not found, file must have been opened */
```

```
    unsigned short int i, *ip, *ip1, *ip2, *ip3, node, kpos, ln, rptr;
    char *cp, *cp1, *cp2, *cp3, rkey[KEYMAX];

*rkey = '\000';
    rptr = 0;

/* find key to be deleted in leaf */
    if(!(node = place(key)))    /* leave node/key(s) on stack */
        return(0);
    if(node == 0xffff)
        return(0xffff);
    if((kpos = ppop()) == 0xffff)
        return(0xffff);
    if((node = ppop()) == 0xffff)
        return(0xffff);
    for(;;) {
        if(*lfp == 'Y') {              /* leaf node */
            lshift(kpos);
            if(kpos)
                strcpy(rkey, fkeyptr + (klen * (kpos - 1)));
            else
                *rkey = '\000';
            if(*fkeyptr != 0 || node == iparm.rootnd) {
                if(!putnode(node, ndbuf))
                    return(0xffff);
            } else {
                if(!freenode(node))
                    return(0xffff);
            }
        } else {                       /* branch node */
            if(strcmp(key, fkeyptr + (klen * kpos)) == 0) { /* key in node */
                if(*rkey) {                          /* have replacement */
                    strcpy(fkeyptr + (klen * kpos), rkey);
                    if(!putnode(node, ndbuf))
                        return(0xffff);
                } else {             /* no replacement so delete key & ptr */
                    lshift(kpos);
                    if(*fkeyptr) {    /* node has key(s) remaining */
                        if(!putnode(node, ndbuf))
                            return(0xffff);
                    } else {                /* node with no keys */
                        ln = *(fptrptr + kpos);
                        if(ln == 0) {   /* if node w/o key has no child */
                            if(node == iparm.rootnd) { /* root, dont free */
                                if(!putnode(node))
                                    return(0xffff);
                            } else {              /* free node */
                                freenode(node);
                                *rkey = '\000';
                            }
                        } else {   /* else node w/o key has child */
                            if(node == iparm.rootnd)    /* if root */
                                iparm.rootnd = ln;     /* child is new root */
                            else        /* setup grandparent to get child */
                                rptr = ln;
                            freenode(node);
                        }
                    }
                }
            }
        }
```

```
            } else {     /* key not in node */
                if(rptr) {
                    *(fptrptr + kpos) = rptr;  /* replace child with grand child */
                    rptr = 0;
                    if(!putnode(node))
                        return(0xffff);
                }
            }
        }
        if((kpos = ppop()) == 0xffff)     /* get next node up (parent) */
            return(0xffff);
        if((node = ppop()) == 0xffff)
            return(0xffff);
        if(node == 0)
            break;
        else {
            if(!getnode(node, ndbuf))
                return(0xffff);
        }
    } /* end forever loop */ if(!putiparm())
        return(0xffff);
    return(1);    /* success */

} /* end delkey */ freenode(node)    /* add node to free list, destroys ndbuf, ret success */
    unsigned short int node;
{
    *fptrptr = iparm.freend;
    iparm.freend = node;
    if(!putnode(node, ndbuf))
        return(0);
} lshift(kpos)              /* delete key and ptr from kpos in ndbuf */
    unsigned short int kpos;
{
    unsigned short int *ip1, *ip2, *ip3;
    char *cp1, *cp2, *cp3;

/* move keys left 1 pos */
    cp2 = fkeyptr + (kpos * klen);          /* dest */
    cp1 = cp2 + klen;                        /* source */
    cp3 = fkeyptr + (order * klen);  /* one past last to move */
    while(cp1 < cp3)
        *cp2++ = *cp1++;

/* move last half of ptrs to new node */
    ip2 = fptrptr + kpos;          /* dest */
    ip1 = ip2 + 1;                  /* source */
    ip3 = fptrptr + order;          /* one past last to move */
    while(ip1 < ip3)
        *ip2++ = *ip1++;

*(fptrptr + (order - 1)) = 0;   /* zero last ptr */
} unsigned short int
```

```
getnew() {          /* return a new node number from free list or */
                    /* add to end of file, update iparm rec */
                    /* destroys freebuf if free node is found */
                    /* return 0 if err */ unsigned short int node;

if(iparm.freend) {
                node = iparm.freend;
                if (!getnode(node, freebuf))
                        return(0);
                iparm.freend = *((short *)freebuf);
        } else
                node = ++iparm.lastnd;
        return(node);
} place(key)          /* find place for new key, return -1 err, 0 not /*
                    /* found, 1 found key */
                    /* leaves position and train on place stack */
        char *key;
{
        unsigned short int *ip, node, kpos;
        char *kp;

initpstk();
        node = iparm.rootnd;

do {
                ip = fptrptr;   /* ios++;
                        kp += (klen);
                }
                if(!ppush(node))                    /* save node number */
                        return(0xffff);
                if(!ppush(kpos))                    /* save key number */
                        return(0xffff);
                node = ip[kpos];                    /* next node if any */
        } while (node != 0 && *lfp != 'Y');
        if(strcmp(kp, key) == 0)
                return(1);
        return(0);
} putiparm() {                        /* put iparm rec in file, ret succes */
        if(lseek(ifd, 0L, 0) < 0) {
                filemsg(idxfile, NPOS);
                return(0);
        }
        if(!putblk(ifd, &iparm, sizeof(iparm))) {
                filemsg(idxfile, NWRITE);
                return(0);
        }
        return(1);
} putnode(node, np)                   /* put node in file, return success */
        int node;
        char *np;
{
```

```
        long offset;

if(np == ndbuf)
                curnode = node;
        offset = (long)((iparm.ndsiz * (node - 1)) + iparm.nodel);

if(lseek(ifd, offset, 0) < 0) {
                filemsg(idxfile, NPOS);
                return(0);
        }
        if(!putblk(ifd, np, NDSIZ)) {
                filemsg(idxfile, NWRITE);
                return(0);
        }
        return(1);
}
ppush(i)                                        /* push i to stack, return success */
        unsigned short int i;
{
        if(pstkptr < PSTKMAX) {
                pstk[pstkptr++] = i;
                return(1);
        }
        printf("\nPlace stack overflow");
        return(0);
} unsigned short int
ppop() {                                        /* pop val from top of stack */
                                                /* returns 0xffff if error */
        if(pstkptr > 0)
                return(pstk[--pstkptr]);
        printf("\lace stack underflow");
        return(0xffff);
} initpstk() {                                    /* empty stack and push 2 nulls */
        pstkptr = 0;
        ppush(0);
        ppush(0);
}
/*
*       IDDEF.H    Header file for ID, IDUTIL, IDMISC
*
*       This file contains common defintions and data structures
*       for the ID and IDUTIL programs
*
* 2/10/85    V0.2    Jim Tucker
* 3/25/85    V1.0    Jim Tucker     added compile time opt defaults
*                                   modified all structs for new
*                                   data base format.
*
* 4/10/85    V1.1    Jim Tucker     added sys.h include to vary defines,
*                                   modified aparm for new run time opts
*                                   od exec, ID source. Took out EXECFILE.
*/
#include "sys.h"
/* The following are the primary compile time options */ define ECHOPW 0    /* True = echo the PassWord during entry */
define ECHOID 0    /* True = echo the ID during entry */
#define UPCASE 1    /* True = ID is forced to upper case */
```

```c
#ifdef VMS
#define USERID 1        /* True = USER name from op sys is available for ID */
#endif
ifdef MSDOS
#define USERID 0        /* True = USER name from op sys is available for ID */
#endif
#define PWDSIZ 8        /* dflt # of digits in PassWord for users */
#define MPWDSIZ 16      /* dflt # of digits in PassWord for MASTER */

/* general dimensions */ define KWDSIZ 8        /* # of digits max in KeyWord */
ifdef VMS
#define FNSIZ 254       /* # of chars allowed in filenames */
#endif
ifdef MSDOS
#define FNSIZ 60        /* # of chars allowed in filenames */
#endif
ifdef VMS
#define CMDSIZ 2        /* # of chars allowed in cmd line */
#endif
ifdef MSDOS
#define CMDSIZ 60       /* # of chars allowed in cmd line */
#endif
#define IDSIZ 16        /* # of chars allowed in ID's */
#define DATESIZ 4       /* # of chars in date fld */
define TIMESIZ 4       /* # of chars in time fld */ define MSKSIZ 47       /* Size of encrypting mask, see crypt() */
define CBUFSIZ 1024    /* copy file buffer size */

/* symbols */ define ERRMSG 1        /* Display error messages flags */
define NOERRMSG 0
                        /* Message ptrs for filemsg()   */
#define NOPEN 0         /* "Can't open file:" */
#define NCREAT 1        /* "Can't create file:" */
#define NREAD 2         /* "Can't read file:" */
#define NWRITE 3        /* "Can't write file:" */
#define NPOS 4          /* "Can't position file:" */
#define NCONFIG 5       /* "Can't configure file:" */
#define NIORD 6         /* "I/O error reading file:" */
define NIOWR 7         /* "I/O error writing file:" */

/* data structures */ struct {
        unsigned short  aatrib,         /* file atributes in bit fields */
                                        /* bit 0 set = fixed record length */
                                        /* bit 1 set = crypted, last 2 bytes */
                                        /* in each rec is seed */
                        arecl,          /* offset to first rec */
                        asize,          /* record size */
                        alast,          /* last record number */
                        afree,          /* first free rec in free list */
                        dpwdl,          /* default user pwd length */
                        idecho,         /* echo id input flag */
                        pwecho,         /* echo pwd input flag */
                        cap,            /* force caps on id flag */
                        useuser;        /* use user name from os flag */
        char    xfile[FNSIZ + 1];       /* execution info for access */
```

```
        char    xcmd[CMDSIZ + 1];
        char    nxfile[FNSIZ + 1];           /* execution info for no access */
        char    nxcmd[CMDSIZ + 1];
        unsigned short  apmseed;             /* meta seed, used to crypt record */
} aparm ;

struct { unsigned short int flnk,             /* forward link for free rec list */
                blnk,                        /* backward link for free list */
                uselnk,                      /* link to use log */
                faillnk,                     /* link to fail log */
                seed,                        /* n3 - n0 for xlat, packed */
                upwdl,                       /* user pwd length, 0 = use defalt */
                const;                       /* constants for algo, packed */
        char    aid[IDSIZ + 1],              /* id str, "" = free rec */
                flags;                       /* bit0 = apg   bit1 = alarm */
        unsigned short int amseed;           /* meta seed, used to crypt record */
} access;

struct {
        char    fid[IDSIZ + 1],
                reported,
                fdate[DATESIZ + 1],
                ftime[TIMESIZ + 1],
                key1[KWDSIZ + 1],
                pass1[5],
                key2[KWDSIZ + 1],
                pass2[5];
        unsigned short int fidlnk;           /* link to records w/ same id */
        unsigned short int fmseed;           /* meta seed, used to crypt record */
} fail;
struct {
        char    udate[DATESIZ + 1],
                utime[TIMESIZ + 1],
                uid[IDSIZ + 1],
                accessed;
        unsigned short int uidlnk;           /* link to records w/ same id */
        unsigned short int umseed;           /* meta seed, used to crypt record */
} user;

struct {
        unsigned short  atrib,               /* file atributes in bit fields */
                                             /* bit 0 set = fixed record length */
                                             /* bit 1 set = crypted, last 2 bytes */
                                             /* in each rec is seed */
                recl,                        /* offset to first rec */
                size,                        /* size of rec */
                last,                        /* last rec number */
                free,                        /* not used */
                next,                        /* ptr to next rec to enter */
                max,                         /* max records allowed */
                pmseed;                      /* meta seed, used to crypt record */
} uparm, fparm;
/*
 *      SYS.H
 *
 *      Header file to designate environment
 */

/* DISPLAY: Define one of IBM, ANSI, or VANILLA                           */
```

```c
#define VANILLA

/* OPERATING SYSTEM: Define one of MSDOS, VMS or CPM        */ define MSDOS

/* COMPILER: Define one of C86, C88, VAX11C or AZTEC        */ define C88
/*
 *      Global defs and decls for BTREAD.C & BTEDIT.C
 *
 *      3/8/85  Jim Tucker
 */ define NDSIZ 1024      /* node size */
/* this size must be large enough to gaurantee a tree of at least order 3 */
/* order = (NDSIZ - 1) / (key length + key terminator + sizeof(rec ptr) */
/* optimum orders are generally 50 to 400, size should be mult of disk buf */ define KEYMAX 62       /* max key size, includes 0 terminator */
define FNMAX 254       /* max file name size */

/* Message ptrs for filemsg()   */
#define NOPEN 0         /* "Can't open file:" */
#define NCREAT 1        /* "Can't create file:" */
#define NREAD 2         /* "Can't read file:" */
#define NWRITE 3        /* "Can't write file:" */
#define NPOS 4          /* "Can't position file:" */
#define NCONFIG 5       /* "Can't configure file:" */
#define NIORD 6         /* "I/O error reading file:" */
define NIOWR 7         /* "I/O error writing file:" */ short   order;          /* calculated order of B+ tree */
                        /* order = (NDSIZ - 3) / (keylen + 3) */
char    ndbuf[NDSIZ];   /* node buffer array */
char    *fkeyptr;       /* ptr to 1st key in node */
unsigned short int *fptrptr,  /* int ptr to first pointer */
        klen;           /* current key length */
char    *lfp;           /* ptr to leaf flag, 'Y' = leaf; 'N' = branch */
unsigned short int curnode;  /* node number of node in ndbuf */ struct {                        /* 1st record of index file */
        unsigned short int atribu,  /* file atributes in bit fields */
                                /* bit 0 set = fixed record length */
                                /* bit 1 set = cyypted, seed in */
                                /* last 2 bytes of each record */
                        node1,  /* offset to 1st node */
                        ndsiz,  /* length of node */
                        lastnd, /* last node number */
                        freend, /* free node list */
                        rootnd, /* root node number */
                        keylen, /* length of key + 0 delimiter */
                        imseed; /* meta seed, to crypt rec */
        } iparm ;

/* nodes have no defining structure - see bt.doc for details */ char    idxfile[FNMAX]; /* idx file name */
int     ifd;            /* file descriptor */
```

```
/****************************************************************
*       File: ALGO.H
*
*       Header file for the XLAT module, containing the
*       entire algorithm.
*
*       This algorithm is for all demos and the authors kit
*
*       5/2/84
*       6/18/84         made label changes        JJT
*       6/27/84         changed algo to eliminate incn0   JJT
*
****************************************************************/ define KWDSIZE 7           /* number of digits in KeyWord */
define LOOPCNT 2           /* loop count in xlat function */
#define CDIGIT1 0           /* special command digit */
#define CDIGIT2 1           /* special command digit */
#define C0  1               /* addition constants */
#define C1  6
#define C2  3
#define C3  5
#define CMD1()  addc0()     /* translation commands */
#define CMD2()  swap10()
#define CMD3()  tcpln0()
#define CMD4()  incalm()
#define CMD5()  incalm()
#define CMD6()  swap10()
#define CMD7()  rotr4()
#define CMD8()  addc0()
#define CMD9()  addc2()
#define CMD10() addc0()
#define CMD11() addc123()
```

Appendix E

```
/****************************************************************

PATENT.C
```

This program is a very small example of the type of smokescreen and timebomb
code used to protect SafeWord PC-Safe. In this example, the correct password
and the correct ciper phrase to be used in subsequent encryption are assumed to
be known by the program; the user is only prompted for a "claimed" password.
The output of this program, upon entry of the correct password, is the correct
cipher phrase. If no attempt is made to "hack" into the code, i.e. if it is
run legitimately, the defensive code does not come into play; the program
either returns the correct cipher phrase or it returns with a failure status.
If an attempt is made to break the program with a debugger, disassembler or
other means, the program will corrupt the cipher phrase with incorrect values,
leading to incorrect decryption.

Input: correct password            :syspwd = syspwd1 ^ syspwd2 ^ 0xff
       correct cipher phrase       :incipher
       user's claimed password     :userpwd[]

output on success:                 :outcipher

```
****************************************************************/
```

```c
include <stdio.h> char incipher[4];           /* cipher phrase input to verification */
char outcipher[4];          /* cipher phrase returned from verification */
int smoke1[8];              /* first smoke screen array */
int smoke2[8];              /* second smoke screen array */
char smokelast[4];          /* final smoke screen array */
short intsmoke1[2] = {0,1}; /* first intermediate smoke screen array */
short intsmoke2[2] = {2,3}; /* second intermediate smoke screen array */
char syspwd1, syspwd2;      /* the components of the correct password */
char userpwd[2];            /* the user's claimed password */ main()
{
    init();                 /* initialize cipher and password */
    if(verified())          /* check validity of claimed password */
        fixcipher();        /* convert incipher to outcipher */
    else                    /* password check failed */
    {
        printf("Incorrect password");
        exit(0);
    }
    printf("\nActual password is: %c%c\n", (syspwd1 ^ 0xff), (syspwd2 ^ 0xff));
    printf("Claimed password is: %c%c\n", userpwd[0], userpwd[1]);
    printf("Actual cipher phrase is: %c%c%c%c\n", incipher[0], incipher[1], incipher[2], incipher[3]);
    printf("Returned cipher phrase is: %c%c%c%c\n", outcipher[0], outcipher[1], outcipher[2], outcipher[3]);
} init()
{
    incipher[0] = 97;       /* initialize correct cipher phrase */
    incipher[1] = 98;
    incipher[2] = 99;
    incipher[3] = 100;
    syspwd1 = 0xb5;         /* initialize correct password */
    syspwd2 = 0xb4;

/* prompt for the claimed password */
    printf("Actual password is: %c%c\n", (syspwd1 ^ 0xff), (syspwd2 ^ 0xff));
    printf("What is your claimed password? ");
    userpwd[0] = c();       /* store claimed password in userpwd[] */
    userpwd[1] = c();
    printf("\n");
} verified()
{
/* This routine adds one level of smokesreen and timebomb to the code */ if(vfypwd())
    {   /* put non-zero value in a section of smokelast that isn't used */
        /* this will not corrupt the cipher phrase */
        smokelast[intsmoke1[1]] = syspwd1 ^ syspwd2 ^ 0xff;
        return(1);
    }
    else
    {   /* put non-zero value in a section of smokelast that is used */
        /* this will corrupt the cipher phrase */
        smokelast[intsmoke1[0]] = syspwd1 ^ syspwd2 ^ 0xff;
        return(0);
    }
}
```

```
vfypwd()
{
/* This routine compares syspwd, the known password, with userpwd, the user's
   claimed password, and sets up smokelast, a final smoke screen used as a
   mask to produce a valid or invalid cipher phrase. Smokelast is accessed
   only via two intermediate smoke screen arrays, intsmoke1 and intsmoke2.
   Note that syspwd is never present as one variable; it only exists as the
   combination of syspwd1 and syspwd2 in the formula:

syspwd = syspwd1 ^ syspwd2 ^ 0xff

The comparison takes place in steps; at each step that fails, a "time bomb"
   is planted by putting a non-zero value in an even element of
   smokelast[intsmoke%[]], where % is either 1 or 2. At each step that
   passes, a zero or non-zero value is put in an odd element of
   smokelast[intsmoke%[]]. Non-zero values in even elements of
   smokelast[intsmoke%[]] will result in a corrupt phrase. */ derive();                    /* Initialize first smoke arrays */

/* step 1 */
    if ((smoke2[6]) == smoke2[4])
    {   /* success: (syspwd1 == (userpwd[0] ^ 0xff)) */
        smokelast[intsmoke2[0]] -= syspwd2;/* leave d[m[0]] == 7 */
/* step 2 */
        if ((smoke1[7] >> 8) == ((smoke2[1] ^ 8) ^ 0xff))
        {    /* success: (syspwd2 == (userpwd[1] ^ 0xff)) */
             /* passed; put some value into an odd element of
                smokelast[intsmoke] */
             smokelast[intsmoke1[1]] = smoke1[6]   smoke2[3];
             return(1);
        }
/* step 3 */
        else
        {  /* failed: put a non-zero value in an odd element of smokelast */
            smokelast[intsmoke2[0]] -= syspwd2;
            return(0);
        }
    }
/* step 4 */
    else
    {   /* failed: plant a time bomb */
        smokelast[intsmoke1[0]] = (((smoke1[7] - 2) << 8) ^ syspwd2);
/* step 5 */
        if (((smoke2[0] - 2)/3 * 8) == (smoke2[7]))
        {   /* failed: plant a time bomb */
            smokelast[intsmoke2[0]] = smoke1[5] - smoke1[2] + syspwd1;
            return(0);
        }
/* step 6 */
        else
        {   /* failed: plant a time bomb */
            smokelast[intsmoke1[0]] = (smoke2[1] + 1) * 87;
            return(1);
        }
    }
} derive()
{
/* This routine initializes smoke1 and smoke2, which are the basic building
   blocks used in the comparison of the known password (syspwd) and the
   claimed password (userpwd) */
```

```
Int ];

for (j = 0; j < 4; j++)                /* clear smokelast */
        smokelast[j] = 0;
/* Initialize smoke1 */
    smoke1[0] = syspwd1 ^ (syspwd2 + syspwd1);
    smoke1[1] = (smoke2[2] ^ 7) - 3;
    smoke1[2] = (syspwd1 & 0x00f0) * (userpwd[0] - syspwd2);
    smoke1[3] = syspwd2 << 8;
    smoke1[4] = (syspwd1   syspwd2) + 4;
    smoke1[5] = 12 * syspwd1;
    smoke1[6] = (smoke1[4] ^ smoke2[0]) * 6;
    smoke1[7] = syspwd2 << 8;

/* Initialize smoke2 */
    smoke2[0] = userpwd[1] * 3 + 2;
    smoke2[1] = 8 ^ userpwd[1];
    smoke2[2] = (userpwd[0] ^ 3) + 9;
    smoke2[3] = (userpwd[1] << 2) * 4;
    smoke2[4] = userpwd[0];
    smoke2[5] = (userpwd[1] << 8) + 18;
    smoke2[6] = syspwd1 ^ 0xff;
    smoke2[7] = userpwd[1] * 8;
/* Initialize part of smokelast */
    smokelast[intsmoke2[3]] = syspwd2;
    smokelast[intsmoke2[0]] = syspwd2 + 7;
    smokelast[intsmoke2[1]] = syspwd1;
} fixcipher()
{
/* This routine copies the cipher phrase from incipher to outcipher, using
a mask that will be all zero if no tampering has occured. If tampering has
occured and the mask is not all zero, the cipher phrase that results will be
corrupt and decryption will be unsuccessful */ int i, j, k;

smokelast[intsmoke2[0]] -= 7;              /* undo timebomb from derive */
    for (i = 0; i < 2; i++)                    /* store new cipher phrase */
        outcipher[i] = incipher[i] ^ smokelast[intsmoke1[0]];
    for (i = 2; i < 4; i++)                    /* store new cipher phrase */
        outcipher[i] = incipher[i] ^ smokelast[intsmoke2[0]];
}
```

What is claimed is:

1. In a computer system having data storage means for storing information, access control apparatus comprising:

encryption means coupled to the data storage means of the computer system for encrypting information as it is stored in said data storage means, and for decrypting the data stored in said data storage means as it is retrieved from said data storage means; and access enabling means coupled to said encryption means for enabling and disabling said encryption means; said access enabling means including:

password generating means for generating a password corresponding to a specified user of the computer system, password comparison means for comparing a password entered by a user of the computer system with said generated password, means for enabling said encryption means when said entered password matches said generated password, and means for disabling said encryption means when any one of a predefined set of terminating events occurs.

2. The access control apparatus of claim 1, further including a multiplicity of password issuing means for use by authorized users of the computer system, each said password issuing means including means for generating and issuing a password to be used by said password comparison means as said entered password;

whereby access to the information stored on said data storage means is limited to users having possession of one of said password issuing means.

3. The access control apparatus of claim 2, wherein said access control means includes cue means, coupled to said password generating means, for generating a series of distinct cue values, including means for specifying a cue value to be used by said password generating means;

said password generating means includes means for generating a password by performing a predefined digital computation on said specified cue value;

at least a multiplicity of said password issuing means include computation means for generating a password by performing said predefined digital computation on said cue value.

4. The access control apparatus of claim 2, wherein said access control means includes user definition means for assigning one of a multiplicity of predefined translation functions to each authorized user of said computer system;

said access control means further includes cue means, coupled to said password generating means, for generating a series of distinct cue values, including means for specifying a cue value to be used by said password generating means;

said password generating means is coupled to said user definition means and includes means for generating a password by performing translating said cue value using the predefined translation function corresponding to a specified user; and at least a multiplicity of said password issuing means include computation means for generating a password by translating said cue value using a predefined translation function;

whereby access to the information stored on said data storage means is limited to authorized users having possession of a password issuing means having the same translation function as the predefined translation function corresponding to the specified user.

5. The access control apparatus of claim 2, wherein said encryption means includes means for applying a selected one a multiplicity of predefined distinct cryptoalgorithms when encrypting and decrypting information stored on said data storage means, said selected cryptoalgorithm corresponding to the identity of an authorized user accessing said data storage means.

6. In a computer system having data storage means for storing information, access control apparatus comprising:

encryption means coupled to the data storage means of the computer system for encrypting information as it is stored in said data storage means, and for decrypting the data stored in said data storage means as it is retrieved from said data storage means;

access enabling means, coupled to said encryption means, for enabling and disabling said encryption means; and a multiplicity of password issuing means for use by authorized users of the computer system for generating user password values, each said password issuing means including means for generating and issuing a user password value to be used by said access enabling means to determine whether a specified user is authorized to have access to information stored on said data storage means;

said access enabling means including:

user definition means for storing user information associated with each authorized user of said computer system, password generating means coupled to said user definition means for generating a password which is a function of the user information corresponding to a specified user of the computer system, password comparison means, coupled to said password generating means, for comparing a user password value with said generated password, and means for enabling said encryption means when said user password value matches said generated password;

whereby access to the information stored on said data storage means is limited to authorized users having possession of one of said password issuing means.

7. The access control apparatus of claim 6, wherein said access control means includes cue means, coupled to said password generating means, for generating a series of distinct cue values, including means for specifying a cue value to be used by said password generating means;

said password generating means includes means for generating a password by performing a predefined digital computation on said specified cue value, wherein said predefined digital function is a function of the user information corresponding to a specified user of the computer system;

at least a multiplicity of said password issuing means include computation means for generating a password by performing a predefined digital computation on said cue value.

8. The access control apparatus of claim 7, wherein said encryption means includes means for applying a selected one a multiplicity of predefined distinct cryptoalgorithms when encrypting and decrypting information stored on said data storage means, said selected cryptoalgorithm corresponding to the identity of an authorized user accessing said data storage means.

9. In a multiuser computer system including a plurality of user interaction means for receiving and transmitting information to users of said computer system, and data storage means for storing information; access control apparatus comprising:
   user definition means for storing user information associated with each authorized user of said computer system, said user information including information designating portions of said data storage means associated with each authorized user;
   encryption means coupled to the data storage means of the computer system for encrypting information as it is stored in said data storage means, and for decrypting the data stored in said data storage means as it is retrieved from said data storage means;
   access enabling means, coupled to said encryption means, for enabling and disabling said encryption means; and
   a multiplicty of password issuing means for use by authorized users of the computer system for generating user password values, each said password issuing means including means for generating and issuing a user password value;
   said access enabling means including:
      password generating means coupled to said user definition means for generating a password which is a function of the user information corresponding to a specified user of the computer system,
      password comparison means, coupled to said password generating means, for comparing a user password value with said generated password, and
      means for enabling said encryption means when said user password value matches said generated password and the portion of said data storage means that the user is trying to access corresponds to the portion of said data storage means designated by said user definition means;
   whereby access to the information stored on said data storage means is limited to authorized users having possession of one of said password issuing means.

10. The access control apparatus of claim 9, wherein said access control means includes cue means, coupled to said password generating means, for generating a series of distinct cue values, including means for specifying a cue value to be used by said password generating means;
   said password generating means includes means for generating a password by performing a predefined digital computation on said specified cue value, wherein said predefined digital function is a function of the user information corresponding to a specified user of the computer system;
   at least a multiplicity of said password issuing means include computation means for generating a password by performing a predefined digital computation on said cue value.

11. The access control apparatus of claim 10, wherein said encryption means includes means for applying a selected one a multiplicity of predefined distinct cryptoalgorithms when encrypting and decrypting information stored on said data storage means, said selected cryptoalgorithm corresponding to the identity of an authorized user accessing said data storage means.

12. A method of controlling access to a data storage means in a multiuser computer system, the steps of the method comprising:
   providing encryption means coupled to the data storage means of the computer system for encrypting information as it is stored in said data storage means, and for decrypting the data stored in said data storage means as it is retrieved from said data storage means;
   receiving a user entered password value from a specified user of the computer system;
   generating a valid password value which is a function of the user information corresponding to said specified user of the computer system;
   comparing said user entered password value with said valid password value;
   enabling said encryption means when said user entered password value matches said valid password value; and
   disabling said encryption means when any one of a predefined set of terminating events occurs.

13. A method of controlling access to a data storage means in a multiuser computer system, the steps of the method comprising:
   storing user information associated with each authorized user of said computer system, said user information including information designating portions of the data storage means associated with each authorized user; providing encryption means coupled to the data storage means of the computer system for encrypting information using a specified cryptoalgorithm as it is stored in said data storage means, and for decrypting the data stored in said data storage means using a specified cryptoalgorithm as it is retrieved from said data storage means;
   receiving a user entered password value from a specified user of the computer system;
   generating a valid password value which is a function of the user information corresponding to said specified user of the computer system;
   comparing said user entered password value with said valid password value;
   when said user entered password value matches said valid password value and the portion of said data storage means that the user is trying to access corresponds to the portion of said data storage means designated by said user definition means, enabling said encryption means and specifying a cryptoalgorithm to be used by said encryption means corresponding to said specified user;
   whereby access to the information stored in said data storage means is limited to authorized users.

* * * * *